US010967440B2

(12) United States Patent
Hill

(10) Patent No.: US 10,967,440 B2
(45) Date of Patent: Apr. 6, 2021

(54) MODIFIED DRILL GUIDE SYSTEM

(71) Applicant: KREG ENTERPRISES, INC., Huxley, IA (US)

(72) Inventor: Brian Hill, Ames, IA (US)

(73) Assignee: KREG ENTERPRISES, INC., Huxley, IA (US)

( * ) Notice: Subject to any disclaimer, the term of this patent is extended or adjusted under 35 U.S.C. 154(b) by 0 days.

(21) Appl. No.: 16/180,527

(22) Filed: Nov. 5, 2018

(65) Prior Publication Data
US 2020/0391302 A1 Dec. 17, 2020

Related U.S. Application Data

(60) Provisional application No. 62/583,179, filed on Nov. 8, 2017.

(51) Int. Cl.
*B23B 47/28* (2006.01)

(52) U.S. Cl.
CPC .......... *B23B 47/28* (2013.01); *B23B 2247/10* (2013.01); *B23B 2247/12* (2013.01)

(58) Field of Classification Search
CPC . B23B 47/287; B23B 47/288; B23B 2247/10; B23B 2247/12; B23B 49/02; Y10T 408/567; Y10T 408/563; B25B 1/00; B25B 5/00
See application file for complete search history.

(56) References Cited

U.S. PATENT DOCUMENTS

| | | | | |
|---|---|---|---|---|
| 3,804,546 A | * | 4/1974 | Boyajian | B23B 49/02 408/115 R |
| 3,861,664 A | * | 1/1975 | Durkee | A63C 11/02 269/43 |
| 4,235,565 A | * | 11/1980 | Albano | B23B 47/288 144/104 |
| 4,466,601 A | * | 8/1984 | Raines | B23B 47/287 248/455 |
| 5,238,336 A | * | 8/1993 | Sanders | B23B 47/288 408/112 |
| 5,322,396 A | | 6/1994 | Blacker | |

(Continued)

FOREIGN PATENT DOCUMENTS

| AU | 8345001 A | 3/2002 |
|---|---|---|
| AU | 2014295887 A1 | 2/2016 |

(Continued)

*Primary Examiner* — Chwen-Wei Su
(74) *Attorney, Agent, or Firm* — Christopher A. Proskey; BrownWinick Law Firm

(57) ABSTRACT

A pocket hole jig system is presented having a guide assembly having a drilling face and a plurality of drill guides that intersect with the drilling face. The main body of the guide assembly is formed of a first material that is rigid and provides structural integrity to the guide assembly. The first material has a low coefficient of friction. A grip layer is placed on the drilling face of the guide assembly. The grip layer is formed of a softer material that has a higher coefficient of friction than the material that forms the main body of the guide assembly. When placed on a workpiece, the grip layer provides increased grip on the workpiece thereby holding the workpiece and guide assembly in place and requiring less clamping pressure to hold the workpiece and guide assembly together.

53 Claims, 42 Drawing Sheets

(56) References Cited

U.S. PATENT DOCUMENTS

| | | |
|---|---|---|
| 5,676,500 A | 10/1997 | Sommerfeld |
| 5,791,835 A | 8/1998 | Chiang et al. |
| 6,254,320 B1 | 7/2001 | Weinstein et al. |
| 6,394,712 B1 | 5/2002 | Weinstein et al. |
| 6,599,064 B1 | 7/2003 | Robinson |
| 6,726,411 B2 | 4/2004 | Sommerfeld et al. |
| D503,415 S | 3/2005 | Dembicks |
| 6,955,508 B1 | 10/2005 | Radcliffe |
| D528,930 S | 9/2006 | Degen |
| 7,101,123 B1 | 9/2006 | Weinstein et al. |
| 7,134,814 B1 | 11/2006 | Park |
| D567,269 S | 4/2008 | Netzler |
| 7,374,373 B1 | 5/2008 | Park |
| 7,484,914 B1 | 2/2009 | Weinstein et al. |
| 7,597,513 B2 | 10/2009 | Chiang |
| 7,670,089 B2 | 3/2010 | Chiang |
| 7,798,750 B2 | 9/2010 | Clark |
| 8,052,358 B2 | 11/2011 | McDaniel et al. |
| 8,083,443 B1 | 12/2011 | Circosta et al. |
| D651,885 S | 1/2012 | Banasik |
| 8,087,853 B2 | 1/2012 | Stukuls |
| 8,231,313 B2 | 7/2012 | Sommerfeld et al. |
| 8,523,160 B2 * | 9/2013 | Wilturner ............... B25B 5/003 269/43 |
| 8,840,345 B1 | 9/2014 | Park |
| 9,682,430 B2 | 6/2017 | Clark |
| 9,782,837 B2 | 10/2017 | Pelkey |
| D809,032 S | 1/2018 | Cummings |
| D809,578 S | 2/2018 | Cummings |
| 9,969,011 B1 | 5/2018 | Marusiak |
| 9,969,042 B2 | 5/2018 | Clark |
| 10,022,808 B2 | 7/2018 | Chang |
| 10,144,068 B1 | 12/2018 | Poole |
| 10,173,269 B2 | 1/2019 | Cattaneo |
| 10,286,458 B2 | 5/2019 | Brigham |
| 10,315,295 B2 | 6/2019 | Vandenberg |
| 10,343,222 B2 | 7/2019 | Walter |
| 10,357,831 B2 | 7/2019 | Evatt et al. |
| 2003/0123941 A1 | 7/2003 | Emerson |
| 2004/0253065 A1 | 12/2004 | Davis |
| 2005/0089381 A1 | 4/2005 | Liu |
| 2006/0228180 A1 | 10/2006 | Sommerfeld |
| 2007/0201961 A1 | 8/2007 | Chiang |
| 2007/0280797 A1 | 12/2007 | McDaniel et al. |
| 2008/0075546 A1 | 3/2008 | Lin |
| 2008/0099101 A1 | 5/2008 | Chiang |
| 2008/0187404 A1 | 8/2008 | Chiang |
| 2008/0219786 A1 * | 9/2008 | Sommerfeld ......... B23B 47/287 408/115 R |
| 2011/0150587 A1 | 6/2011 | Stukuls |
| 2012/0051865 A1 | 3/2012 | Liu |
| 2016/0158850 A1 | 6/2016 | Fisher |
| 2017/0087644 A1 | 3/2017 | Pelkey |
| 2018/0071835 A1 | 3/2018 | Poole et al. |
| 2018/0141133 A1 | 5/2018 | Clark |
| 2018/0185930 A1 | 7/2018 | Duginske |
| 2018/0214959 A1 | 8/2018 | Evatt et al. |
| 2018/0214960 A1 | 8/2018 | Evatt et al. |
| 2018/0290217 A1 | 10/2018 | Asimakis |
| 2018/0345385 A1 | 12/2018 | Yates et al. |
| 2019/0015903 A1 | 1/2019 | Schleicher |
| 2019/0030619 A1 | 1/2019 | Thackery |
| 2019/0047058 A1 | 2/2019 | Pikarski et al. |
| 2019/0054547 A1 | 2/2019 | Pikarski et al. |
| 2019/0111499 A1 | 4/2019 | Evatt et al. |
| 2019/0026360 A1 | 5/2019 | Marra, Jr. |
| 2019/0176247 A1 | 6/2019 | Chang |
| 2019/0217402 A1 | 7/2019 | Brigham |

FOREIGN PATENT DOCUMENTS

| | | |
|---|---|---|
| AU | 2018101034 A4 | 8/2018 |
| CA | 3012668 | 1/2019 |
| DE | 102004023343 A1 | 12/2005 |
| DE | 202006005977 U1 | 8/2006 |
| DE | 60125047 T2 | 7/2007 |
| DE | 202012103274 Ui | 9/2012 |
| DE | 202017101885 U1 | 5/2017 |
| DE | 202018104374 Ui | 9/2018 |
| DE | 102004023343 | 1/2019 |
| DE | 102017115668 | 1/2019 |
| EP | 1712315 A1 | 10/2006 |
| EP | 1311364 B1 | 12/2006 |
| EP | 1595627 B1 | 4/2008 |
| EP | 2512763 A2 | 10/2012 |
| EP | 2223762 B1 | 7/2015 |
| EP | 3027364 A1 | 6/2016 |
| EP | 3391984 A1 | 10/2018 |
| EP | 3444057 | 2/2019 |
| EP | 3444058 | 2/2019 |
| EP | 3446817 | 2/2019 |
| GB | 2346573 | 8/2000 |
| GB | 2496473 A | 5/2013 |
| GB | 201806455 | 10/2018 |
| GB | 2564944 | 1/2019 |
| GB | 2567053 | 4/2019 |
| GB | 2567056 | 4/2019 |

* cited by examiner

MODIFIED DRILL GUIDE SYSTEM

CROSS REFERENCE TO RELATED PATENT APPLICATION

This utility patent application claims priority to U.S. provisional patent application Ser. No. 62/583,179 filed on Nov. 8, 2017, the entirety of which is fully incorporated by reference herein.

FIELD OF THE DISCLOSURE

This disclosure relates generally to drilling jig systems and, more particularly, and without limitation, to improved drilling jig systems that have increased grip on workpieces.

BACKGROUND OF THE DISCLOSURE

Pocket hole wood joinery involves joining boards by inserting a fastener at an angle through the edge of one workpiece into an adjoining workpiece, thereby joining the two workpieces together. Such joints are commonly used for face frames, cabinet boxes, leg-to-rail joinery in chairs and tables, and so forth. Drill guides or jigs are used to drill stepped holes through which the fasteners or pocket screws are inserted into the adjoining workpiece.

To facilitate the formation of pocket hole joinery, Applicant, Kreg Tool Company offers a line of pocket hole jigs. These pocket hole jigs clamp a workpiece in place and/or are clamped to a workpiece and help guide a stepped drill bit at an angle into the workpiece. The pocket hole formed by this process is configured to receive a screw that is used to screw two workpieces together.

Existing jigs for use forming pocket hole joinery are generally formed of metallic materials or rigid plastic or composite materials or a combination of metallic materials and rigid plastic or composite materials. Using metallic materials and rigid plastic or composite materials provides the benefits of producing a jig that is rigid, durable and long lasting. However, the use of these rigid materials has its drawbacks.

Namely, pocket hole jigs are generally used with rigid workpieces, such as boards or sheets of wood or composite material. When a pocket hole jig is formed of metallic materials and/or plastic or composite materials there is a low coefficient of friction between the workpiece and the pocket hole jig. This low coefficient of friction between the workpiece and pocket hole jig can lead to relative motion between the workpiece and the pocket hole jig which is highly undesirable as this can lead to inaccurate manufacture of parts or unnecessary scrap. In addition, movement of the pocket hole jig during use can lead to injury. This is made worse by the great amount of force that a user applies while drilling a pocket hole jig in a workpiece.

To compensate for the low coefficient of friction between the workpiece and the pocket hole jig, higher levels of clamping force may be applied between the pocket hole jig and the workpiece. This high clamping pressure can cause damage to the surfaces of the workpiece, can damage the pocket hole jig, can reduce the useful life of the pocket hole jig, can be exhausting to a user, and is generally inconvenient and undesirable. These negative effects are particularly exasperated when working with workpieces that have a particularly low coefficient of friction such as coated materials, finished workpieces, Formica, and the like.

One potential solution is to provide a roughened surface on the pocket hole jig that engages the workpiece. While a roughened surface may increase the coefficient of friction between the pocket hole jig and the workpiece providing a roughened surface on the pocket hole jig that engages the workpiece has deleterious effects that are not acceptable. Namely, when a pocket hole jig has a roughened surface on it and it is clamped into a workpiece, the roughened surface makes an impression on the surface of workpiece. This scarred surface is unacceptable in many applications, especially applications where a workpiece with a finished surface is being used. Another drawback to using a roughened surface is that over time the roughened surface wears. As such, over time the roughened surface has less and less grip on the workpiece. Another drawback to using a roughened surface is that it has a tendency to scratch the workpiece when inserting and removing the workpiece from the jig. Another drawback to using a roughened surface is that the roughened surface is undesirable to touch by a user.

For the reasons stated above, and for other reasons stated below which will become apparent to those skilled in the art upon reading and understanding the present disclosure, there is a need in the art for an improved pocket hole jig that provides increased grip on a workpiece.

Thus it is an object of at least one embodiment of the disclosure to provide a pocket hole jig system that improves upon the state of the art.

Another object of at least one embodiment of the disclosure to provide a pocket hole jig system that is easy to use.

Yet another object of at least one embodiment of the disclosure to provide a pocket hole jig system that is efficient.

Another object of at least one embodiment of the disclosure to provide a pocket hole jig system that can be used with any type of workpiece.

Yet another object of at least one embodiment of the disclosure to provide a pocket hole jig system that is cost effective.

Another object of at least one embodiment of the disclosure to provide a pocket hole jig system that forms accurate pocket holes.

Yet another object of at least one embodiment of the disclosure to provide a pocket hole jig system that is safe to use.

Another object of at least one embodiment of the disclosure to provide a pocket hole jig system that has a durable design.

Yet another object of at least one embodiment of the disclosure to provide a pocket hole jig system that has a long useful life.

Another object of at least one embodiment of the disclosure to provide a pocket hole jig system that provides additional functionality for pocket hole jigs and pocket hole joinery.

Yet another object of at least one embodiment of the disclosure to provide a pocket hole jig system that has a wide variety of uses.

Another object of at least one embodiment of the disclosure to provide a pocket hole jig system that has a wide variety of applications.

Yet another object of at least one embodiment of the disclosure to provide a pocket hole jig system that provides cost savings to a user.

Another object of at least one embodiment of the disclosure to provide a pocket hole jig system that is relatively inexpensive.

Yet another object of at least one embodiment of the disclosure to provide a pocket hole jig system that provides value.

Another object of at least one embodiment of the disclosure to provide a pocket hole jig system that is interchangeable with existing Kreg pocket hole jigs.

Yet another object of at least one embodiment of the disclosure to provide a pocket hole jig system that facilitates the formation of aesthetically pleasing finished products.

Another object of at least one embodiment of the disclosure to provide a pocket hole jig system that provides an increased coefficient of friction on a workpiece.

Yet another object of at least one embodiment of the disclosure to provide a pocket hole jig system that prevents or reduces relative movement between the pocket hole jig and the workpiece.

Another object of at least one embodiment of the disclosure to provide a pocket hole jig system that reduces the amount of clamping pressure required to adequately clamp a pocket hole jig to a workpiece.

Yet another object of at least one embodiment of the disclosure to provide a pocket hole jig system that does not damage a workpiece when clamped.

Another object of at least one embodiment of the disclosure to provide a pocket hole jig system that can be used with any type of pocket hole jig.

These and other objects, features, or advantages of at least one embodiment will become apparent from the specification, figures and claims.

BRIEF SUMMARY OF DISCLOSURE

A pocket hole jig system is presented having a guide assembly having a drilling face and a plurality of drill guides that intersect with the drilling face. The main body of the guide assembly is formed of a first material that is rigid and provides structural integrity to the guide assembly. The first material has a low coefficient of friction. A grip layer is placed on the drilling face of the guide assembly. The grip layer is formed of a softer material that has a higher coefficient of friction than the material that forms the main body of the guide assembly. When placed on a workpiece, the grip layer provides increased grip on the workpiece thereby holding the workpiece and guide assembly in place and requiring less clamping pressure to hold the workpiece and guide assembly together.

DETAILED DESCRIPTION

Figure 1:
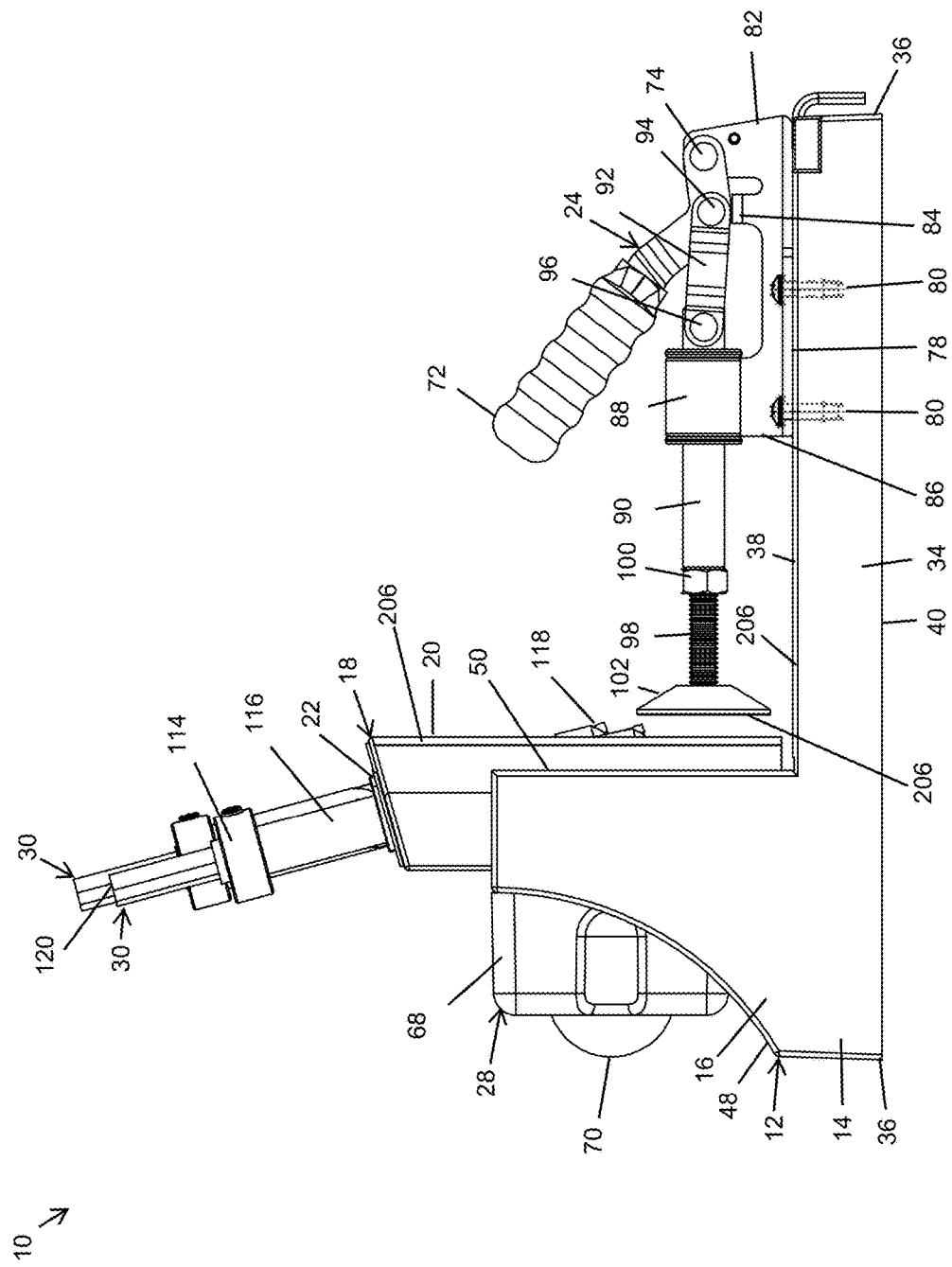
FIG. 1 is a side elevation view of a pocket hole jig system, the view showing a base having a lower portion and an upright portion, the view showing a guide assembly attached to the upright portion of the base, the view showing a pair of drill bits extending through the guide assembly at an angle with the lower ends of the drill bits protruding out of the drilling face of the guide assembly slightly, the view showing a dust collector system attached to the rear side of the upright portion which is configured to facilitate removal of dust and debris, the view showing a clamping assembly attached to the lower portion of the base on a side opposite the upright portion of the base and the guide assembly, the view showing the clamping assembly in a forward or clamped position, the view does not show a workpiece clamped between the drilling face of the guide assembly and the plunger pad of the clamping assembly, the view showing grip layer on the drilling face of the guide assembly, on the upper surface of the lower portion of the base and on the face of the plunger pad of the clamping assembly.

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the disclosure. The following detailed description is, therefore, not to be taken in a limiting sense, and the scope of the disclosure is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

System:

Pocket hole jig system 10 (or simply "system 10") is presented. Pocket hole jig system 10 is formed of any suitable size, shape and design and is configured facilitate the cutting of pocket holes in a workpiece. In the arrangement shown, as one example, with reference to FIGS. 1-3, pocket hole jig system 10 includes a base 12 having an L-shape when viewed from the side. The L-shaped base 12 includes a lower portion 14 that extends in a generally planar and horizontal manner, and an upright portion 16 that extends in a generally vertical manner with respect to the lower portion 14. System 10 includes a guide assembly 18 having a drilling face 20 and a plurality of drilling guides 22 therein. A clamping assembly 24 is connected to base 12 that is configured to clamp a workpiece 26 against or adjacent to the drilling face 20 of the drill guide 18. A dust collector unit 28 is connected to the upright portion 16 of base 12. A plurality of pocket hole drill bits 30 are used in association with the system to form pocket holes of various sizes in workpiece 26.

Figure 2:
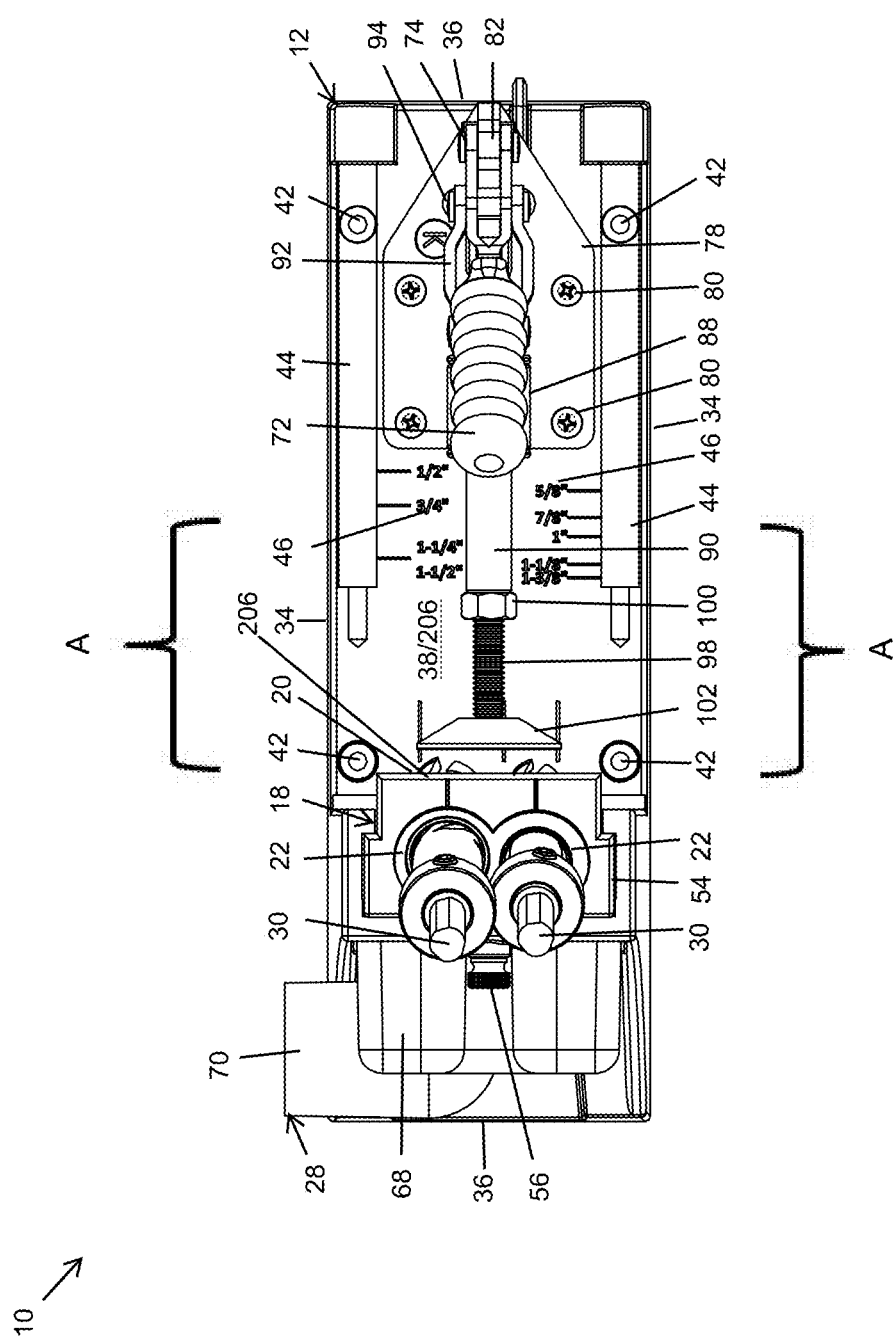
FIG. 2 is a top elevation view of the pocket hole jig system shown in FIG. 1.
Figure 3:
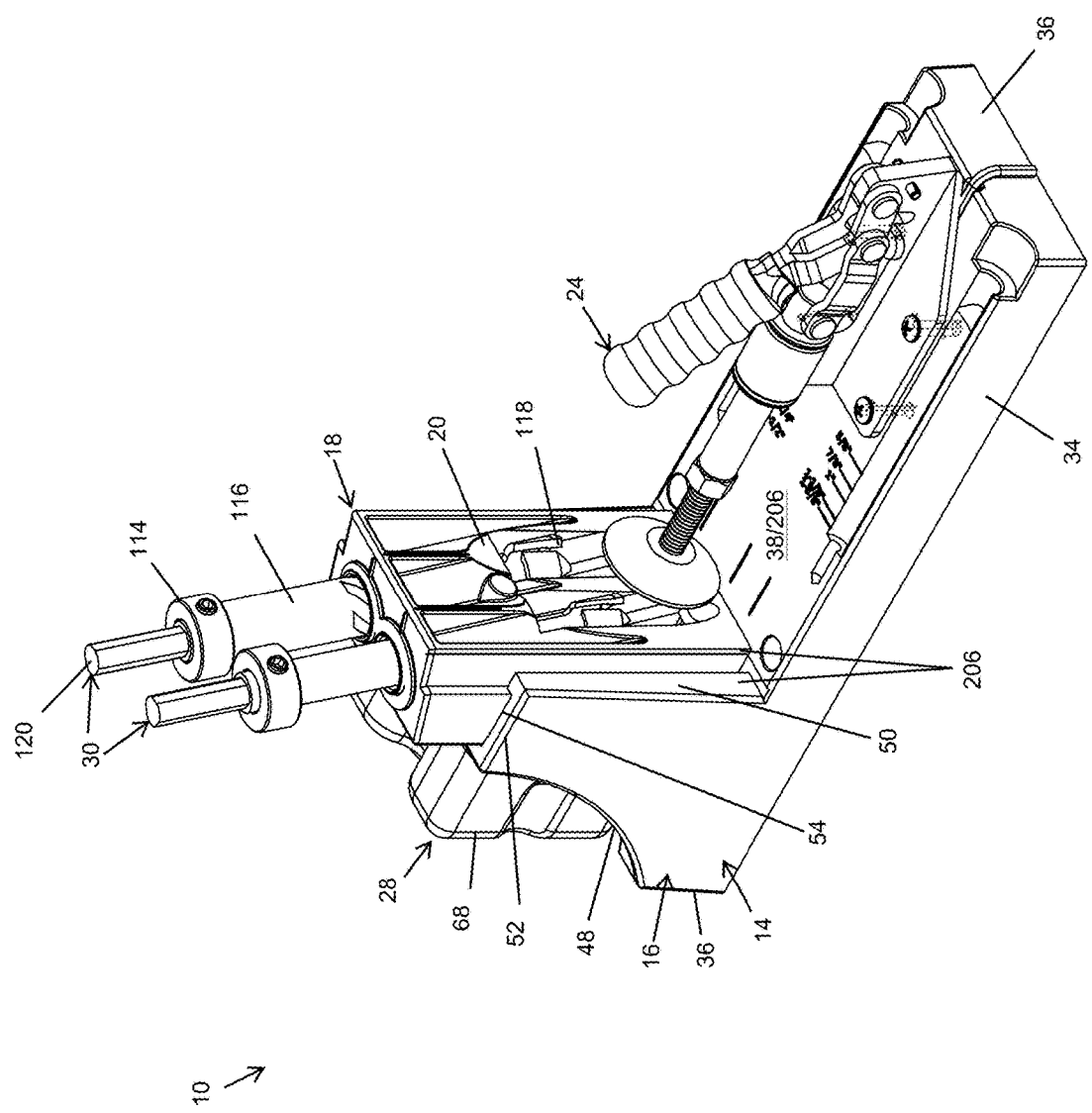
FIG. 3 is a perspective view of the pocket hole jig system shown in FIGS. 1 and 2.

Base:

In the arrangement shown, as one example, with reference to FIGS. 1-3, system 10 includes a base 12. Base 12 is formed of any suitable size, shape and design and is configured to hold and support workpiece 26 as pocket holes are cut out of workpiece 26. In one arrangement, as is shown, as one example, with reference to FIGS. 1-3, base 12 has an L-shape when viewed from the side. The L-shaped base 12 includes a lower portion 14 that extends in a generally planar and horizontal manner, and an upright portion 16 that extends in a generally vertical manner with respect to the lower portion 14. In the arrangement shown, upright portion 16 extends upward from the lower portion 14 in a generally perpendicular manner. In this way, the lower portion 14 and upright portion 16 form a generally perpendicular arrangement or a right angle corner there between. In the arrangement shown, as one example, the lower portion 14 and upright portion 16 are formed of a single monolithic member which may be formed by molding, machining, casting or any other manufacturing process.

Lower portion 14 of base 12 is formed of any suitable size shape and design. In the arrangement shown, as one example, when viewed from above or below, the lower portion of base 12 has a generally square or rectangular peripheral shape formed by the intersection of opposing sidewalls 34 with opposing end walls 36. In the arrangement shown, sidewalls 34 intersect with end walls 36 in a generally perpendicular manner, thereby forming a generally square or rectangular shaped lower portion 14. In the arrangement shown, sidewalls 34 and end walls 36 are generally flat and straight. In one arrangement, sidewalls 34 and end walls 36 taper or angle slightly outward as they extend downward from an upper surface 38 to a bottom surface 40 so as to facilitate a more-sable stance as well as to facilitate mold removal. However any other shape is hereby contemplated for use.

Similarly, when viewed from the side, the lower portion 14 of base 12 extends between an opposing upper surface 38 and bottom surface 40. In the arrangement shown, as one example, upper surface 38 and bottom surface 40 form a generally planar surface, or plane, when viewed from the side. The generally planar surface formed by the bottom surface 40 facilitates generally flat and stable placemen of base 12 on a benchtop or other work surface. The generally planar surface formed by the upper surface 38 facilitates generally flat and stable placement of workpiece 26 on base 12 so as to facilitate accurate cutting of pocket hole plugs 32. However any other shape is hereby contemplated for use.

In one arrangement, as is shown, lower portion 14 of base 12 includes a plurality of openings 42 that are sized and shaped to receive fasteners, such as screws or bolts, therein so as to facilitate connection of base 12 to a benchtop or other work surface so as to hold system 10 in place. In the arrangement shown, one opening 42 is placed in each corner of the lower portion 14 of base 12.

Also, in one arrangement, as is shown, the upper surface 38 of lower portion 14 includes drill bit recesses 44 and associated indicia 46. Drill bit recesses 44 are semi-circular recesses in the upper surface 38 of lower portion 14 that are sized and shaped to receive a drill bit 30 therein. Indicia 46 are measurement markings that correspond and identify positions along the length of the drill bit recesses 44. Drill bit recesses 44 are configured to receive a drill bit 30 therein and the indicia 46 are intended to help set a desired depth of a stop collar on the drill bit 30 based on the thickness of the workpiece 26 that is being used.

In one arrangement, as is shown, upright portion 16 is positioned adjacent one end of lower portion 14, opposite the clamping assembly 24, and extends upward therefrom. Upright portion 16 is formed of any suitable size, shape and design and is configured to hold and slidably receive guide assembly 18 therein. In one arrangement, as is shown, upright portion 16 includes sidewalls 34 that are in generally flush alignment with the sidewalls 34 of lower portion 14. Or, said another way, the exterior surface of the sides of upright portion 16 extend upward from the sidewalls 34 of lower portion 14 in a generally flush and seamless manner. Upright portion 16 includes a rear wall 48, a forward wall 50 and an upper wall 52.

In one arrangement, as is shown when viewed from the side, rear wall 48 connects at its lower end to the upper end of the end wall 36 of lower portion 14. In the arrangement shown, rear wall 48 curves as it extends forward and upward from the end wall 36 of lower portion 14 before connecting to upper wall 52. Upper wall 52 connects at its rear side to the upper end of rear wall 48. Upper wall 52 extends forward from rear wall 48 before connecting to forward wall 50. In the arrangement shown, upper wall 52 establishes a plane that extends in approximate parallel spaced alignment to the plane established by the upper surface 38 of the lower portion 14 of base 12. Forward wall 50 connects at its lower end to the upper surface 38 of the lower portion 14 of base 12 and extends upwardly therefrom before connecting to the forward end of upper wall 52. In the arrangement shown, forward wall 50 establishes a plane that extends in approximate perpendicular alignment to the plane established by the upper surface 38 of the lower portion 14 of base 12.

In the arrangement shown, as one example, the upper end of upright portion 16 includes an opening 54. Opening 54 is sized and shaped to receive guide assembly 18 therein with close and tight tolerances while allowing for sliding vertical movement of guide assembly 18 within upright portion 16. In the arrangement shown, as one example, when viewed from above, opening 54 is generally C-shaped such that the opening 54 captures guide assembly 18 therein and prevents guide assembly 18 from escaping the open forward side of opening 54. When guide assembly 18 is placed within opening 54, guide assembly 18 is vertically adjustable within upright portion 16. This vertical adjustment allows the height of guide assembly 18 to be positioned at any desired location within the range of upright portion 16 so as to facilitate drilling pocket holes in workpieces 26 of various thickness.

Guide assembly 18 is infinitely adjustable within upright portion 16. Guide assembly 18 is also adjustable to predetermined positions. In the arrangement shown, the rear side of upright portion 16 includes a set pin 56 that extends through upright portion 16 and into opening 54. As set pin 56 extends into opening 54, set pin 56 engages a rear wall 58 of the guide assembly 18 thereby locking the position of guide assembly 18 in place. In one arrangement, guide assembly 18 includes one or more set openings 60 in its rear wall 58 that receive set pin 56 at predetermined positions. Any number of openings 60, and therefor any number of predetermined positions that correspond to common workpiece thicknesses, are hereby contemplated for use in the rear wall 58 of guide assembly 58.

In the arrangement shown, as one example, when guide assembly 18 is received within opening 54 of upright portion 16 of base 12, the forward wall, or drilling face 20 of guide assembly 18 is positioned a distance in front of the forward wall 50 of upright portion 16. In this arrangement, the plane established by drilling face 20 of guide assembly 18 is positioned in approximate parallel spaced alignment with the plane established by the forward wall 50 of upright portion 16. This alignment ensures that the drilling face 20 of guide assembly 18 engages a surface of workpiece 26 in flat and flush engagement without interference from upright portion 16. In another arrangement the planes of drilling face 20 of guide assembly 18 and the forward wall 50 of upright portion 16 are positioned in approximate parallel planar alignment.

In one arrangement, the rear side of upright portion 16 includes one or more exit holes 64 (not shown in detail as they are covered by dust collector unit 28, but they are shown in detail in Applicants U.S. Pat. No. 8,231,313, which is incorporated fully by reference herein). Exit holes 64 are positioned in the rear wall 48 of upright portion 16, adjacent where the rear wall 58 of guide assembly 18 is located when guide assembly 18 is located within upright portion 18. Exit holes 64 in rear wall 48 of upright portion 16 align with or are in communication with exit holes 66 in the rear wall 58 of guide assembly 18. Exit holes 64 in upright portion 16 extend an elongated vertical distance. This vertical length of exit holes 64 allows drilled material, such as wood chips, dust and debris generated during drilling to exit the guide assembly through exit holes 66 and exit the upright portion 16 through exit holes 64 regardless of the vertical position of guide assembly 18 within upright portion 16. That is, by having exit holes 64 be vertically stretched a distance, this ensures that the exit holes 64, 66 are in overlapping communication with one another regardless of where guide assembly 18 is positioned within upright portion 16. This ensures proper removal of drilled material, such as wood chips, dust and debris, regardless of the position of the guide assembly 18 within upright portion 16. In addition, by having the exit holes 66 in rear wall 58 of guide assembly 18 be vertically elongated, this ensures that drilled material, such as wood chips, dust and debris is properly removed regardless of the position of the drill bit 30 within the guide assembly 18 and/or drill guide 22. Quick removal of drilled material facilitates high quality cuts and high quality and dimensionally accurate pocket holes as well as easier drilling.

In one arrangement, base 12 is a Kreg K3, Kreg K4, Kreg K5 or other Kreg pocket hole jig commercially available on the market and guide assembly 18 is interchangeable with these existing products.

Dust Collection Unit:

In the arrangement shown, system 10 includes a dust collection unit 28. Dust collection unit 28 is formed of any suitable size, shape and design and is configured to connect to base 12, or more specifically the rear wall 48 of upright portion 14 to facilitate the removal of drilled material such as wood chips, dust and debris. In one arrangement, as is shown, dust collection unit 28 includes a main body 68 and a snout 70.

Main body 68 is formed of any suitable size, shape and design and is configured to connect to the rear wall 48 of upright portion 16. In the arrangement shown, as one example, main body 68 is generally square or rectangular in shape and fits within a correspondingly sized recess within the rear wall 48 of upright portion 16 such that the two components frictionally engage and hold on to one another. In the arrangement shown, the upper end of main body 68 includes a recess therein that provides clearance for set pin 56.

Snout 70 is formed of any suitable size, shape and design and is configured to connect main body 68 to a vacuum hose to facilitate removal of drilled material captured by main body 68. In the arrangement shown, as one example, snout 70 is a generally tubular shaped member that connects to main body 68 and extends outwardly therefrom. In one arrangement, snout 70 is fixed with respect to main body 68, whereas in another arrangement, the position of snout 70 is adjustable with respect to main body 68.

When a vacuum hose is connected to snout 70 and main body 68 is connected to the rear wall 48 of upright portion 16 of base 12 and a pocket hole is drilled using a drill bit 30 extending through a drill guide 22 of the guide assembly 18 drilled material, such as wood chips, dust and debris passes through the exit hole 66 in the rear wall 58 of guide assembly 18. This drilled material then passes through the aligned exit hole 66 in the rear wall 48 of upper portion 16 of base 12 and into main body 68 of dust collector unit 28. This drilled material is then pulled through snout 70 of dust collector unit 28 by vacuum. In this way, the combination of the aligned exit holes 64, 66 in upright portion 16 and guide assembly 18 and the connection of the dust collector unit 28 facilitates the quick, efficient and easy removal of drilled material from the drill guides 22 thereby providing a cleaner-operating system 10, as well as producing high quality cuts as the drilled material is not allowed to interfere with the drilling operation as it is quickly removed along the length of the cutting operation.

Clamp Assembly:

In the arrangement shown, system 10 includes a clamping assembly 24. Clamping assembly 24 is formed of any suitable size, shape and design and is configured to clamp workpiece 26 against the drilling face 20 of guide assembly 18. In one arrangement, as is shown, clamping assembly 24 is connected to the lower portion 14 of base 12 opposite the upright portion 16 of base 12. In the arrangement shown, as one example, clamping assembly 24 includes a handle assembly 72 that is configured to be grasped by a user to manipulate operation of the clamping assembly 24. The lower end of handle assembly 72 connects at a first pivot point 74 to a mounting member 76.

Mounting member 76 includes a base plate 78 that extends in a generally planar manner and is configured to sit upon and engage the upper surface 38 of lower portion 14 of base 12. In this way, base plate connects clamping assembly 24 to base 12 and provides stability to clamping assembly 24. In the arrangement shown, base plate 78 is connected to and held to lower portion 14 of base 12 by a plurality of fasteners 80 that extend through openings in base plate 78 and into the material of the lower portion 14 of base 12.

A rear tab 82 extends upward from base plate 78 adjacent its outward end and receives the lower end of handle assembly 72 and first pivot point 74. A center tab 84 is positioned a distance inward from rear tab 82. Center tab 84 extends upward from base plate 78 a distance and terminates in an upper surface that establishes a stop surface when clamping assembly 24 is in a fully clamped position, which also corresponds with the clamping assembly 24 being in a slightly over-center position which helps to hold the clamping assembly 24 in a fully clamped position. A forward tab 86 is positioned a distance inward from center tab 84. Forward tab 86 extends upward from base plate 78 a distance and terminates in a guide collar 88 that slidably holds and guides shaft 90. Guide collar 88 allows shaft 90 to slide through guide collar 88 between a fully clamped position and a fully open position. In the arrangement shown, rear tab 82, center tab 84 and forward tab 86 are generally centrally positioned upon base plate 78 thereby providing balance and stability to clamping assembly 24.

Handle assembly 72 also connects to a first linkage member 92 at a second pivot point 94. First linkage member 92 connects at its rearward end to handle assembly 72. First linkage member 92 connects at its forward end to the rearward end of shaft 90 at third pivot point 96.

The forward end of shaft 90 threadably receives threaded shaft 98. Threaded shaft 98 threads in and out of shaft 90 thereby adjusting the length threaded shaft 98 extends outward from shaft 90. Threaded shaft 98 includes a nut 100 thereon that is used to set the depth of threaded shaft 98 upon shaft 90. A plunger pad 102 is connected to the inward most end of threaded shaft 98 and has an extended forward surface area that engages the workpiece 26, thereby spreading out the clamping forces and preventing the potential for marking of the workpiece 26.

The clamping assembly 24 shown and described herein is just one of countless examples. Any other form of a clamping assembly or clamping mechanism is hereby contemplated for use. This includes a ratcheting-type clamping assembly as is shown in Applicant's pending U.S. patent application Ser. No. 14/275,402, which is fully incorporated by reference herein; this also includes the same-side clamping assembly as is shown in Applicant's issued U.S. Pat. No. 8,231,313, which is fully incorporated by reference herein; this also includes any electric, pneumatic, hydraulic or other powered clamping assemblies; this also includes any hand-clamp assemblies, as is shown in Applicant's U.S. patent application Ser. No. 15/188,151, which is fully incorporated by reference herein.

Guide Assembly:

In the arrangement shown, as one example, system 10 includes a guide assembly 18, which is shown in particular in FIGS. 4-14. Guide assembly 18 is formed of any suitable size, shape and design and is configured to facilitate the cutting of pocket holes in workpiece 26. In one arrangement, as one example, with reference to FIGS. 1-3, guide assembly 18 is intended to be used when connected to base 12 by sliding within opening 54 in upright portion 16 and facilitates guiding drill bits 30 at an angle through drilling face 20 and into workpiece 26 to form pocket holes. In another arrangement, guide assembly 18 is intended to be used in a standalone manner where guide assembly 18 is clamped directly against a workpiece 26. In another arrangement, as one example, with reference to FIGS. 15-21, guide assembly 18 is configured to be used in a portable guide 200.

In one arrangement, as is shown, as one example, with reference to FIGS. 4-14, guide assembly 18 is formed of a generally square or rectangular shape extending vertically a distance from a lower end 104 to an upper end 106; and extending a width between opposing sidewalls 108; and extending a thickness between forward face, or drilling face 20 and rear wall 58.

In the arrangement shown, the lower end 104 of guide assembly 18 and the upper end 106 of guide assembly 18 are positioned at an angle to one another. That is, in the arrangement shown, when guide assembly 18 is in place within opening 54 of upright portion 16, the plane established by the lower end 104 of guide assembly 18 is in approximate parallel alignment to the plane established by the upper surface 38 of lower portion 14 of base 12. In contrast, the plane established by the upper end 106 of guide assembly is not in approximate parallel alignment to the plane established by the upper surface 38 of lower portion 14 of base 12. In contrast, the plane established by the upper end 106 of guide assembly 18 is positioned at an angle to the plane established by the lower end 104 of guide assembly 18. In one arrangement, this angle is approximately 15 degrees, however any other angle is hereby contemplated from 1 degree to 89 degrees. In the arrangement shown, the angle established by the plane formed by the upper end 106 of guide assembly 18 is approximately the same angle that the bore of drill guides 22 held within guide assembly 18 exit the drilling face 20. This angle also corresponds to the angle of the pocket hole formed by the system 10 in workpiece 26. In the arrangement shown, the generally planar surface of the upper end 106 of guide assembly 18 extends in approximate perpendicular alignment to the center axis of the bores of drill guides 22.

In the arrangement shown, sidewalls 108 of guide assembly 18 extend in approximate parallel spaced alignment to one another. Sidewalls 108 connect at their lower end to lower end 104 of guide assembly 18 in approximate perpendicular alignment. Sidewalls 108 connect at their upper end to upper end 106 of guide assembly 18 in approximate perpendicular alignment. The width of guide assembly 18 between opposing sidewalls 108 is sized and shaped to fit within the opening 54 in upright portion 16 of base 12 within close tolerances.

To facilitate connection to opening 54 in upright portion 16 of base 12, sidewalls 108 include a step 110 therein at their forward end. Step 110 steps in the width of guide assembly 18 adjacent the forward face of drilling face 20 and makes room for the inward extension of forward wall 50 of upright portion 16. Step 110 causes the forward face or drilling face 20 to be slightly narrower in width than at the rear wall 58. The distance between the stepped portion of guide assembly 18 is approximately the distance between the inward edges of the opposing forward walls 50 of upright portion 16. Said another way, the steps 110 allow the drilling face 20 to extend through the slot in the upright portion 16 of base 12 so as to ensure that the drilling face 20 of guide assembly 18 engages the workpiece 26 prior to the forward wall 50 of upright portion 16.

Guide assembly 18 includes one or more drill guides 22 therein. Drill guides 22 are formed of any suitable size, shape and design and are configured to guide drill bits 30 at a precise angle. In one arrangement, to provide increased durability and wear resistance, drill guides 22 are formed of a hardened metallic material, whereas other portions of the drill guide 22 are formed of a plastic material or composite material, or non-metallic material, so as to reduce weight and manufacturing cost while providing a pleasing aesthetic appeal and comfortable use.

In the arrangement shown, a three drill guides 22 are present within guide assembly 18. However any other number of drill guides 22 are hereby contemplated for use including one, two, three, four, five or more.

Similarly, in the arrangement shown, where three drill guides 22 are present within guide assembly 18, the drill guides 22 are of the same size. In other arrangements, one drill guide 22 is larger than the other drill guide 22 thereby facilitating the formation of different sized pocket holes. In this arrangement, the larger drill guide 22 is configured to receive what is known as a HD or Heavy Duty drill bit 30 that is configured to be used in association with thicker workpieces 26, such as 2×4's and 2×6's and the like. In this arrangement, the smaller drill guide 22 is configured to receive what is known as a standard drill bit 30 that is configured to be used in association with thinner workpieces 26, such as 1 inch thick and smaller workpieces 26. A third or micro sized drill bit 30 and drill guide 22 is contemplated for use with thinner workpieces 26. The arrangement where multiple drill guides 22 are the same size facilitate multiple pocket holes without having to move the drill guide 22 or workpiece 26. Alternatively, the use of multiple sizes of drill guides 22 allows the use of a single drill guide 22 for multiple workpiece thicknesses. In the arrangement shown, where three drill guides 22 are used, two drill guides 22 are positioned in close spaced relation whereas the third drill guide 22 is spaced a greater distance away from the other two drill guides 22. This varied spacing provides a great amount of variability and a number of combinations of spacing between pocket holes without having to move the drill guide 18 relative to workpiece 26.

In the arrangement shown, as one example, drill guides 22 extend though guide assembly 18 in approximately perpendicular alignment to the plane established by the upper end 106 of guide assembly 18. As such, drill guides 22 intersect the drilling face 20 at a corresponding angle to the intersection of the plane established by the upper end 106 of guide assembly 18 and the drilling face 20 of guide assembly 18. The drill guides 22 drill bit 30 at this precise angle during the drilling operation.

In the arrangement shown, due to the angle of the intersection between the drill guides 22 and the drilling face 20, the drill guides 22 form an oval shaped opening in the drilling face 20 of guide assembly 18. In one arrangement, to reduce chipping of workpiece 26 around the area of the drilling operation, an insert 202 is positioned within guide assembly 18 that is formed of a metallic material that increases accuracy of the cuts as well as durability. In one arrangement, as is shown, insert 202 has a flat metallic face that is positioned in flush parallel alignment to the drilling face 20. In this way, the insert 202 provides the areas immediately adjacent to the oval shaped pocket hole to be formed of durable and accurate metal, whereas the other portions of guide assembly 18 are formed of a plastic material or composite material or another non-metallic material. In one arrangement, this insert 202 is connected to or formed as one with the drill guides 22. In one arrangement, the plastic material or composite material or another non-metallic material of guide assembly 18 is formed around the insert in a molding process or the like to provide strength, rigidity, permanence and accuracy.

In the arrangement shown, drill guides 22 include an exit hole 66 in their rear side, or a side opposite the drilling face 20. Exit holes 66 in drill guides 22 are formed of any suitable size, shape and design and facilitate the removal of drilled material such as wood chips, dust and debris. In the arrangement shown, exit holes 66 are generally circular in shape when viewed from the rear wall 58 of guide assembly 18. However any other shape is hereby contemplated for use.

In the arrangement shown, an extended stop surface 112 is positioned around the upper end of drill guides 22. Stop surfaces 112 are formed of any suitable size, shape and design and are configured to provide a flat and flush surface to stop the forward progression of drill bit 30. In the arrangement shown, when viewed from above, stop surfaces 112 are generally cylindrical features that rise slightly above the upper end 106 of guide assembly 18 in the area immediately around each drill guide 22. Stop surfaces 112 are configured to engage a stop collar 114 connected to the drill bit 30.

In the arrangement shown, the rear wall 58 of guide assembly 18 includes at least one opening 60 that is sized and shaped to receive set pin 56 when guide assembly 18 is positioned at a set, predetermined position, within upright portion 16 of base 12. Alternatively, guide assembly 18 can be set to any other position by moving the guide assembly 18 to the desired position within upright portion 16 of base 12 and tightening set pin 56 against rear wall 58 thereby holding guide assembly 22 at the desired position.

Also as is visible in the figures, the guide assembly 18 has a partially skeletonized drilling face 20 and rear wall 58. This skeletonized configuration allows the elimination of unnecessary material while not reducing strength or rigidity or durability. This skeletonized arrangement minimizes weight of the guide assembly 18 and makes the guide assembly 18 easier to use. Also, while portions of the drilling face 20 and rear wall 58 of guide assembly 18 are skeletonized, enough material is left to form a substantial plane at drilling face 20 to engage workpiece 26 and rear wall 58 to engage opening 54 of upright portion 16 such that the skeletonized configuration does not inhibit operation of the guide assembly 18.

Drill Bit:

In the arrangement shown, system 10 includes the use of one or more drill bits 30. Drill bit 30 is formed of any suitable size, shape and design and is configured to be inserted within a drill guide 22 having an inner diameter of corresponding size to the outer diameter of the drill bit 30. The drill bit 30 is configured to extend through drill guide 22 and into workpiece 26 thereby forming a pocket hole.

In the arrangement shown, drill bit 30 includes an adjustable stop collar 114 on a main body 116 that extends a length from a cutting end 118 to an attachment end 120. In one arrangement, main body 116 has an exterior diameter that corresponds to the internal diameter of drill guide 22 and includes a helical feature on and/or in its exterior surface that facilitates the removal of material from workpiece 26. In one arrangement the cutting end 118 includes a stepped feature that facilitates the formation of stepped pocket holes. However any other size, shape and design of a drill bit 30 is hereby contemplated for use.

Grip Layer—On Guide Assembly:

In one arrangement, the main body of guide assembly 18 is formed of a hard or rigid plastic or composite material and insert 202 is formed of a metallic material. This combination of using a hard or rigid plastic or composite material for the main body of guide assembly 18 and using a metallic material for insert 202 provides a strong, durable and long lasting tool that can handle daily use and abuse without significant wear or damage. One drawback, however, of using a hard or rigid plastic or composite material for the main body of guide assembly 18 and using a metallic material for insert 202 is that these materials tend to have a low coefficient of friction. Or, said another way, when the drilling face 20 of guide assembly 18 is placed on a workpiece 26 the low coefficient of friction of both the drilling face 20 of guide assembly 18 and the workpiece 26 tends to be a relatively slippery arrangement. As such, when guide assembly 18 having a main body formed of a hard or rigid plastic or composite material and an insert 202 formed of a metallic material is placed on workpiece 26, there is a low coefficient of friction between the two components. This means that the guide assembly 18 easily slides on and over workpiece 26. This means that a substantial amount of clamping pressure using clamp 204 is required to keep the relatively slippery guide assembly 18 in place on the relatively slippery workpiece 26 once the guide assembly 18 is placed in its desired position on workpiece 26.

It is undesirable to have the guide assembly 18 move relative to workpiece 26 once set in place on workpiece 26. Movement of guide assembly 18 during a drilling operation can cause an inaccurate pocket hole to be drilled. Also, movement of guide assembly 18 during a drilling operation can cause injury to a user if it causes the jig system 10, workpiece 26 and/or drill bit 30 or attached drill to move.

Another drawback to having a low coefficient of friction between guide assembly 18 and workpiece 26 is that substantial clamping pressure is required to overcome the low coefficient of friction between the guide assembly 18 and the workpiece 26 to clamp the guide assembly 18 in place. This high level of clamping pressure is undesirable for many reasons. Using excessive clamping pressure can cause damage on the surface of the workpiece 26 as pressing the clamp 204 and guide assembly 18 into workpiece 26 can cause impressions, marks, mars and other signs of excessive pressure. This is extremely undesirable especially for decorative pieces, furniture and other display items. Using excessive clamping pressure is also undesirable as it can lead to user fatigue over time and can limit the number of operations a user can perform in a day. Using excessive clamping pressure can lead to repetitive use injuries for professional woodworkers such as cabinet makers, furniture makers, craftsmen and the like. Using excessive clamping pressure is also undesirable as it makes it more difficult to use the guide assembly 18 as the user must ensure that the guide assembly 18 is properly aligned with workpiece 26 during claiming and applying the substantial clamping force. Using excessive clamping pressure is also undesirable as it can damage the guide assembly 18 over time. Using excessive clamping pressure is also undesirable as may require specialized tools, such as metallic project clamps, screw-tight clamps, a vise and the like tools that can exert a substantial amount of pressure.

In one arrangement to provide both desired grip as well as desired structural rigidity, guide assembly 18 includes a grip layer 206. That is, the main body of guide assembly 18 is formed of a generally rigid plastic material or composite material that provides the needed structural rigidity to guide assembly 18. Due to the material properties of this rigid and strong plastic or composite material it tends to be relatively slick and has a low coefficient of friction. As such, if this material itself were in direct engagement with workpiece 26, the guide assembly 18 would have a tendency to slip along the workpiece 26, or said another way there would be a low coefficient of friction between the guide assembly 18 and the workpiece 26.

To provide increased grip upon workpiece 26, the drilling face 20 includes a layer (grip layer 206) formed of a more flexible and/or more compressible material than the plastic or composite material that forms the main body of guide assembly 18 and the metallic material that forms the insert 202 of guide assembly 18. Grip layer 206 is formed of any material that that has a higher coefficient of friction than the main body of guide assembly 18 and the metallic material that forms the insert 202, and therefore the grip layer 206 provides enhanced grip on workpiece 26. The enhanced grip of the grip layer 206 of guide assembly 18 allows the guide assembly to better stay in place during a cutting operation thereby allowing for a cleaner, more accurate and safer drilling operation.

The high coefficient of friction of the material of grip layer 206 also helps to hold the workpiece 26 in place and prevent workpiece 26 and guide assembly 18 from moving during a drilling operation thereby allowing for a cleaner, more accurate and safer use.

In one arrangement, the grip layer 206 and main body of guide assembly 18 are formed of a single piece construction, such as molding the two components together such that they are essentially inseparable. This monolithic formation may be made through various manufacturing processes such as dual durometer molding or dual material molding, or any other operation where two different materials are molded together to form a single monolithic and unitary member. Alternatively, the grip layer 206 and the main body of guide assembly 18 may be formed independently of one another and are then connected together by any manner, method or means such as by using two sided tape, adhesive, gluing, cementing, screwing, bolting, welding, using fitting features, using snap fitting features, heat-activating, bonding, or the like, or by connecting by any other manner, method or means. In another arrangement, a first component is formed (either the grip layer 206 or the main body of guide assembly 18) through any process such as extrusion, molding, casting, machining, forming or the like and the second component (the other of the grip layer 206 or the main body of guide assembly 18) is added to the formed first component in a secondary manufacturing process such as molding, extrusion, spray deposition or the like processes identified herein or any other manufacturing process.

As one example, in one arrangement the main body of guide assembly 18 is molded around the insert 202 and then the grip layer 206 is sprayed onto the main body of guide assembly 18.

As another example, in one arrangement the main body of guide assembly 18 is molded around the insert 202 and then the grip layer 206 is adhered onto the main body of guide assembly 18.

As another example, in one arrangement the main body of guide assembly 18 is molded around the insert 202 and then the grip layer 206 is molded onto the main body of guide assembly 18.

In one arrangement, grip layer 206 does not cover the surface of insert 202. In this arrangement, the drilling face 20 of insert 202 is flush or approximately flush with the grip layer 206 that covers the surfaces of the main body of drilling guide 18 that form the drilling face 20.

In another arrangement, the grip layer 206 covers the drilling face 20 of insert 202 as well as the surfaces of the main body of drilling guide 18 that form the drilling face 20, either partially or wholly. In one arrangement, the grip layer 206 covers the entire drilling face 20 of the main body of drilling guide 18 that form the drilling face 20.

Said another way, grip layer 206 may cover all of the drilling face 20 of the guide assembly 18, including the entire plane of the forward surface of the main body of guide assembly 18 as well as the entire plane of the forward surface of insert 202, whether skeletonized or not. The grip layer 206 may cover only some or a portion of the drilling face 20 of the guide assembly 18, including the forward surface of the main body of guide assembly 18 as well as the forward surface of insert 202. The grip layer 206 may cover only some or all of the drilling face 20 of the guide assembly 18 but not any of the forward surface of insert 202. In this arrangement, the forward surface of the insert 202 is flush with the forward surface of the grip layer 206 on the main body of guide assembly 18. This arrangement allows for optimum accuracy of cutting the pocket hole as the hard metallic insert 202 engages the surface of the workpiece 26 adjacent where the pocket hole is drilled while the softer but higher coefficient of friction grip material of grip layer 206 engages other portions of the workpiece 26, not precisely adjacent where the pocket hole is drilled.

In one arrangement, the grip layer 206 only covers portions of the drilling face of the main body of drilling guide 18 that form the drilling face 20. In this arrangement, the grip layer 206 may be formed of a plurality of strips or pieces or parts (which may be formed of any size, shape and design, such as square, rectangular, square or the like or any other shape) of the grip layer material that extend across all or a part of the drilling face 20 of the guide assembly 18. These strips may be flush with the generally planar drilling face 20, or they may protrude slightly from other portions of the planar drilling face 20 such that when pressure is applied between the drilling guide 18 and the workpiece 26 these protruding strips or pieces of grip material 206 are compressed flush with the drilling face 20. In this arrangement, the grip layer 206 may be formed of isolated portions of the grip layer material that are positioned on parts of the drilling face 20 of the guide assembly 18, such as a circular, square, rectangular or any other shaped member positioned in each corner of the drilling face 20 of guide assembly 18. These isolated portions of the grip layer 206 material may be flush with the generally planar drilling face 20, or they may protrude slightly from the planar drilling face 20. Any other arrangement of grip layer 206 is hereby contemplated for use.

Figure 4:
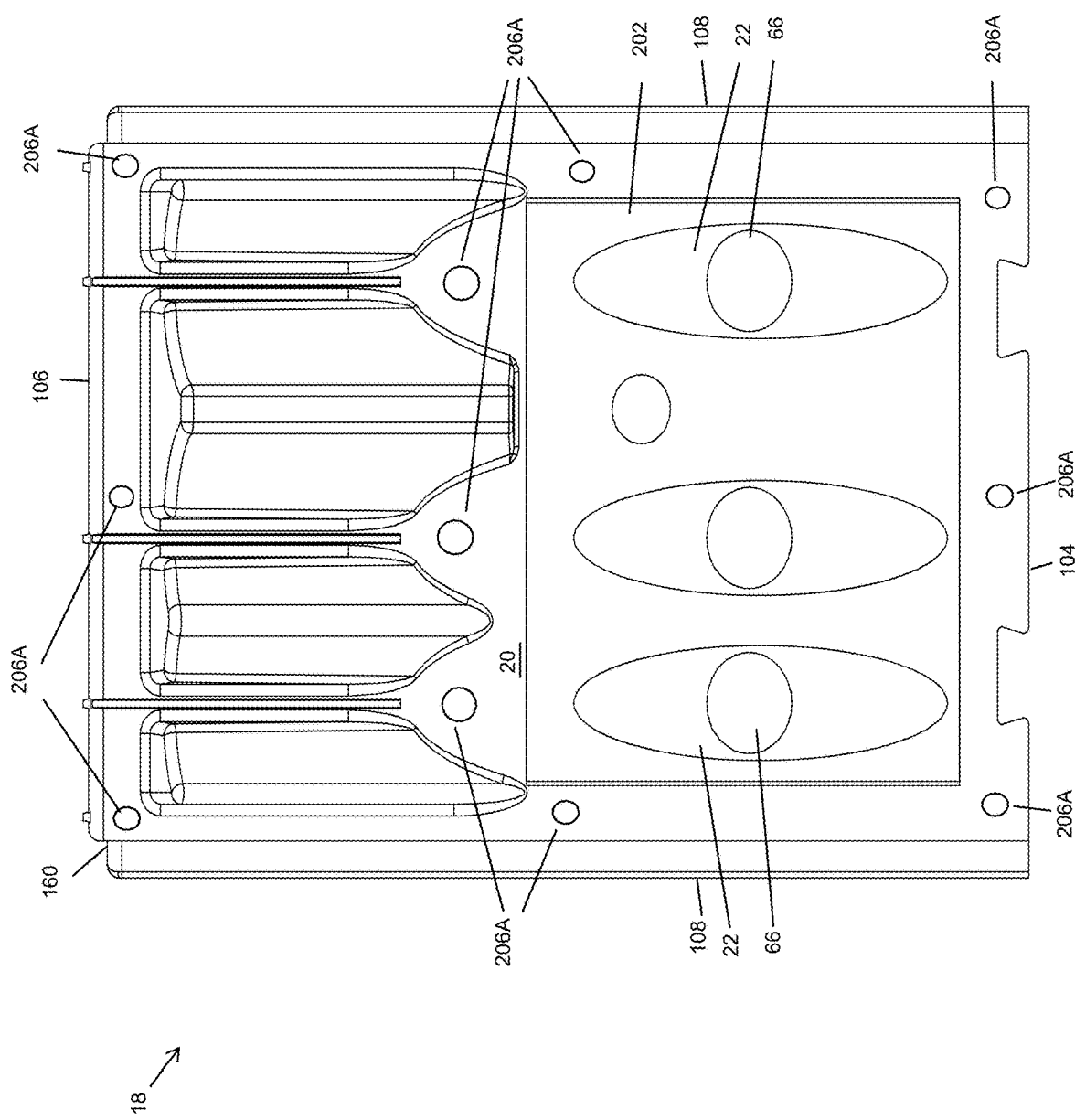
FIG. 4 is a front elevation view of the guide assembly shown in FIGS. 1-3 the view showing grip layer on the drilling face of the guide assembly.
Figure 5:
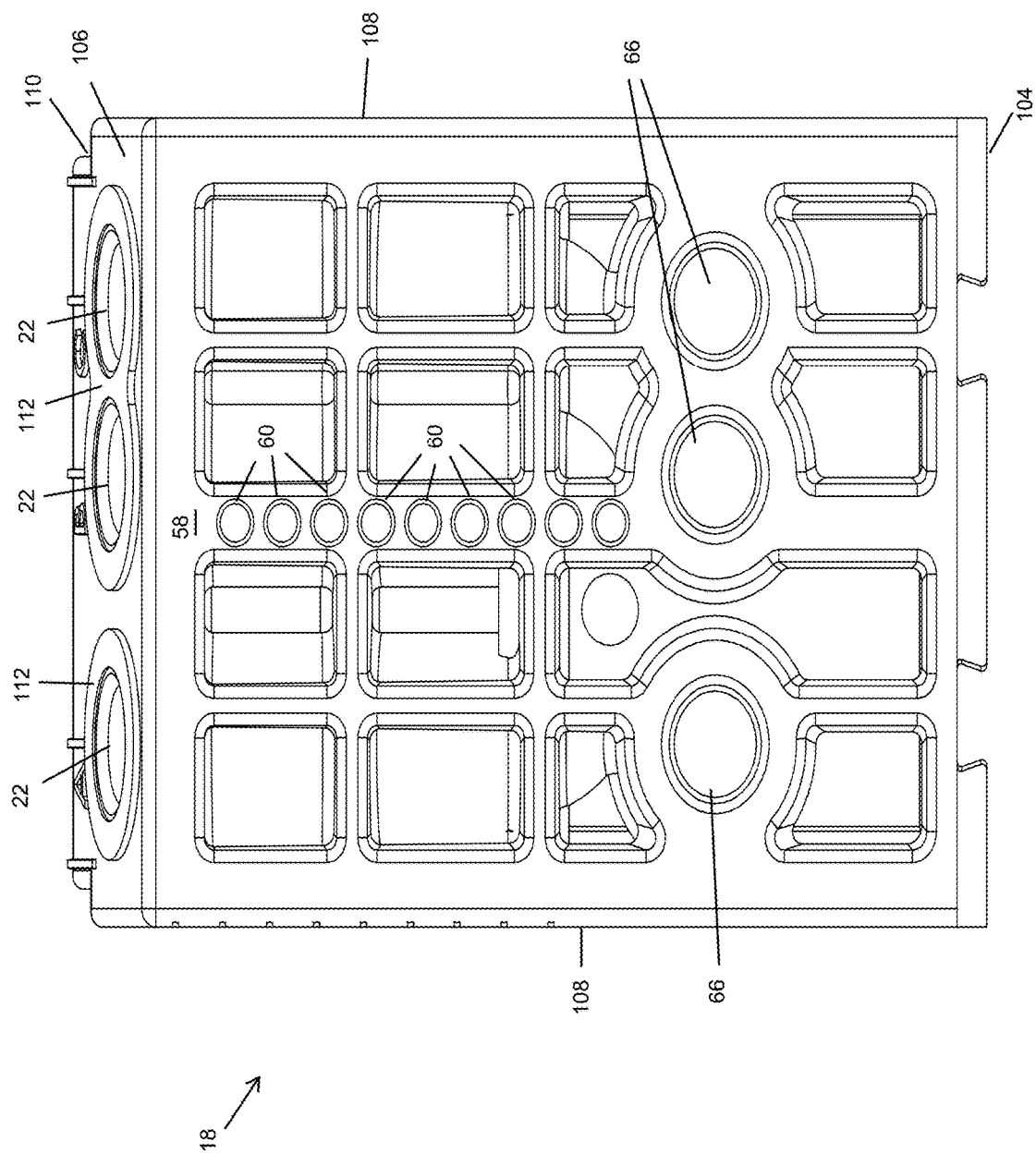
FIG. 5 is a rear elevation view of the guide assembly shown in FIGS. 1-4.
Figure 6:
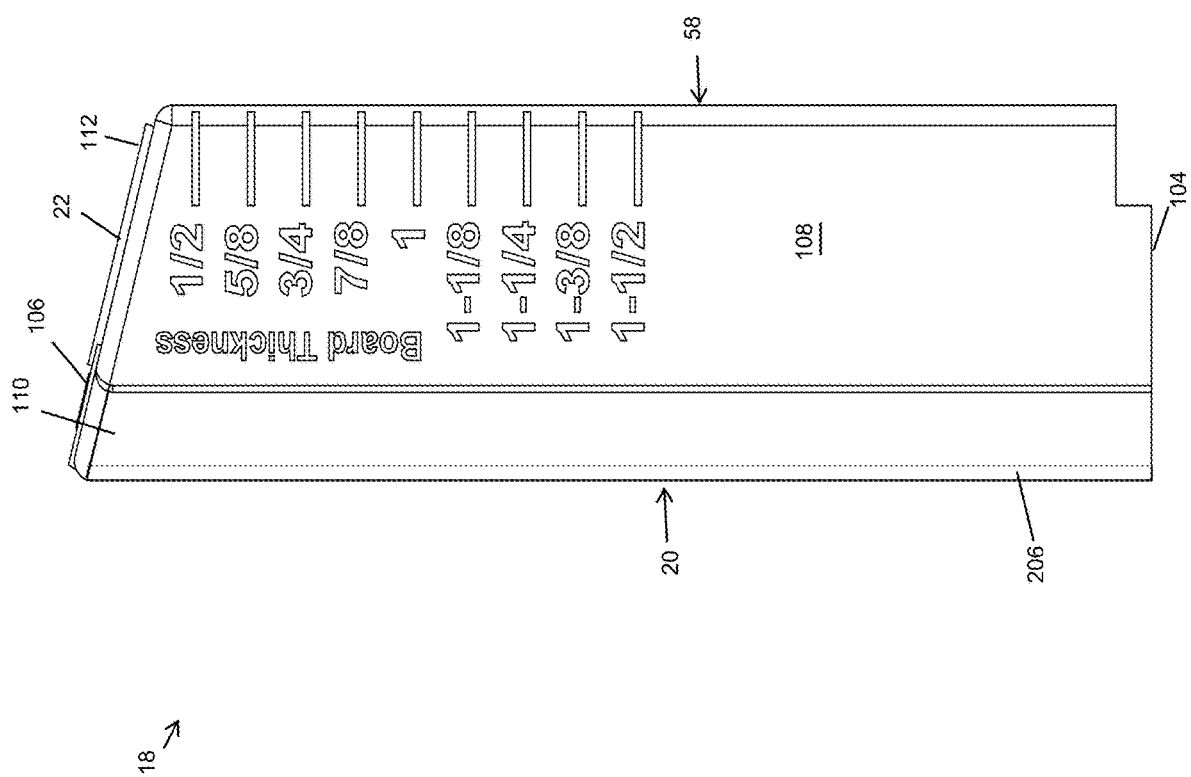
FIG. 6 is a left side elevation view of the guide assembly shown in FIGS. 1-5.
Figure 7:
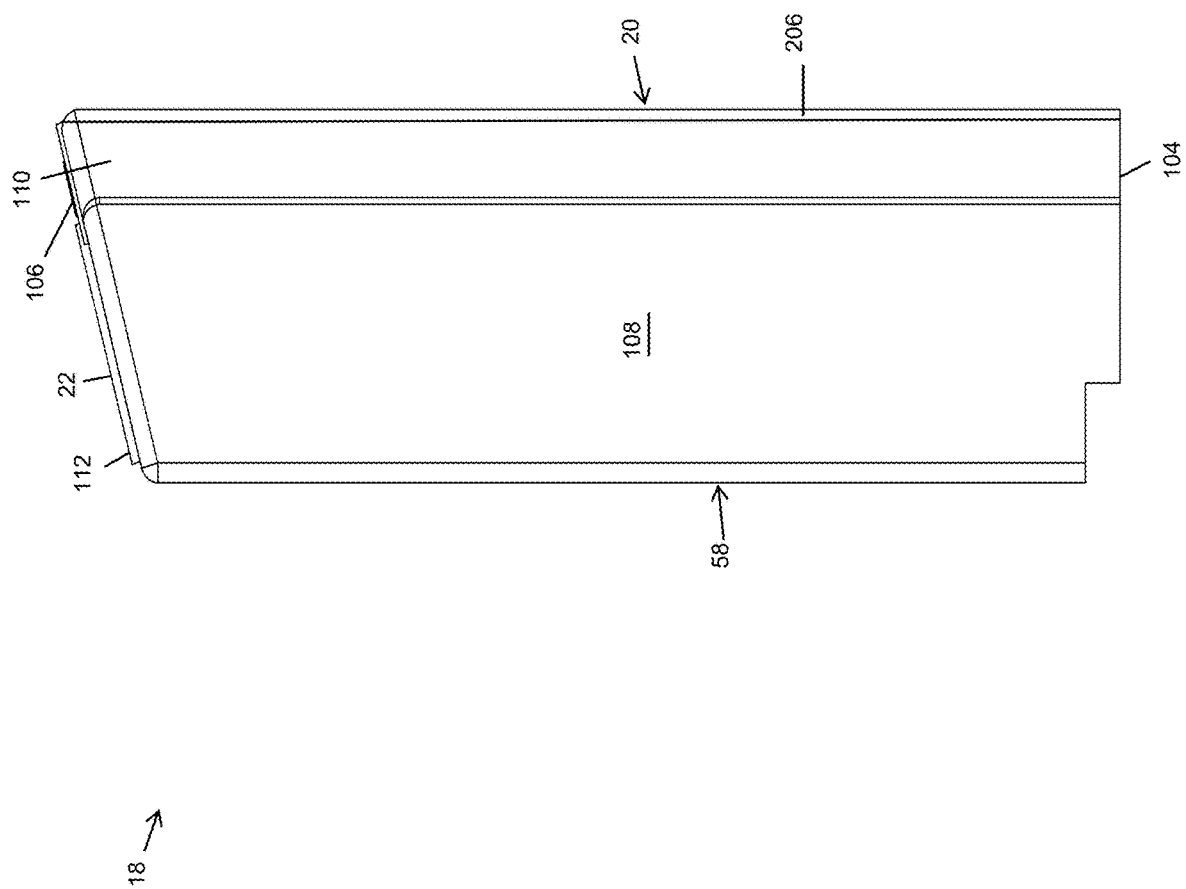
FIG. 7 is a right side elevation view of the guide assembly shown in FIGS. 1-6.
Figure 8:
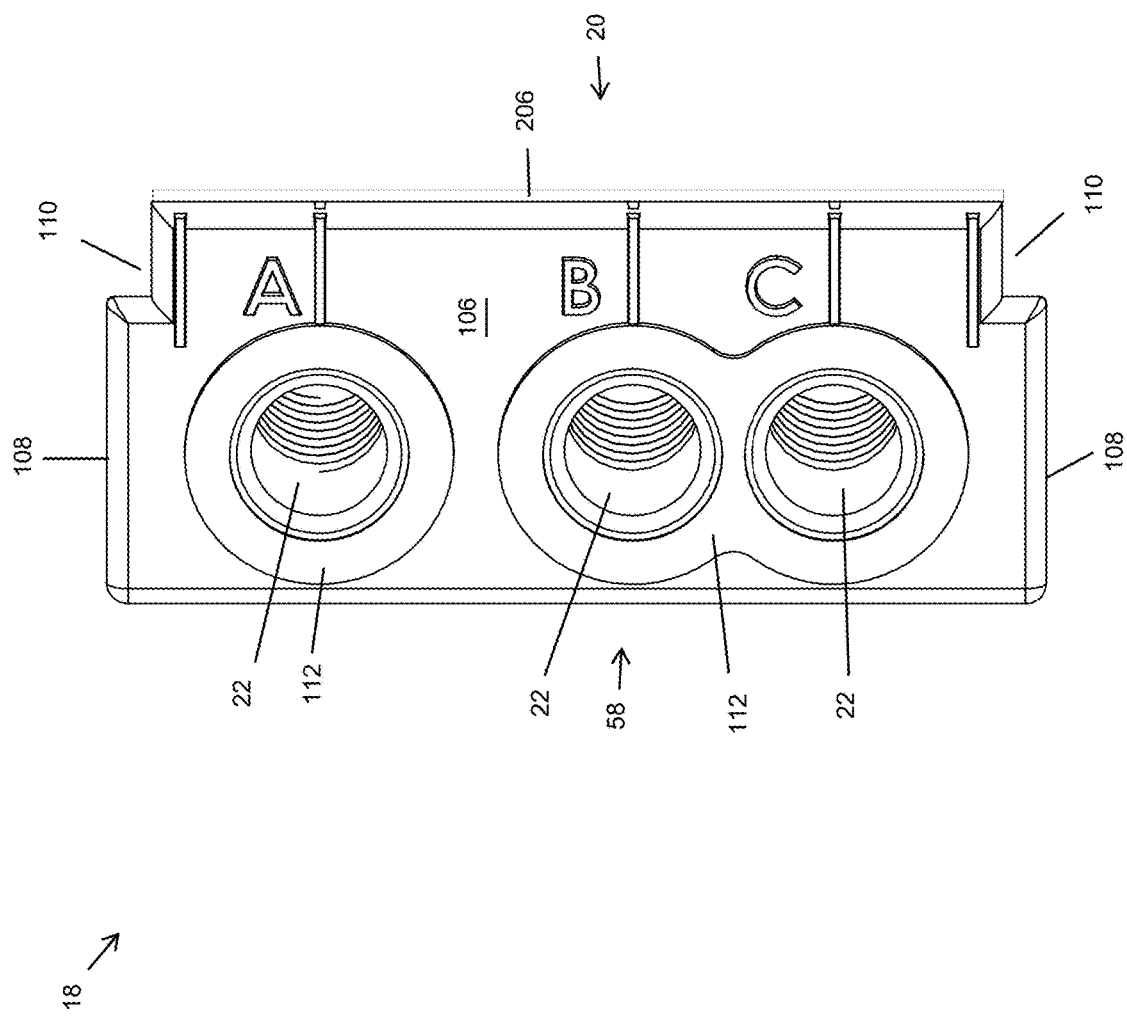
FIG. 8 is a top side elevation view of the guide assembly shown in FIGS. 1-7.
Figure 9:
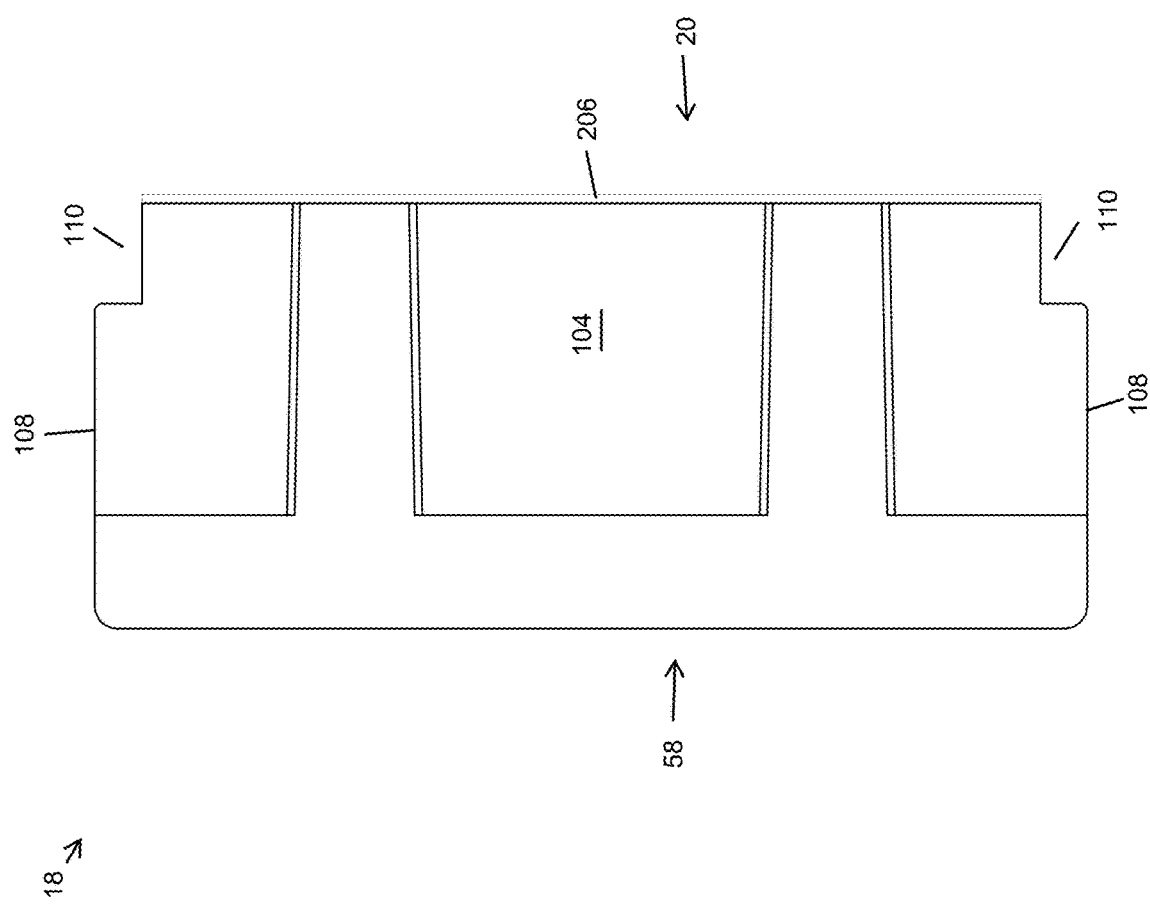
FIG. 9 is a bottom side elevation view of the guide assembly shown in FIGS. 1-8.
Figure 10:
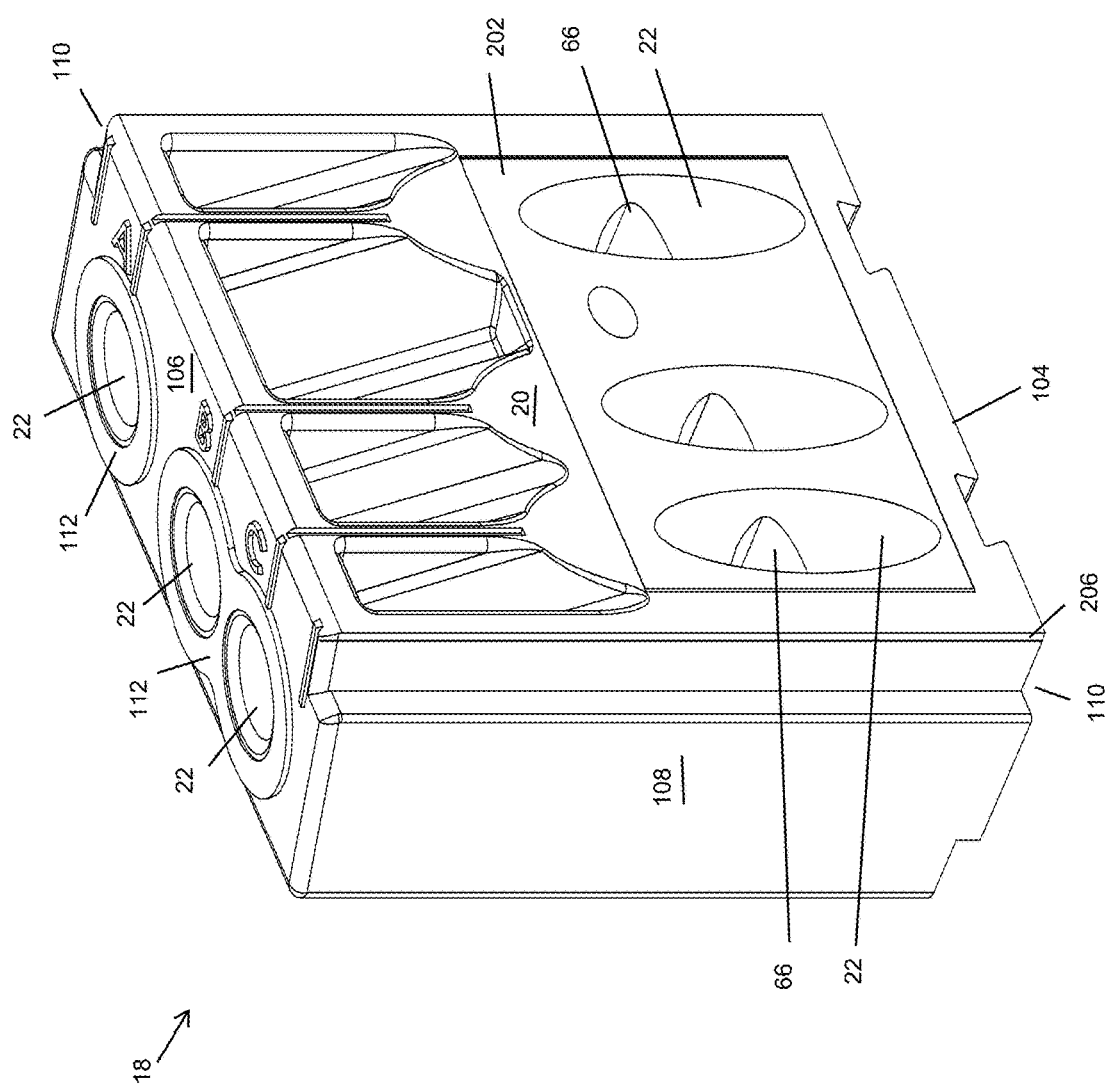
FIG. 10 is a top front perspective view of the guide assembly shown in FIGS. 1-9.
Figure 11:
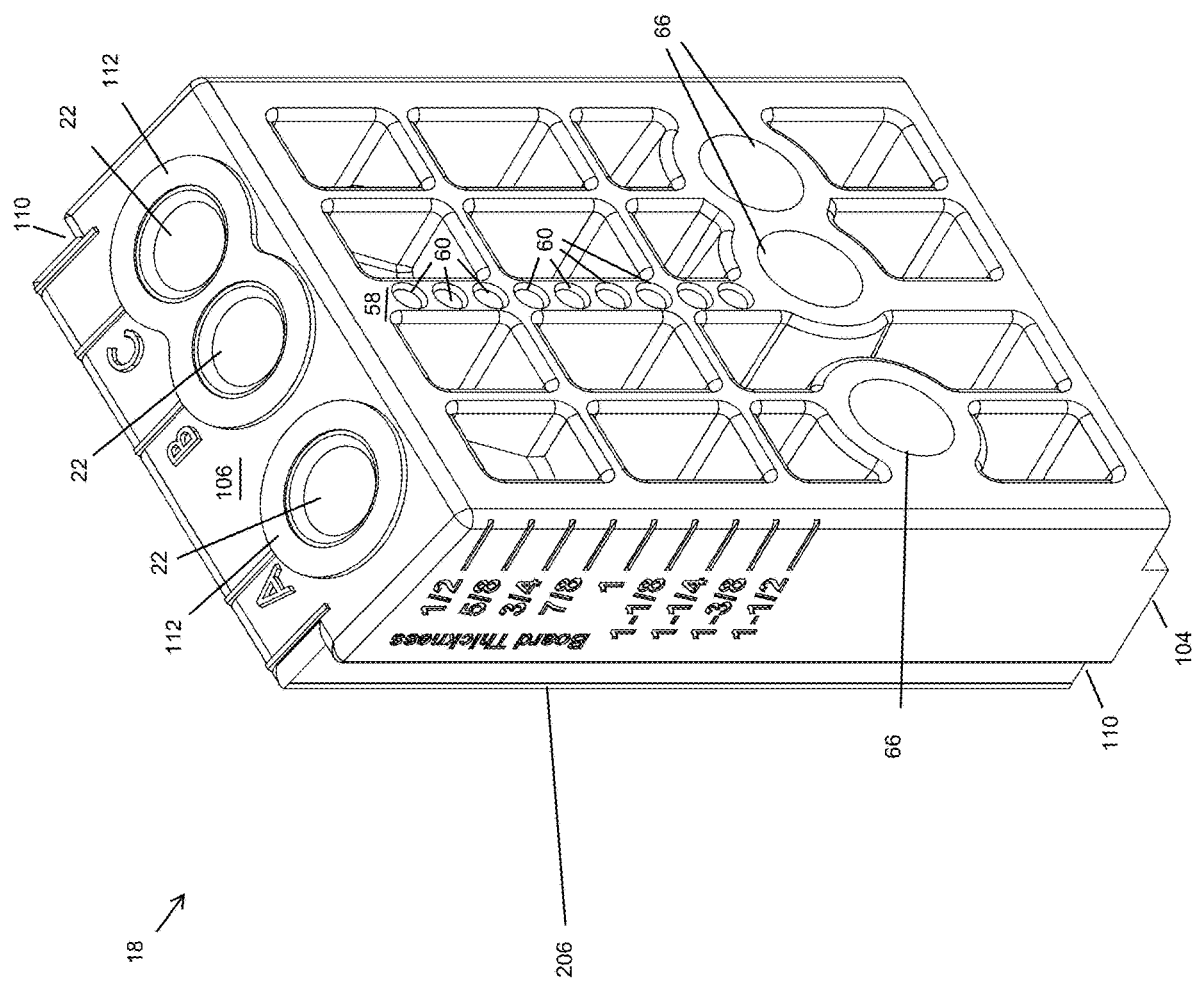
FIG. 11 is a top rear perspective view of the guide assembly shown in FIGS. 1-10.
Figure 12:
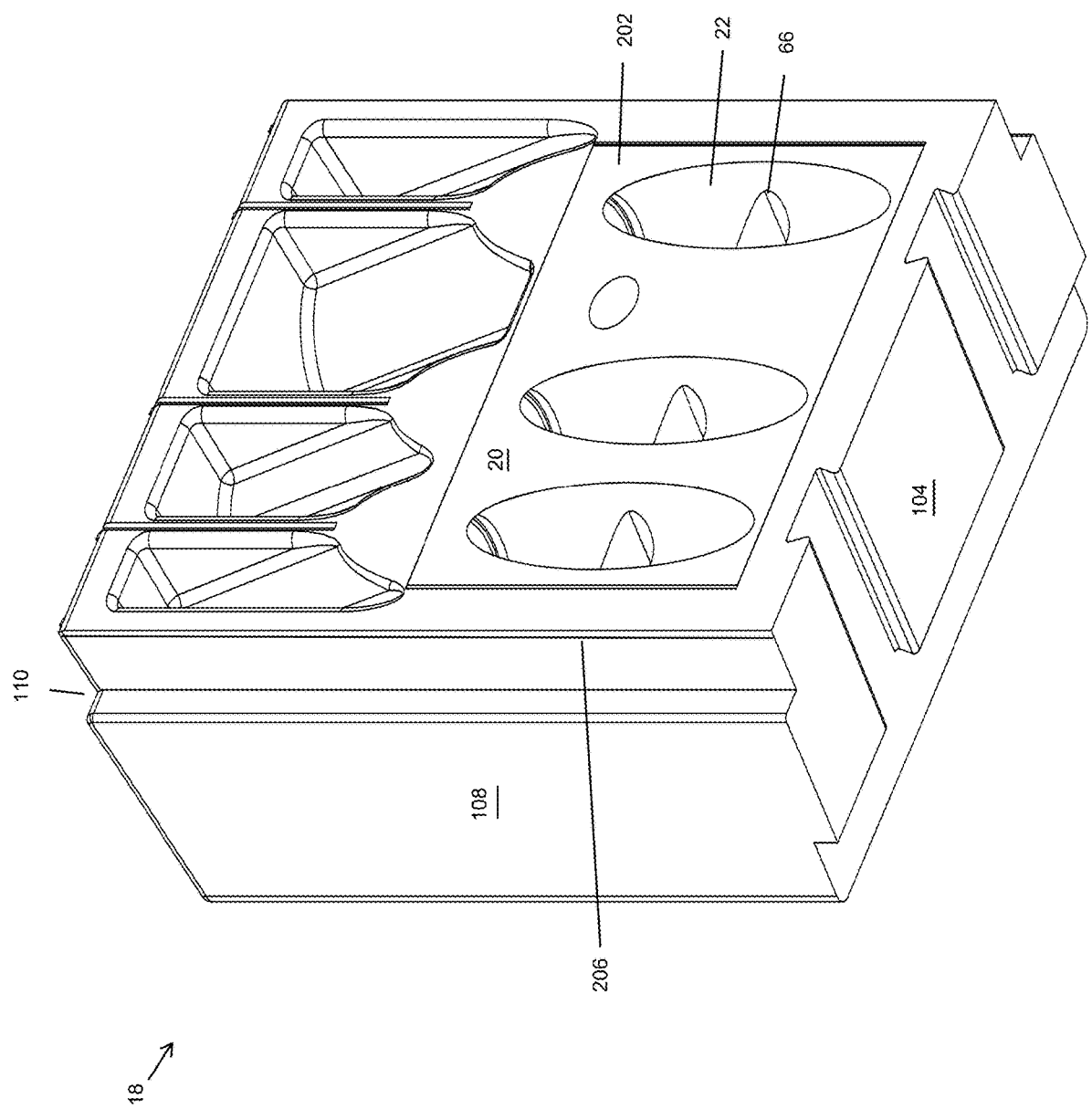
FIG. 12 is a bottom front perspective view of the guide assembly shown in FIGS. 1-11.
Figure 13:
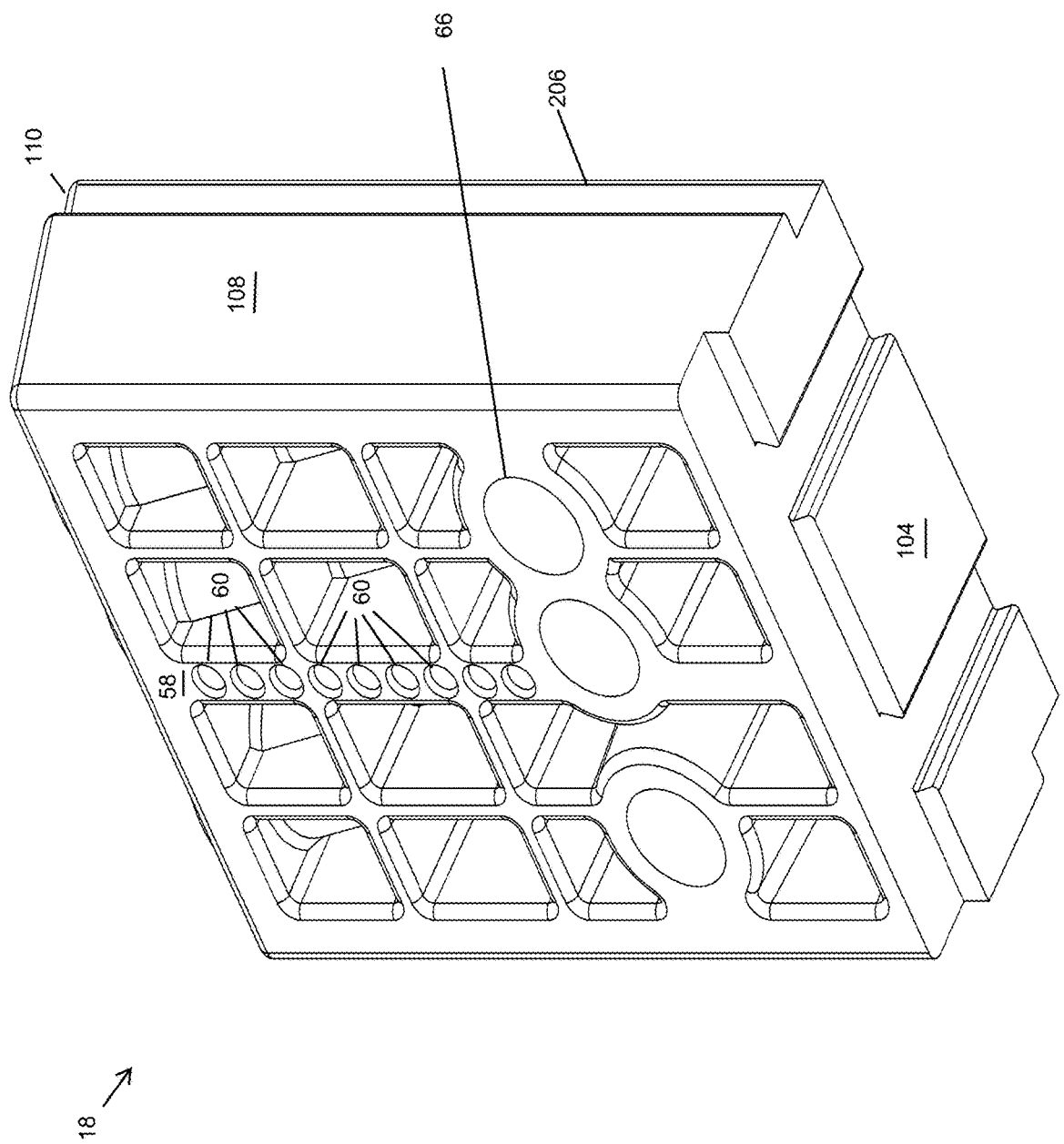
FIG. 13 is a bottom rear perspective view of the guide assembly shown in FIGS. 1-12.
Figure 14:
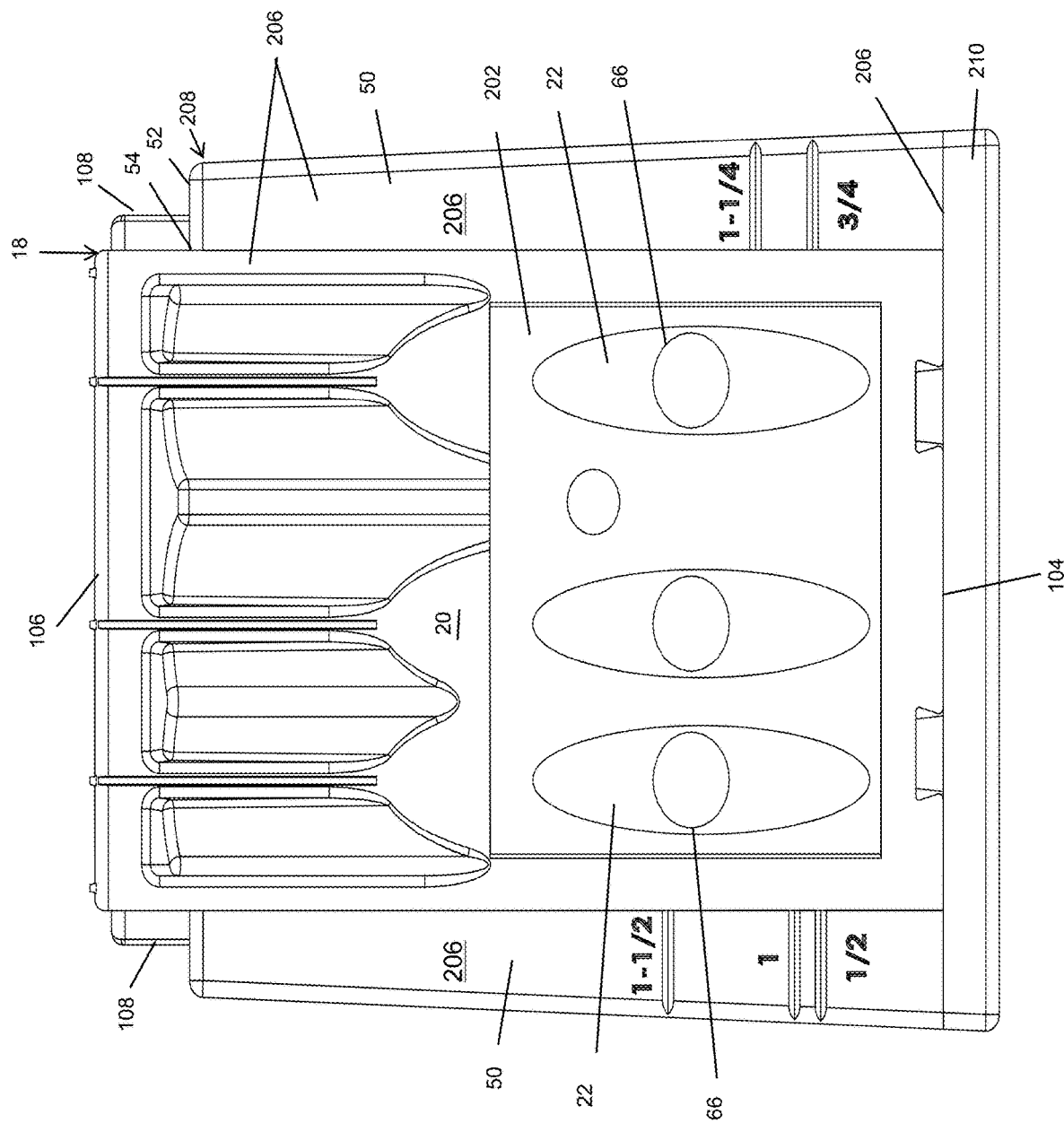
FIG. 14 is a front elevation view of the guide assembly shown in FIGS. 1-13 shown held in a portable base having lip positioned at its lower end.
Figure 15:
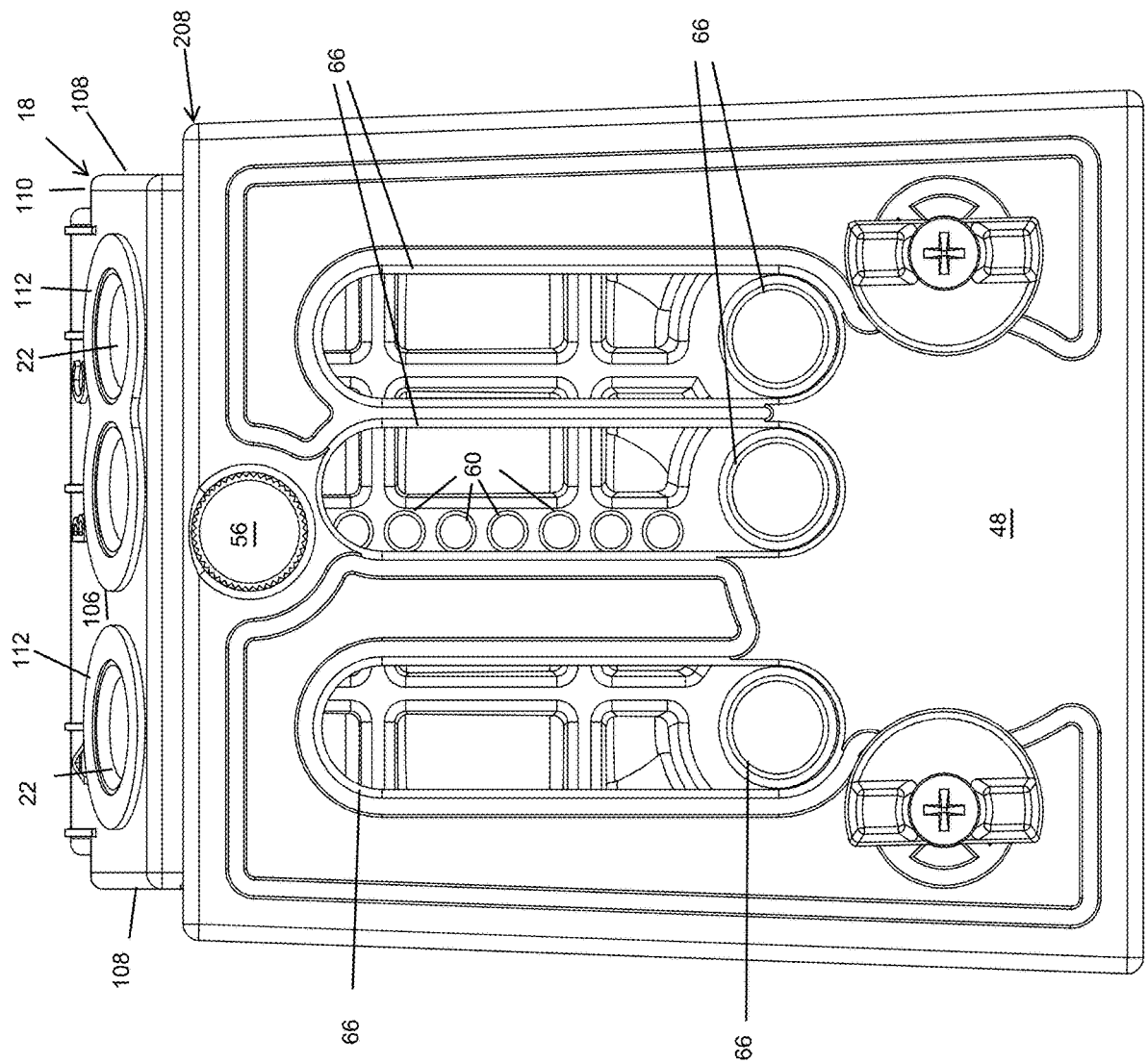
FIG. 15 is a rear elevation view of the guide assembly shown in FIGS. 1-14 shown held in a portable base.
Figure 16:
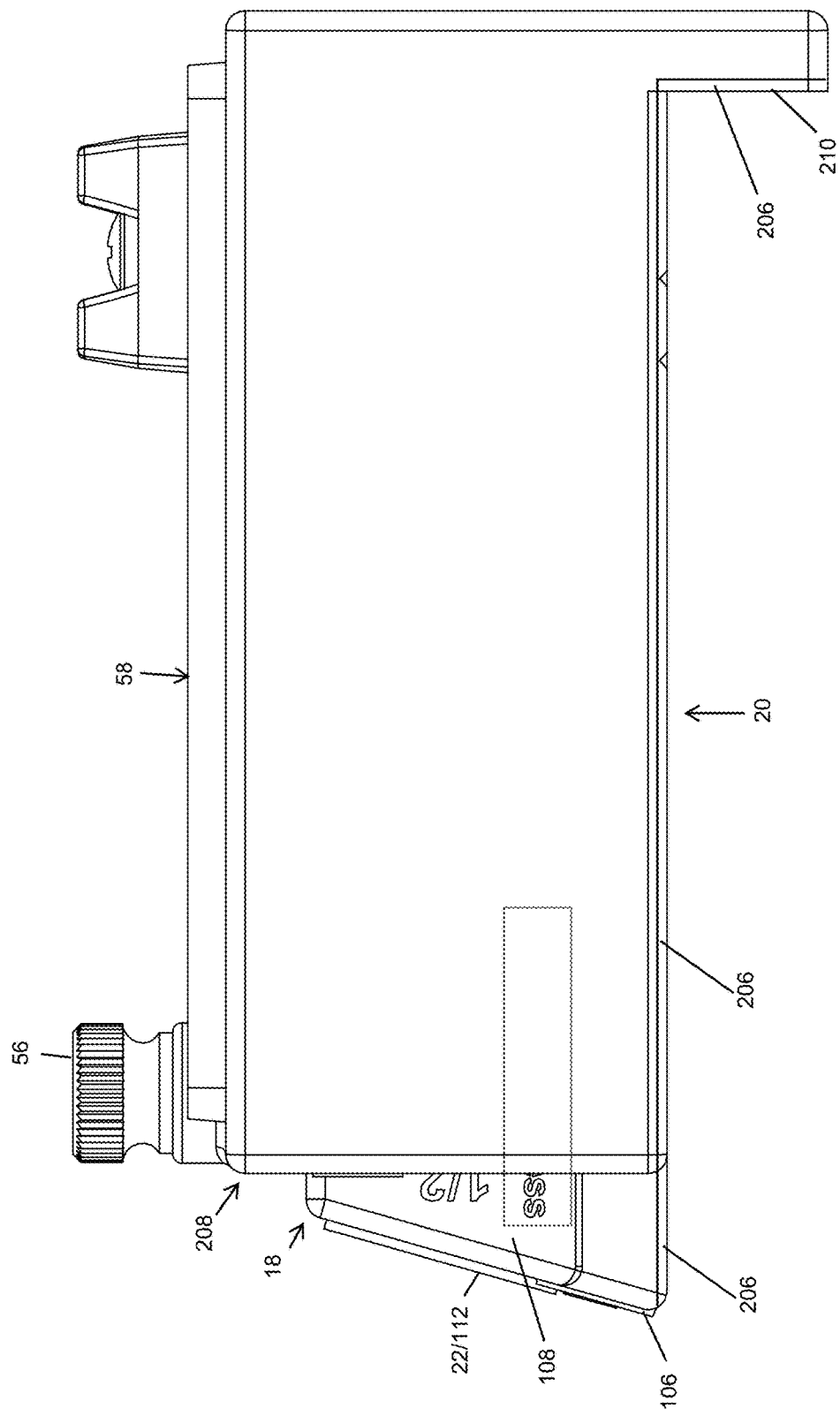
FIG. 16 is a left side elevation view of the guide assembly shown in FIGS. 1-15 shown held in a portable base having lip positioned at its lower end.
Figure 17:
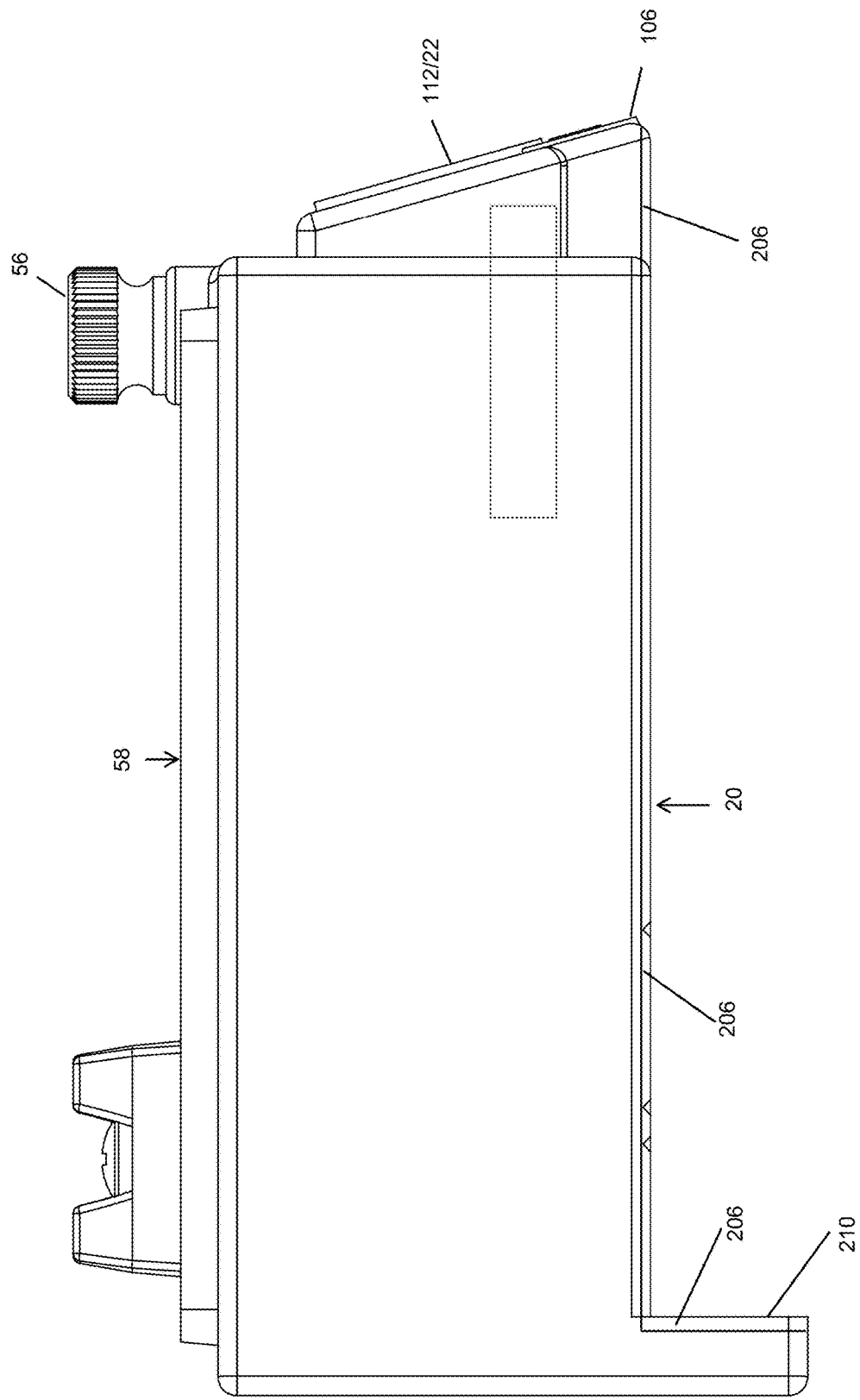
FIG. 17 is a right side elevation view of the guide assembly shown in FIGS. 1-16 shown held in a portable base having lip positioned at its lower end.
Figure 18:
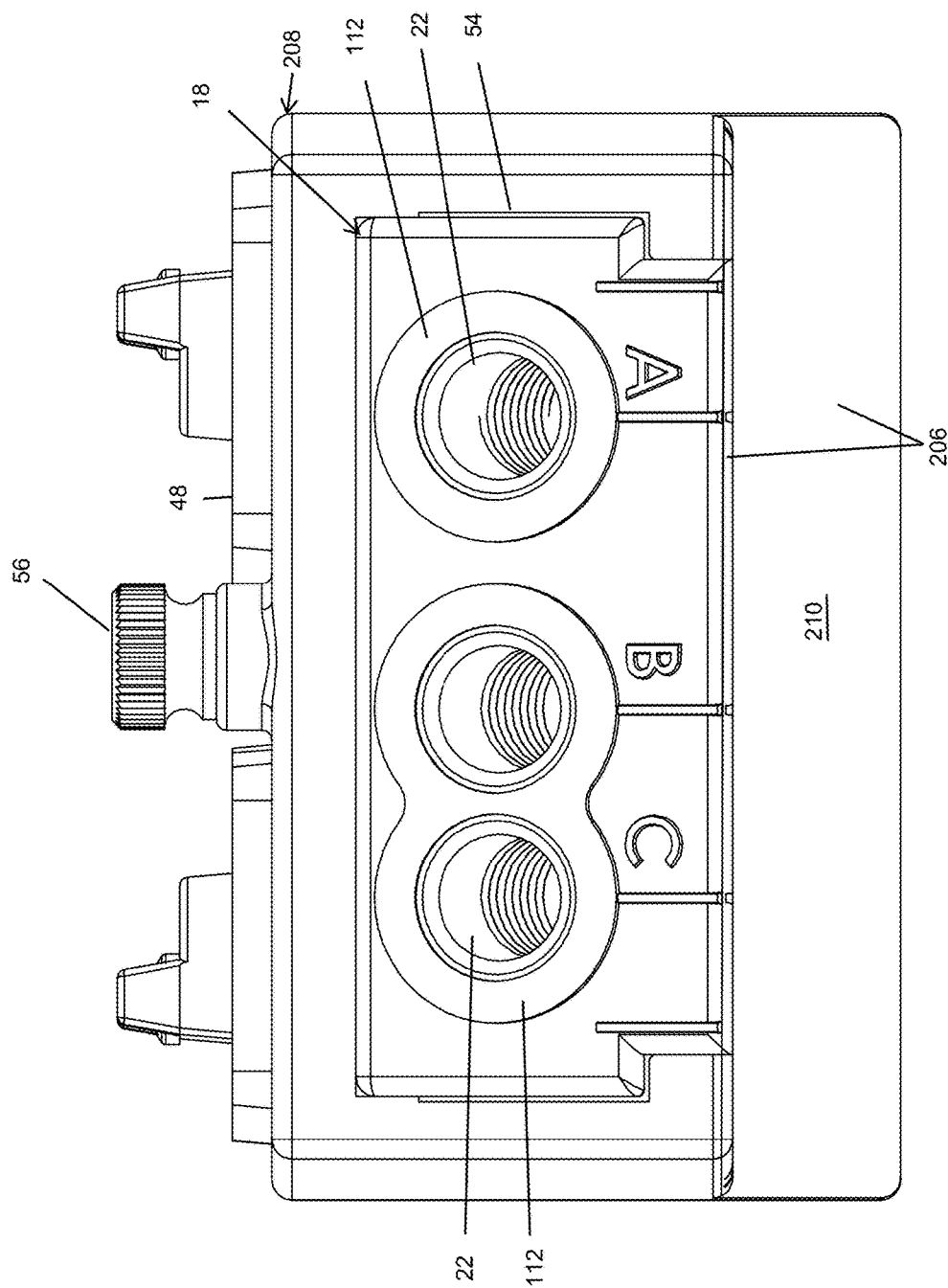
FIG. 18 is a top side elevation view of the guide assembly shown in FIGS. 1-17 shown held in a portable base having lip positioned at its lower end.
Figure 19:
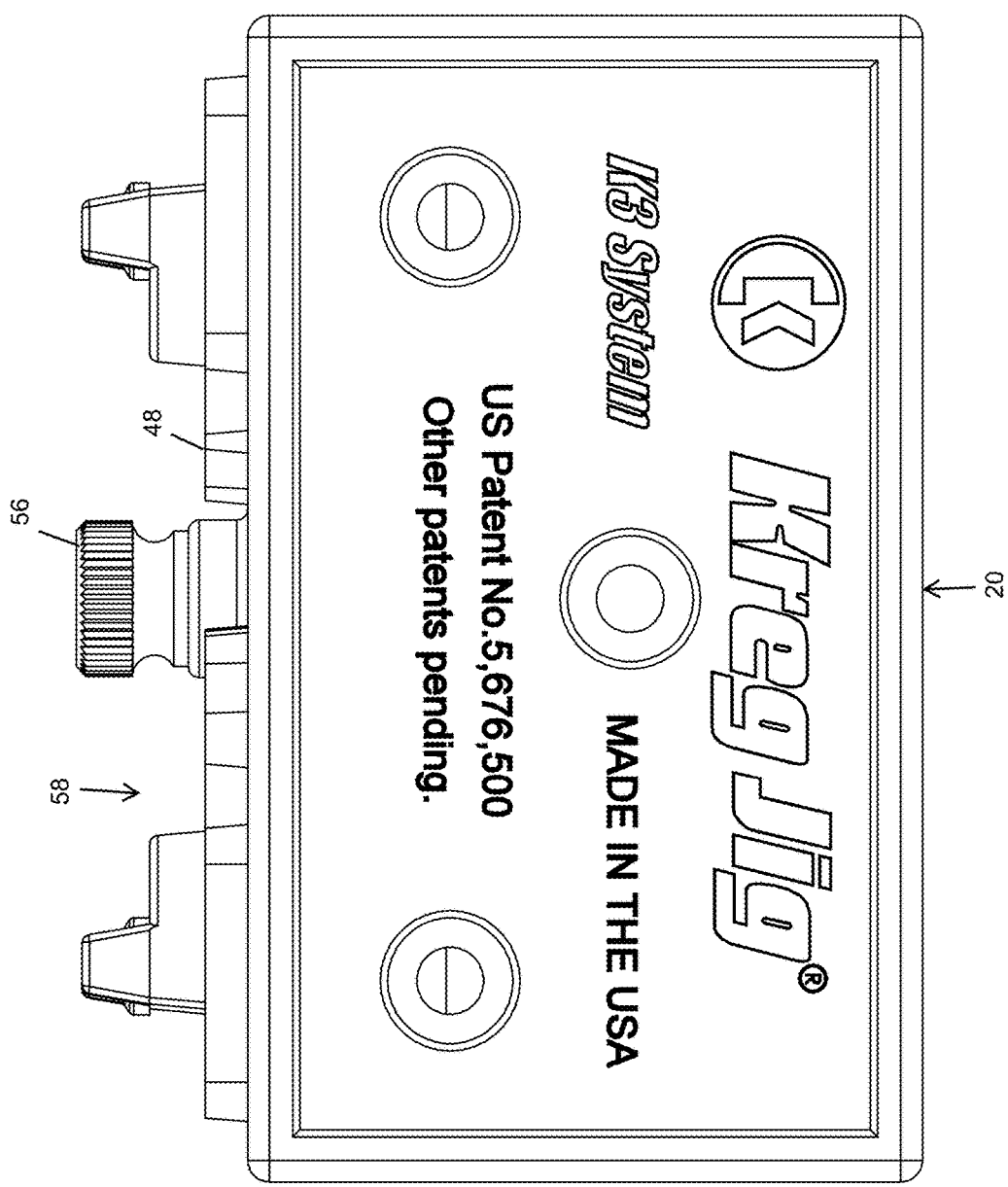
FIG. 19 is a bottom side elevation view of the guide assembly shown in FIGS. 1-18 shown held in a portable base having lip positioned at its lower end.
Figure 20:
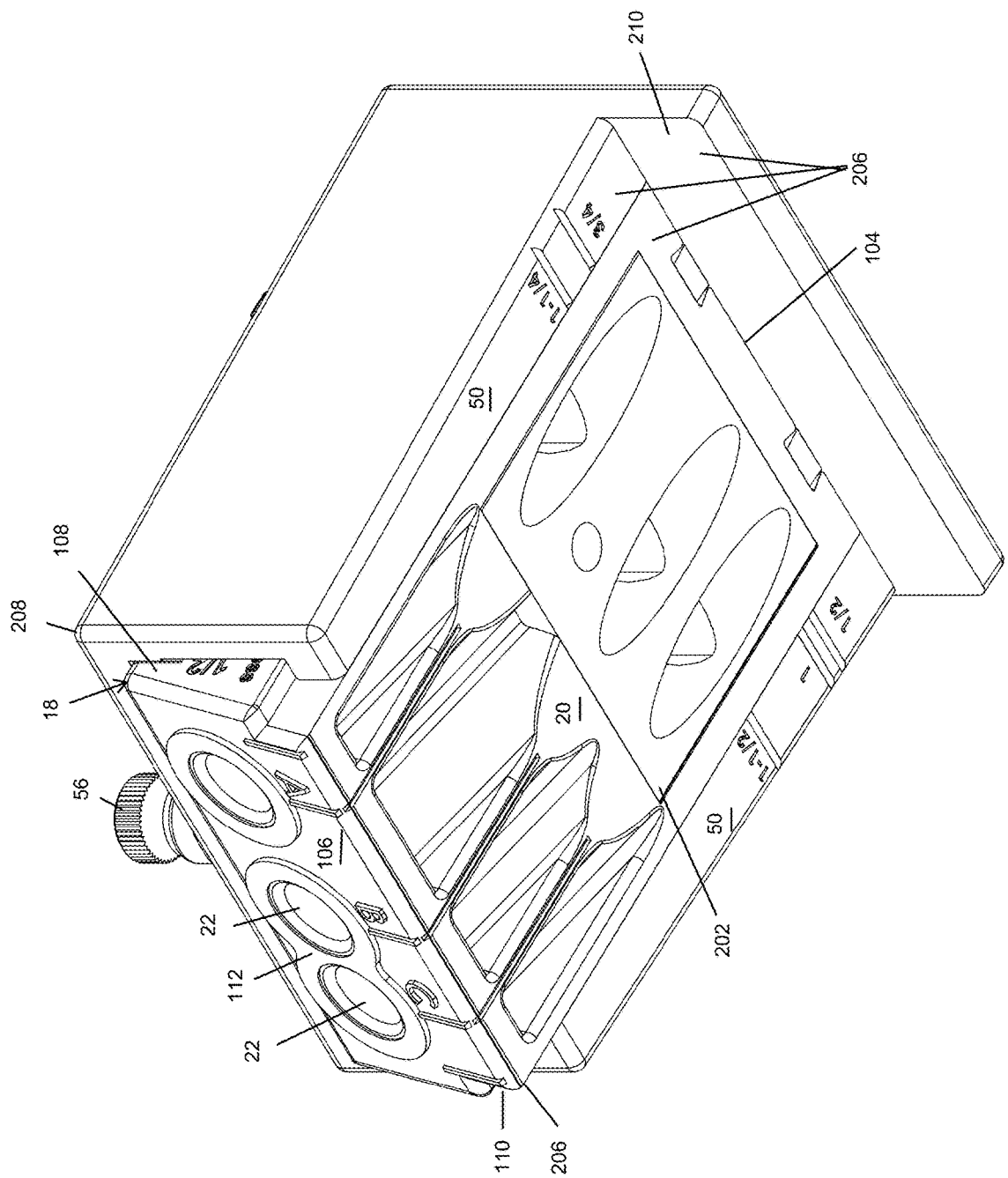
FIG. 20 is a front top perspective view of the guide assembly shown in FIGS. 1-19 shown held in a portable base having lip positioned at its lower end.
Figure 21:
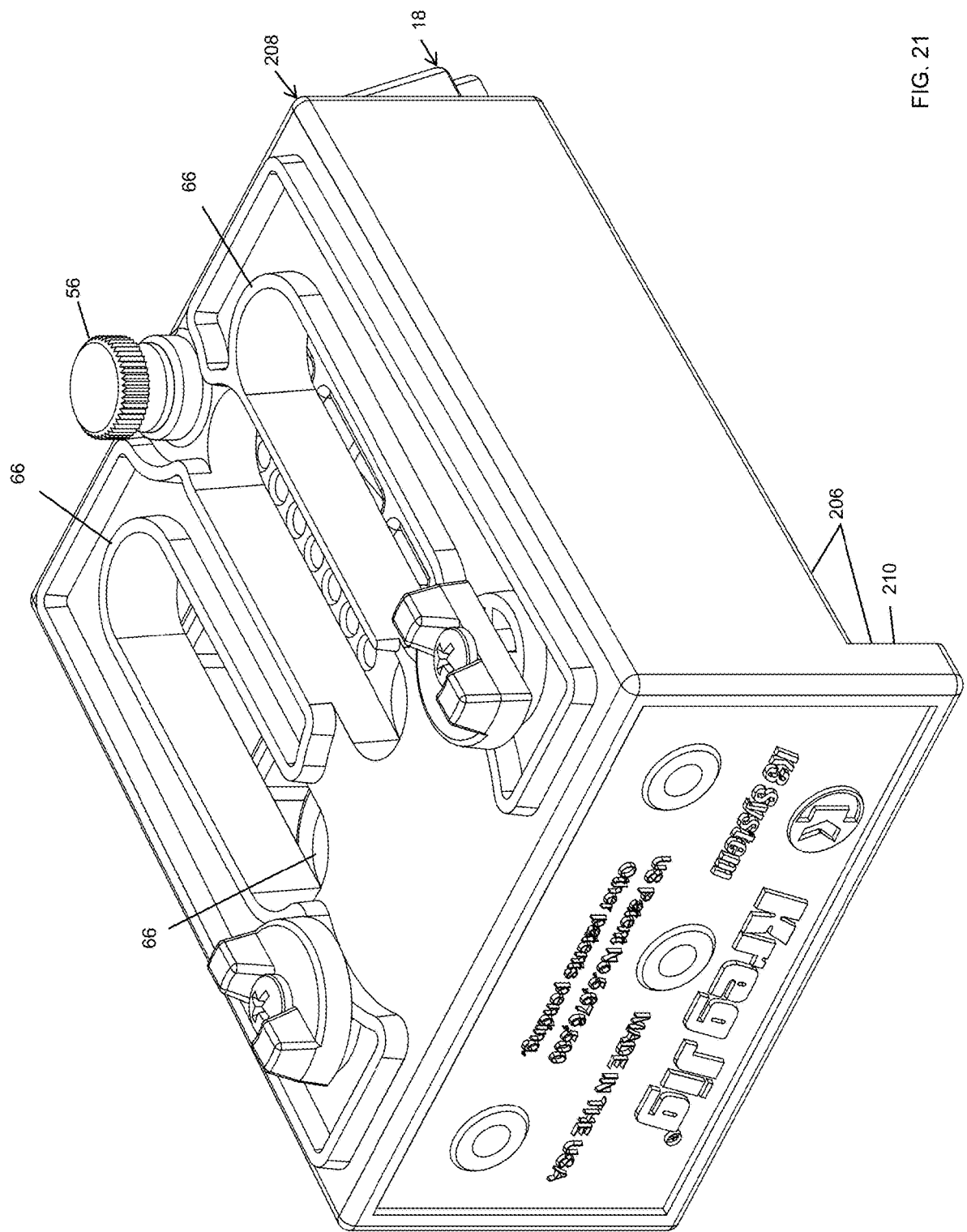
FIG. 21 is a rear bottom perspective view of the guide assembly shown in FIGS. 1-20 shown held in a portable base having lip positioned at its lower end.
Figure 22:
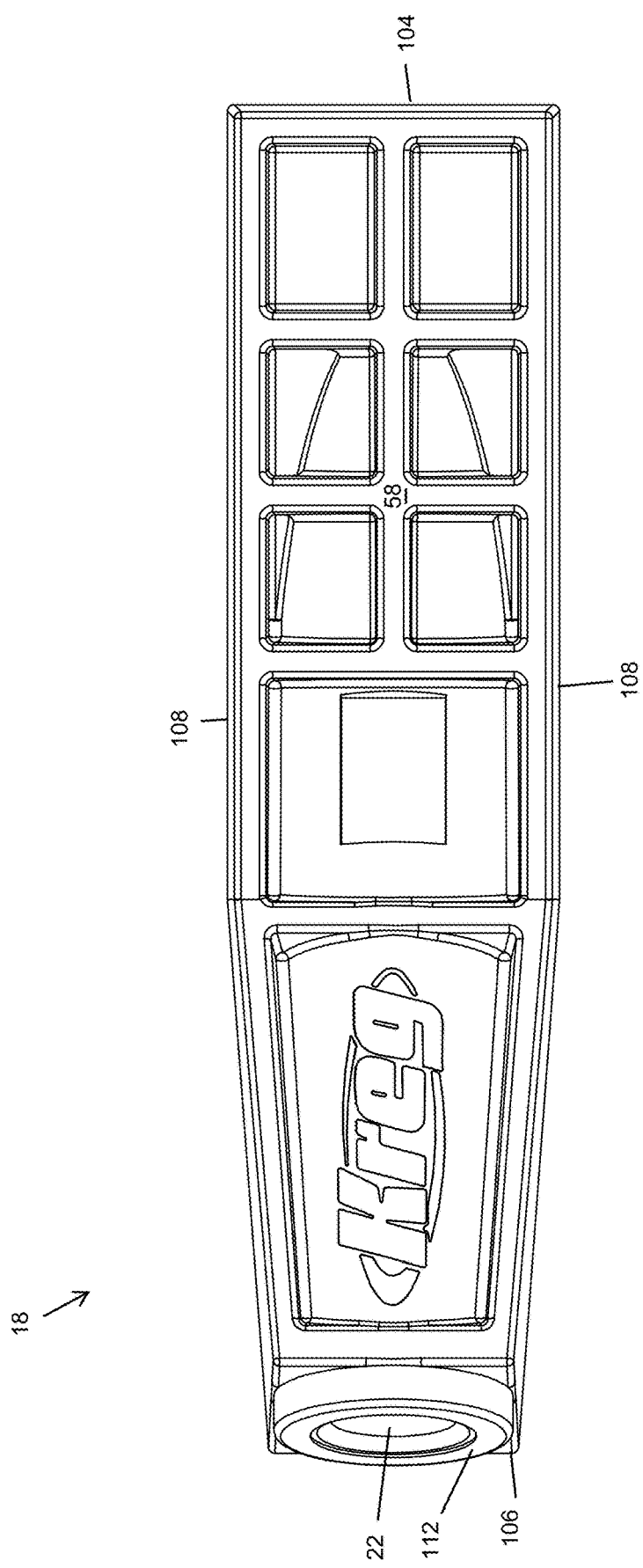
FIG. 22 is a top elevation view of a mini guide assembly having only a single drill guide.
Figure 23:
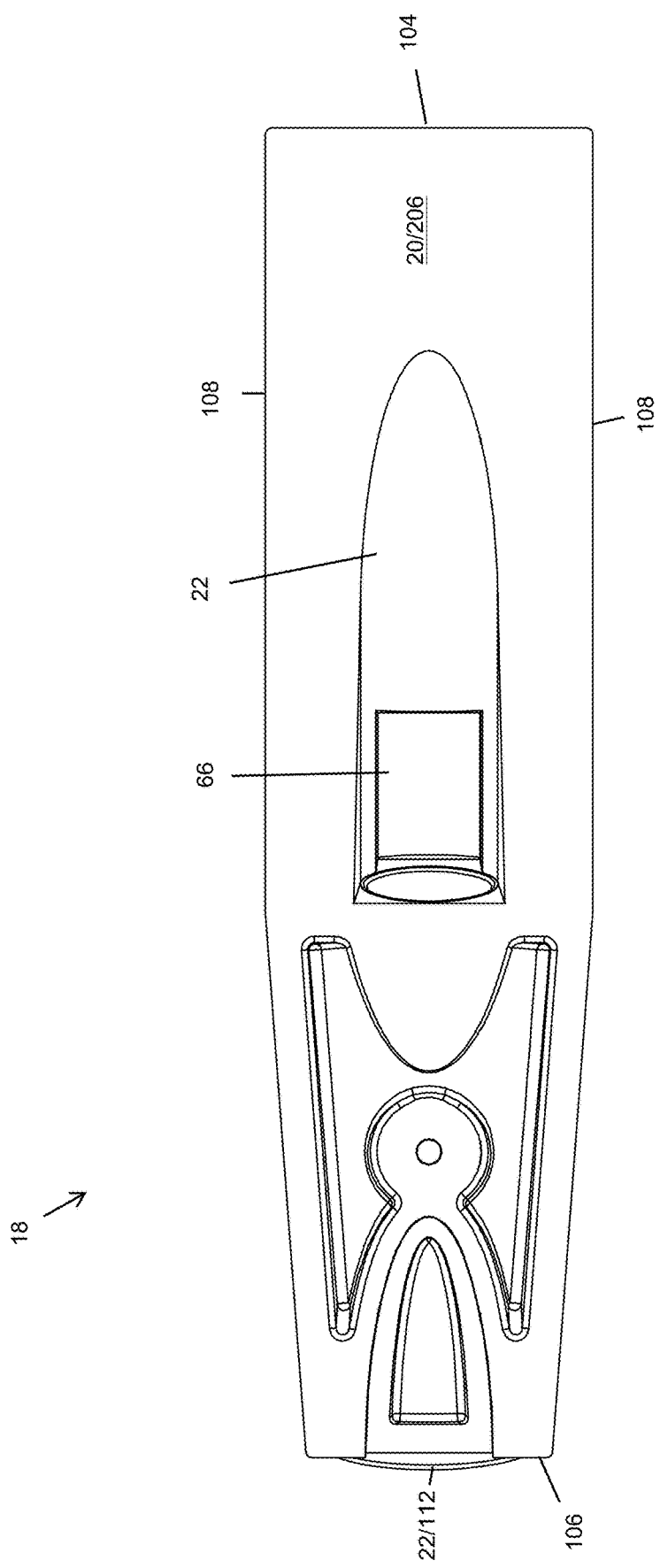
FIG. 23 is a bottom elevation view of a mini guide assembly having only a single drill guide shown in FIG. 22, the view showing a grip layer on the drilling face of the guide assembly.
Figure 24:
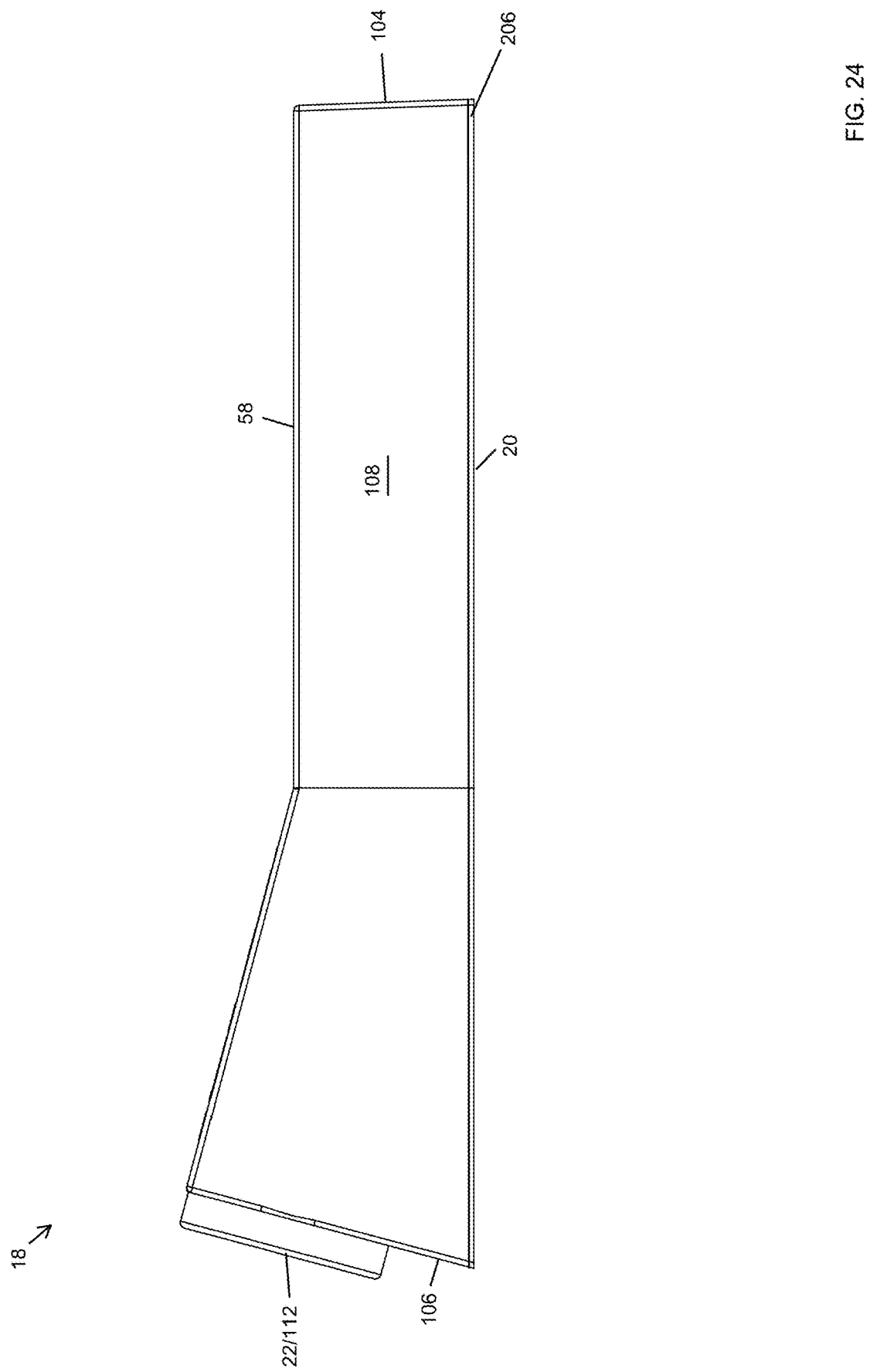
FIG. 24 is a side elevation view of a mini guide assembly having only a single drill guide shown in FIG. 22-23, the view showing a grip layer on the drilling face of the guide assembly.
Figure 25:
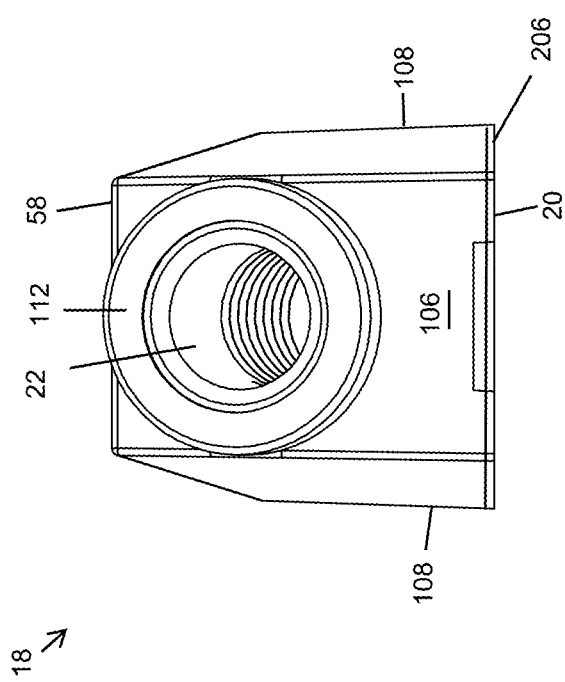
FIG. 25 is a front elevation view of a mini guide assembly having only a single drill guide shown in FIG. 22-24, the view showing a grip layer on the drilling face of the guide assembly.
Figure 26:
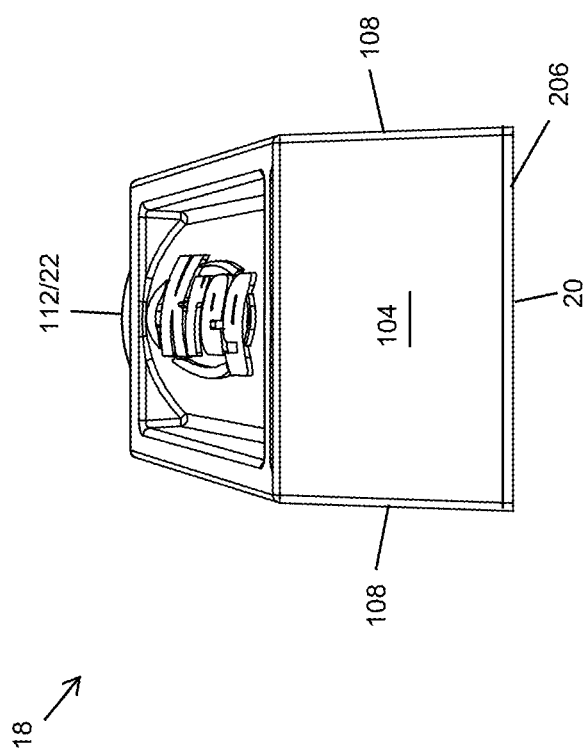
FIG. 26 is a rear elevation view of a mini guide assembly having only a single drill guide shown in FIG. 22-25, the view showing a grip layer on the drilling face of the guide assembly.
Figure 27:
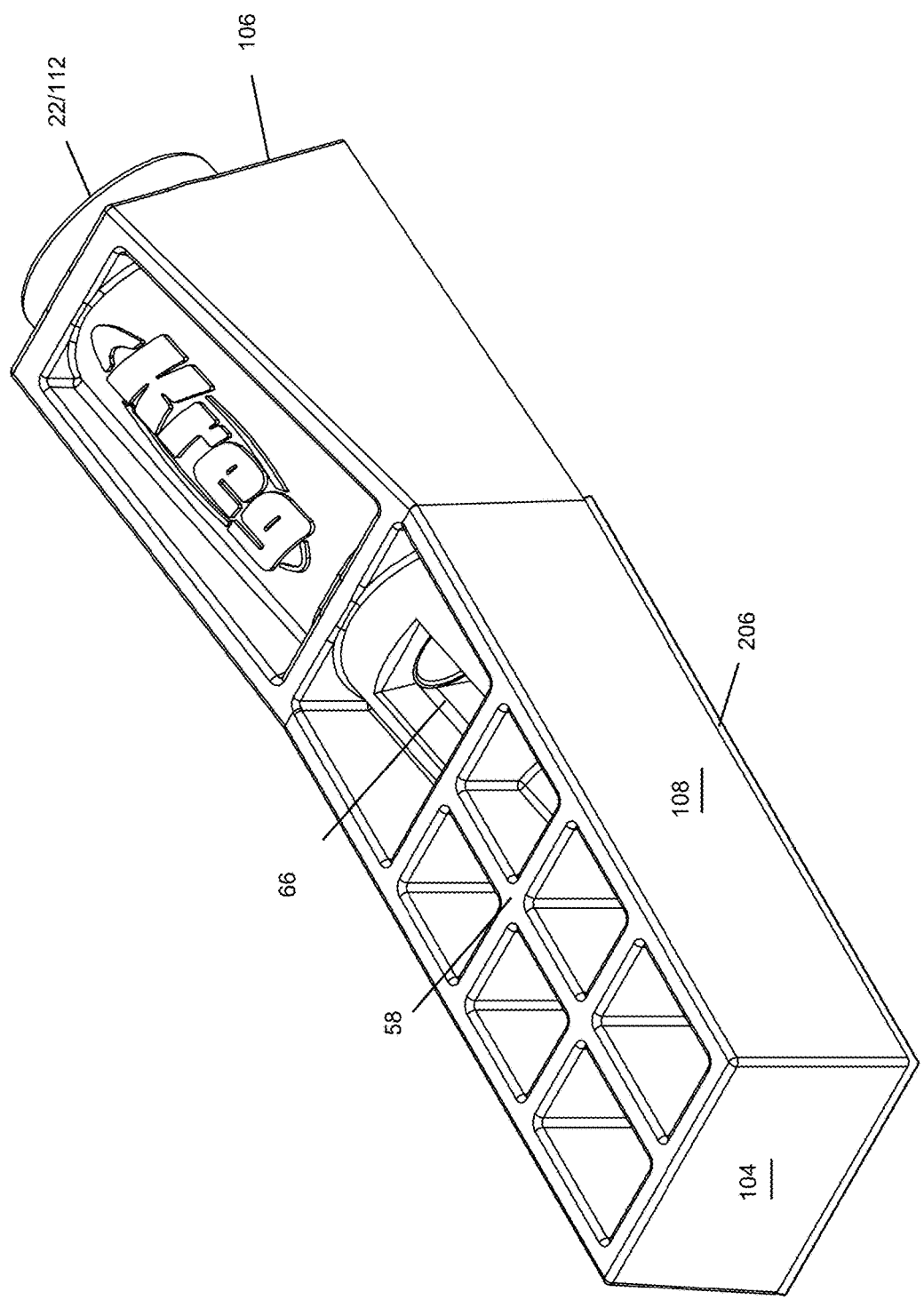
FIG. 27 is a rear top perspective view of a mini guide assembly having only a single drill guide shown in FIG. 22-26, the view showing a grip layer on the drilling face of the guide assembly.
Figure 28:
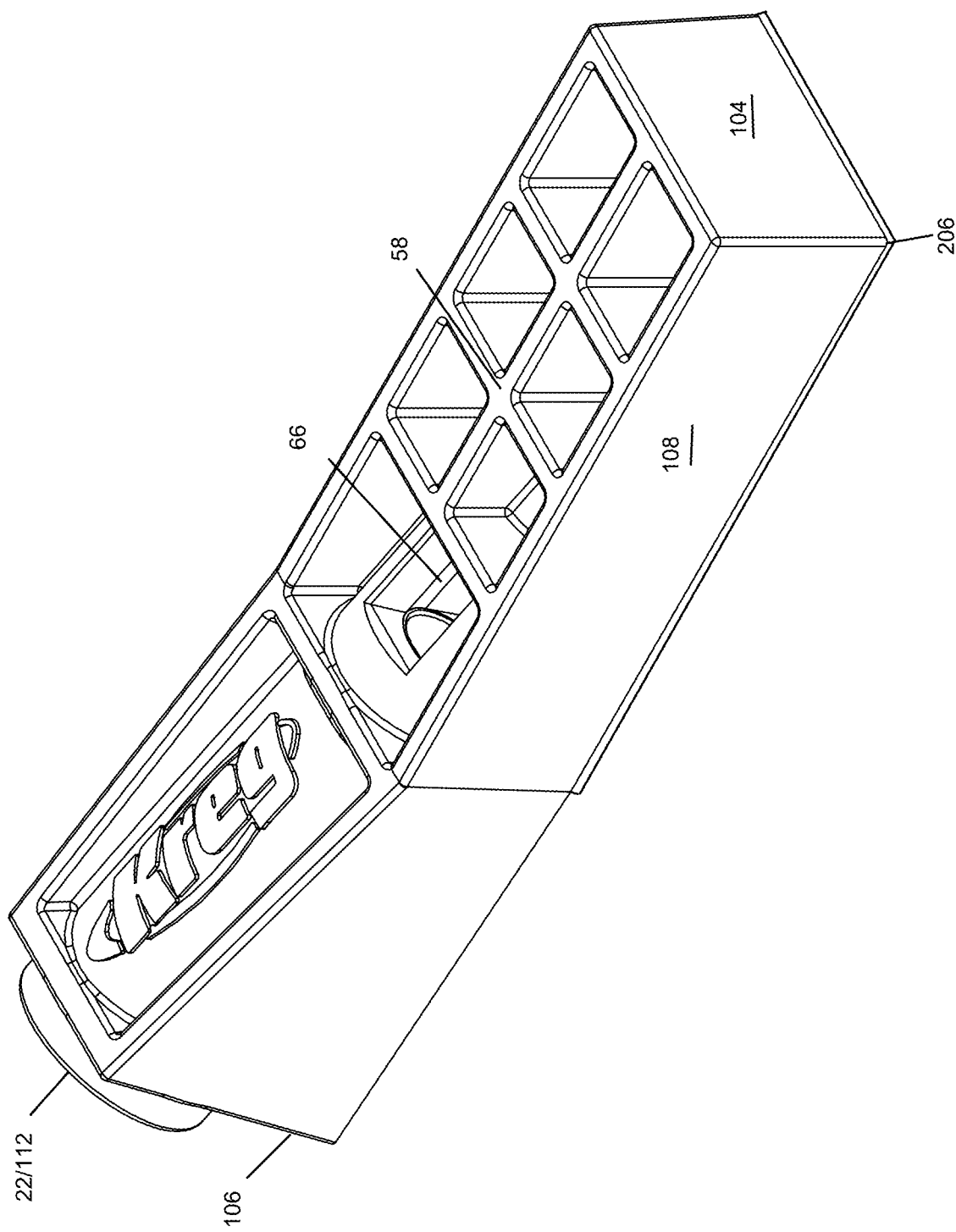
FIG. 28 is another rear top perspective view of a mini guide assembly having only a single drill guide shown in FIG. 22-27, the view showing a grip layer on the drilling face of the guide assembly.
Figure 29:
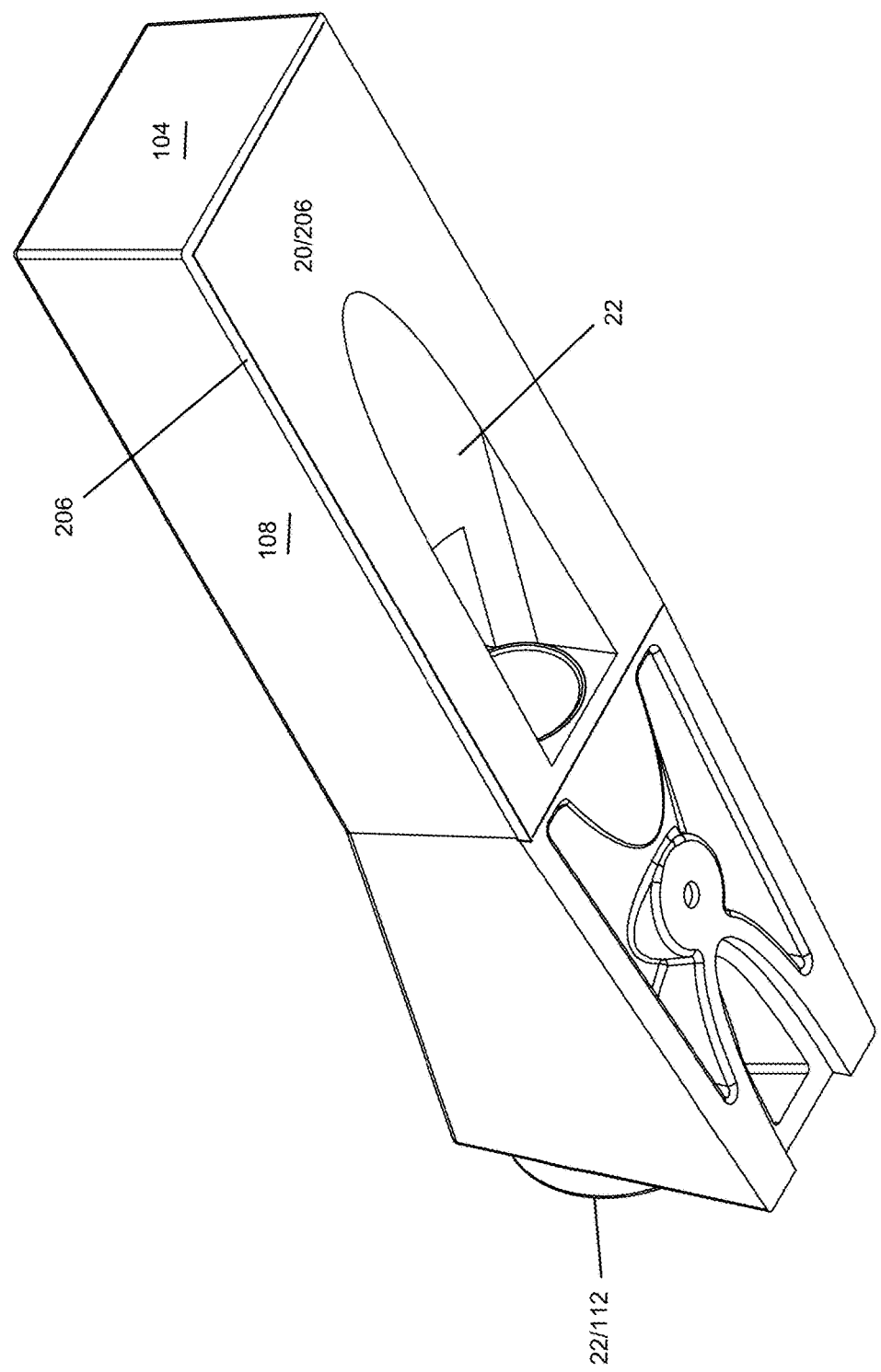
FIG. 29 is rear bottom perspective view of a mini guide assembly having only a single drill guide shown in FIG. 22-28, the view showing a grip layer on the drilling face of the guide assembly.
Figure 30:
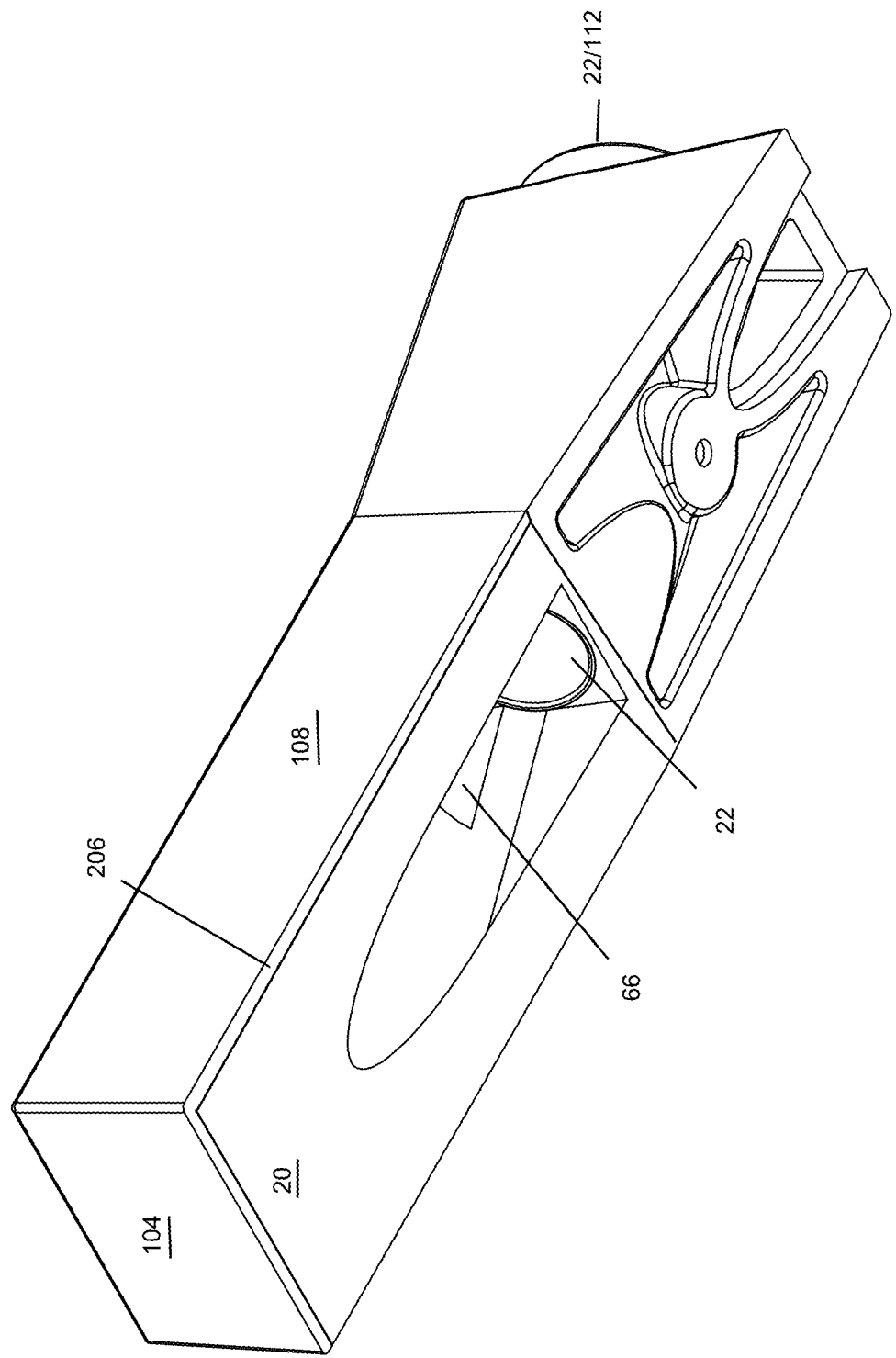
FIG. 30 is another rear bottom perspective view of a mini guide assembly having only a single drill guide shown in FIG. 22-29, the view showing a grip layer on the drilling face of the guide assembly.
Figure 31:
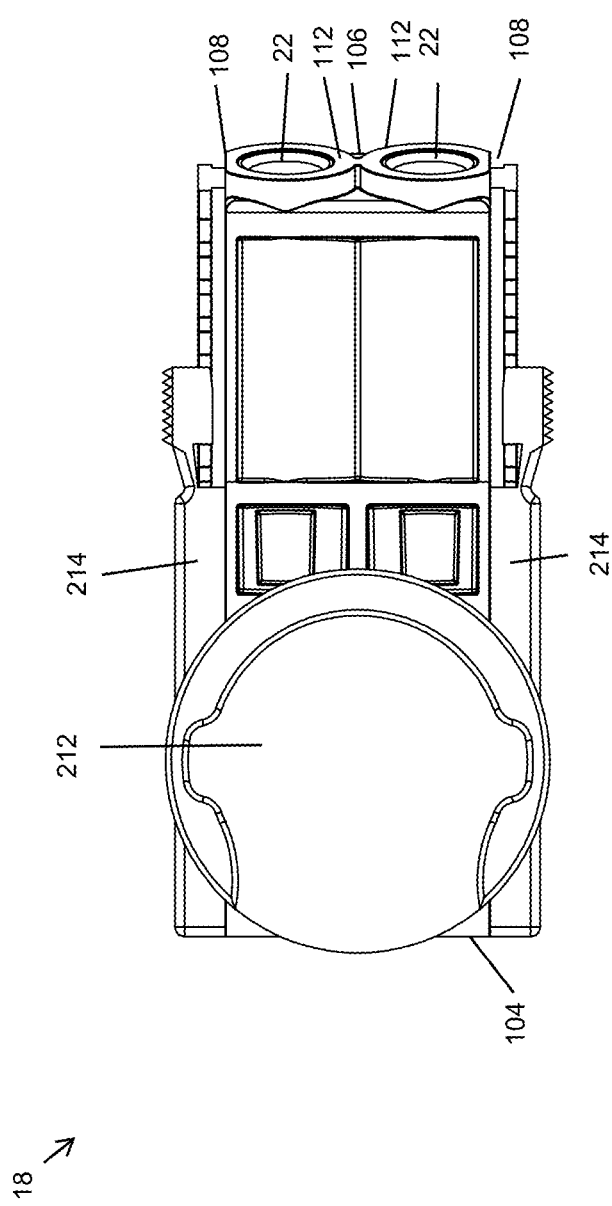
FIG. 31 is a top elevation view of a guide assembly having a pair of drill guides and an attachment member on its top side and a pair of alignment members having a lip connected adjacent its sides.
Figure 32:
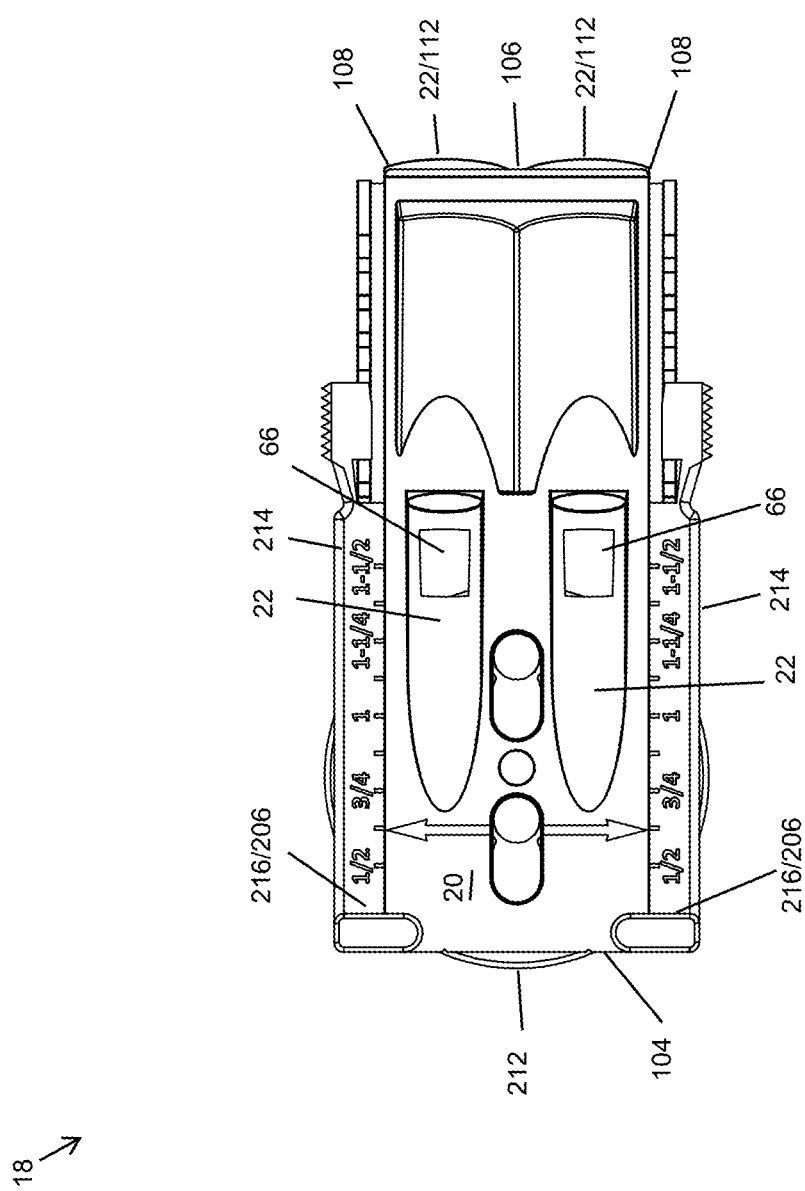
FIG. 32 is a bottom elevation view of a guide assembly shown in FIG. 31 having a pair of drill guides and an attachment member on its top side and a pair of alignment members having a lip connected adjacent its sides, the view showing a grip layer on the drilling face of the guide assembly, the view showing a grip layer on the drilling face of the guide assembly, the lower surface of the alignment members and the forward face of the lips.
Figure 33:
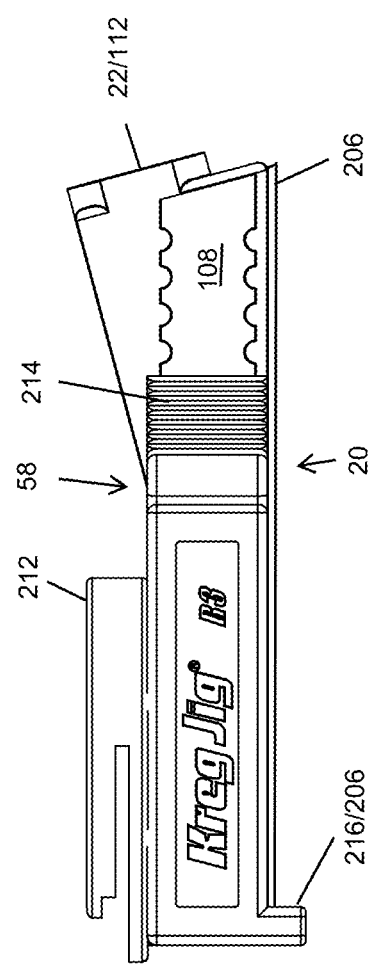
FIG. 33 is a right side elevation view of a guide assembly shown in FIGS. 31-32.
Figure 34:
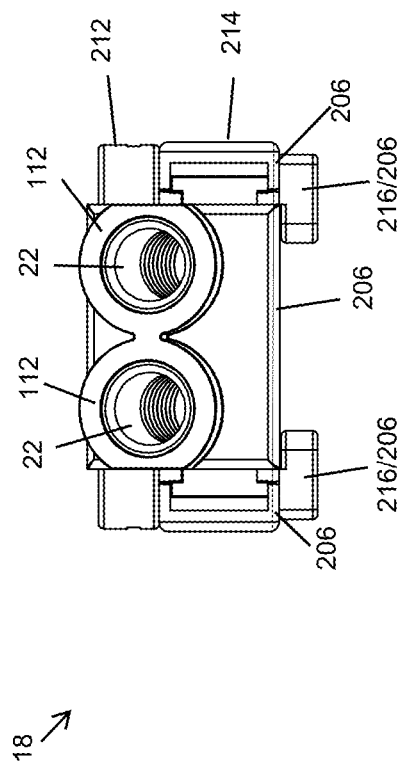
FIG. 34 is a front side elevation view of a guide assembly shown in FIGS. 31-33.
Figure 35:
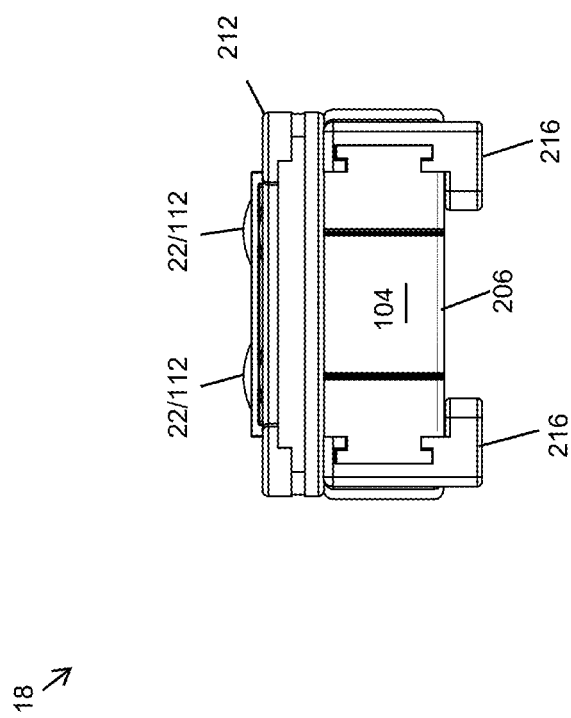
FIG. 35 is a rear side elevation view of a guide assembly shown in FIGS. 31-34.
Figure 36:
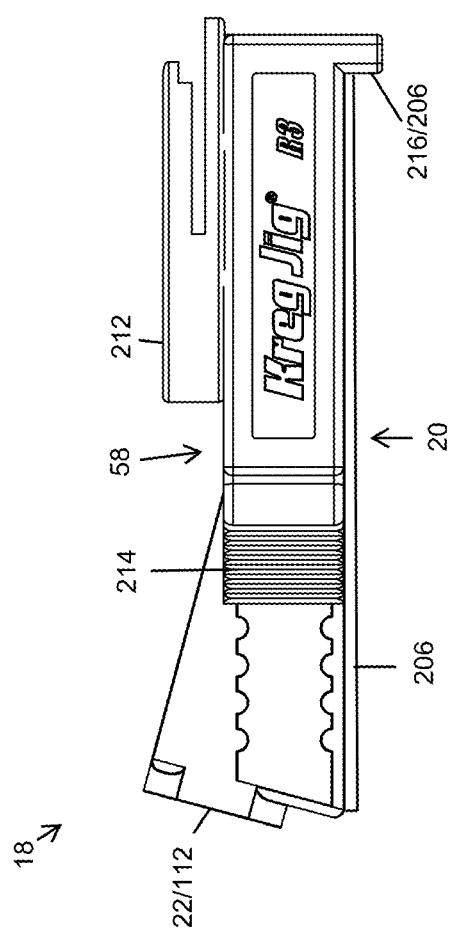
FIG. 36 is a left side elevation view of a guide assembly shown in FIGS. 31-35.
Figure 37:
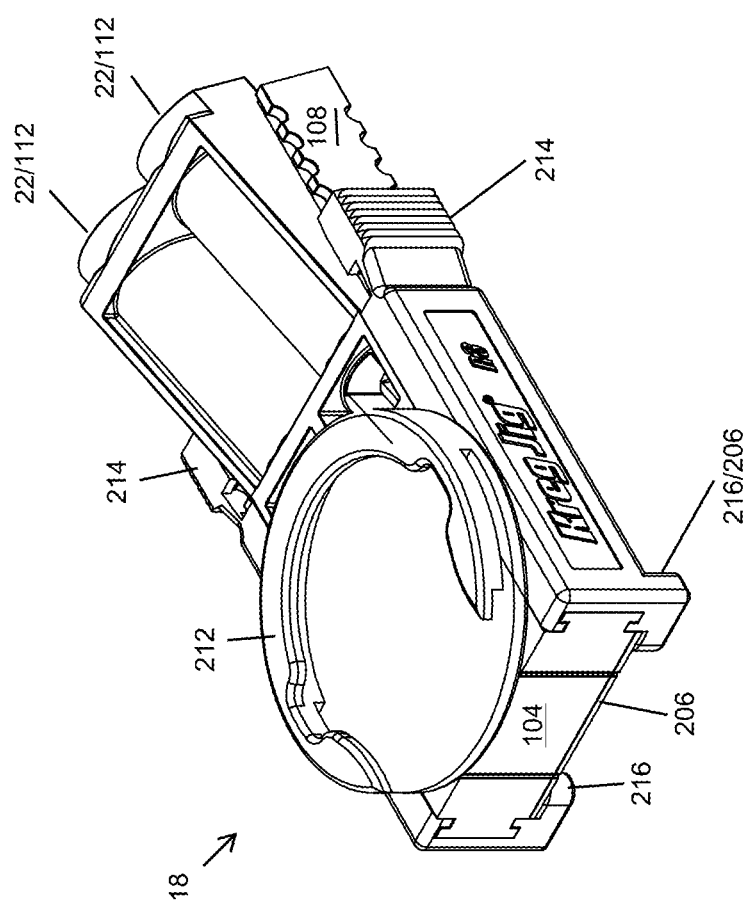
FIG. 37 is a rear perspective view of a guide assembly shown in FIGS. 31-36.
Figure 38:
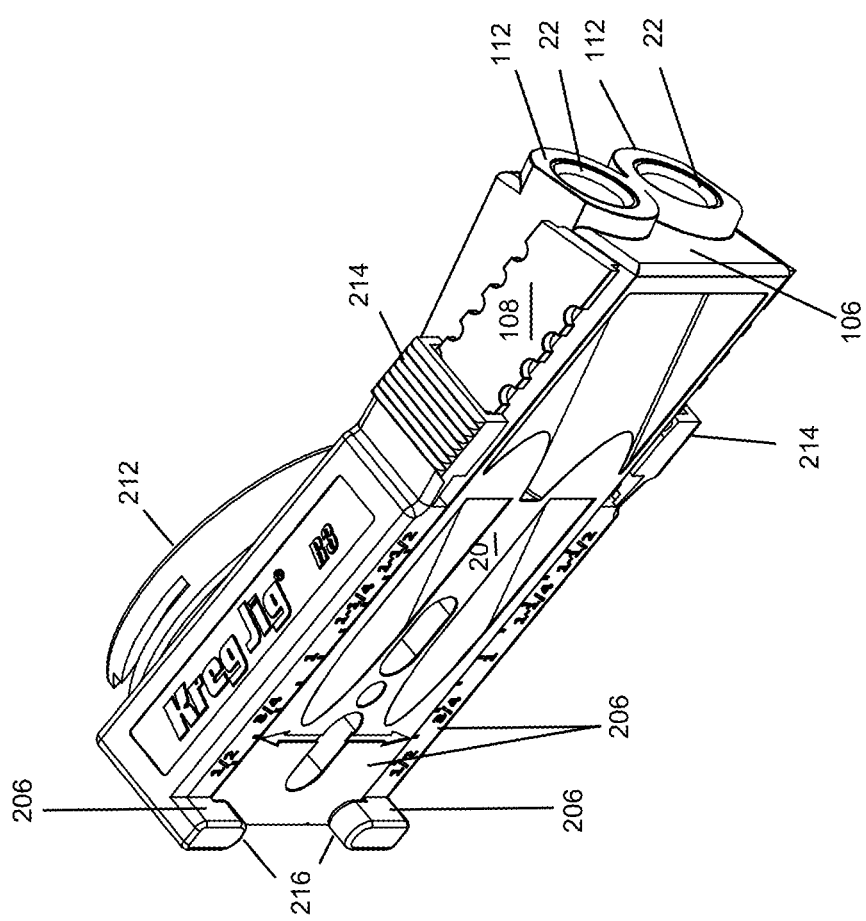
FIG. 38 is a front bottom perspective view of a guide assembly shown in FIGS. 31-37.
Figure 39:
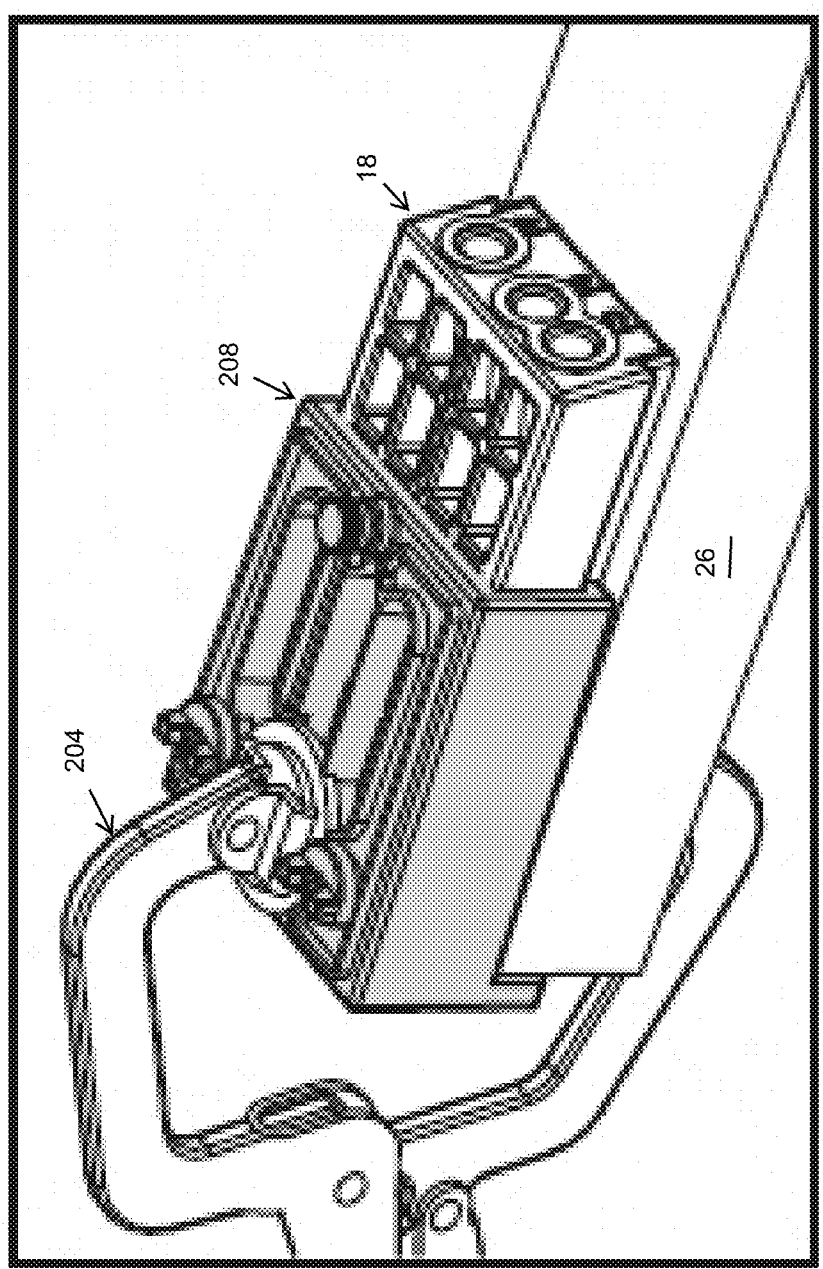
FIG. 39 is a perspective view of guide assembly 18, shown in FIGS. 1-21 in place within the portable base shown in FIGS. 14-21 clamped in place on a workpiece using a clamp, the view showing the grip layer of the drilling face of the guide assembly in contact with the surface of the workpiece, the view showing the grip layer of the forward wall of the portable base in contact with the surface of the workpiece, and the view showing the grip layer of the upper surface of the lip of the portable base in contact with the surface of the workpiece.
Figure 40:
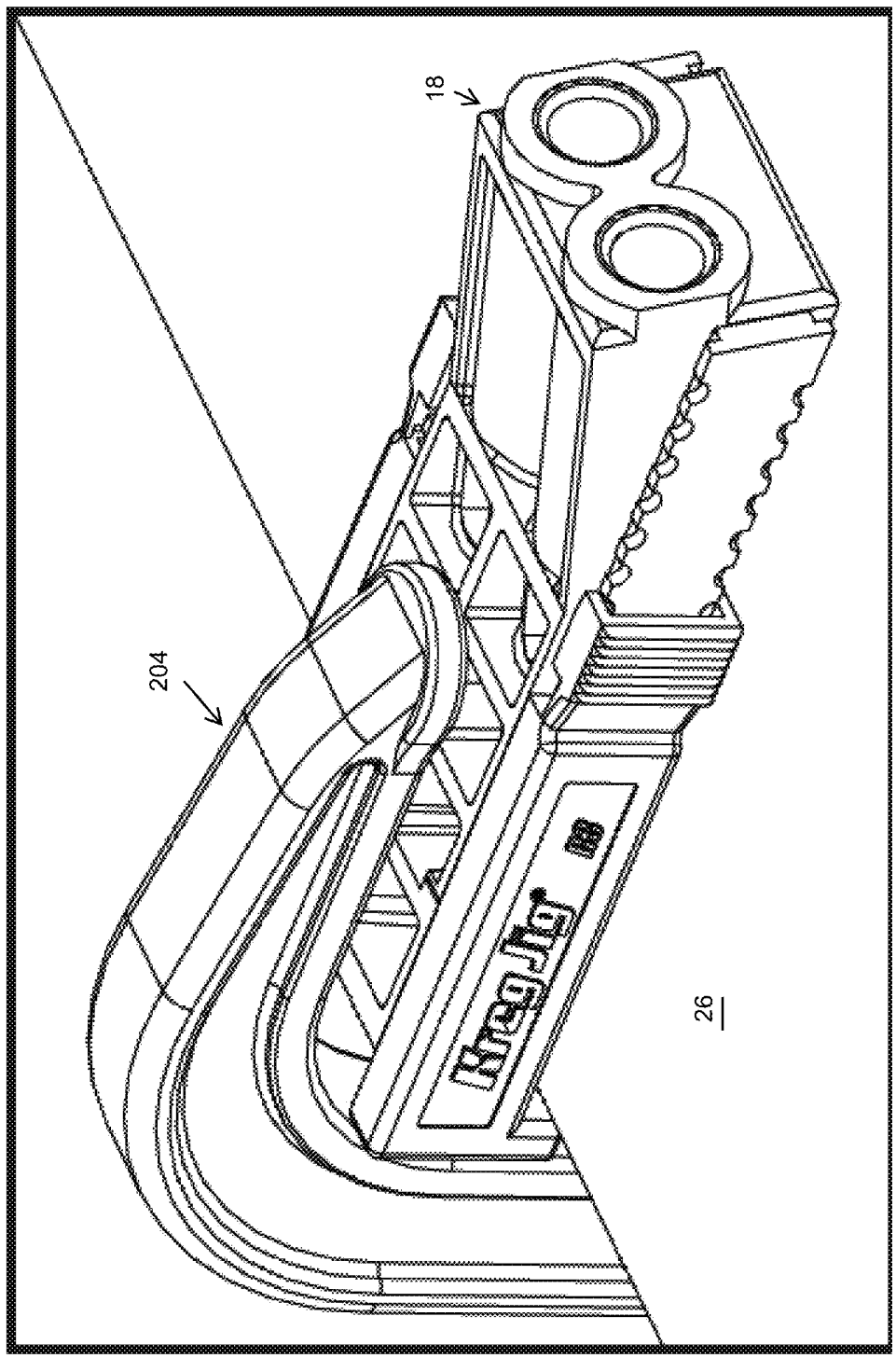
FIG. 40 is a perspective view of guide assembly 18, shown in FIGS. 31-38 clamped in place on a workpiece using a clamp, the view showing the grip layer of the drilling face of the guide assembly in contact with the surface of the workpiece, the view showing the grip layer of the forward wall of the alignment members in contact with the surface of the workpiece, and the view showing the grip layer of the upper surface of the lip of the alignment members in contact with the surface of the workpiece.
Figure 41:
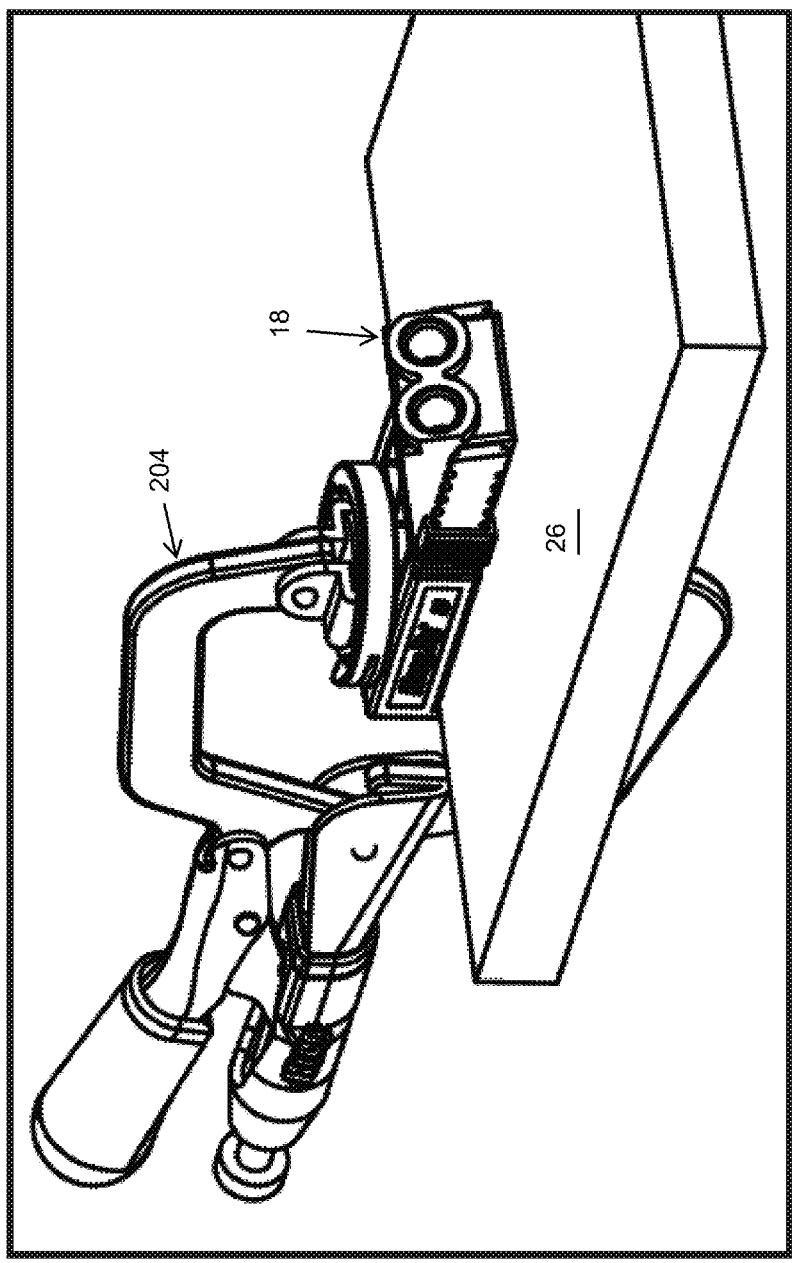
FIG. 41 is another perspective view of guide assembly 18, shown in FIGS. 31-38 clamped in place on a workpiece using a clamp, the view showing the grip layer of the drilling face of the guide assembly in contact with the surface of the workpiece, the view showing the grip layer of the forward wall of the alignment members in contact with the surface of the workpiece, and the view showing the grip layer of the upper surface of the lip of the alignment members in contact with the surface of the workpiece.
Figure 42:
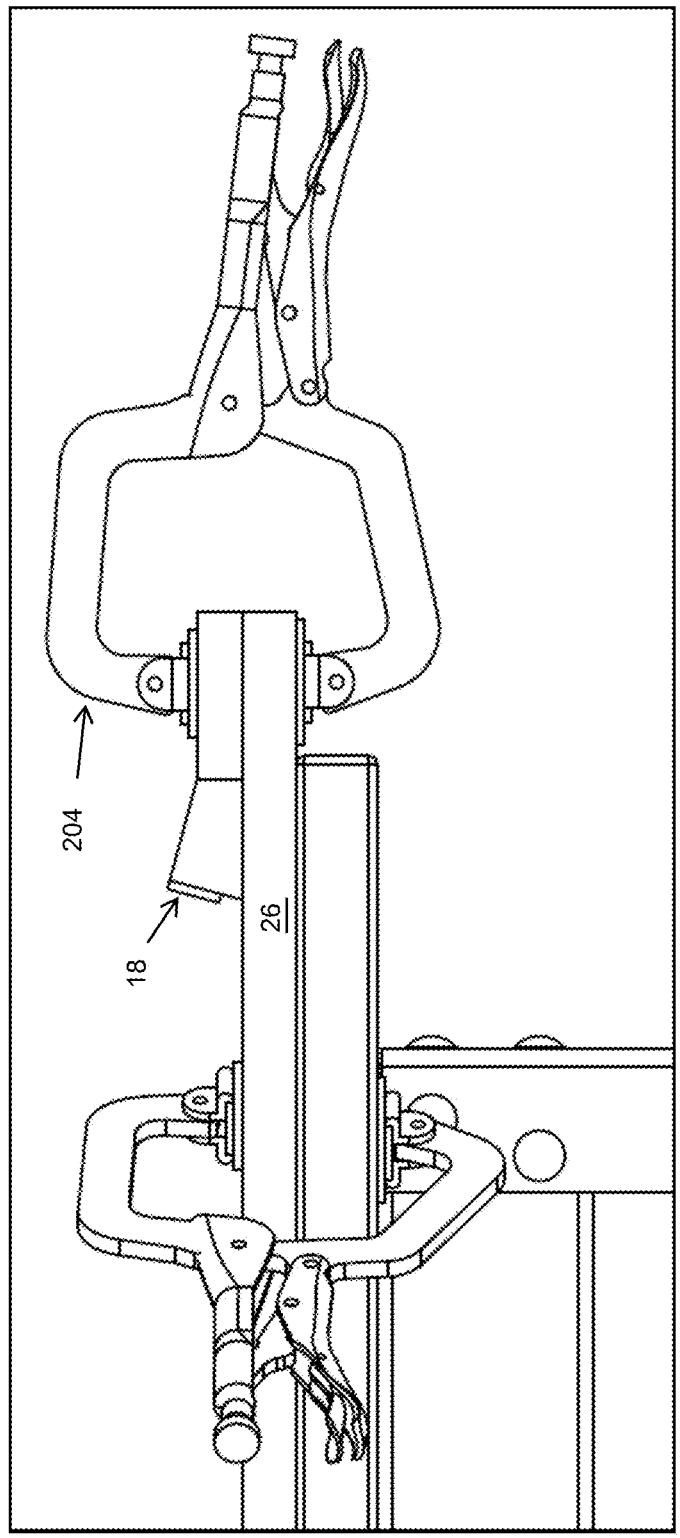
FIG. 42 is another perspective view of guide assembly 18, shown in FIGS. 22-30 clamped in place on a workpiece using a clamp, the view showing the grip layer of the drilling face of the guide assembly in contact with the surface of the workpiece.

As an example of the grip layer 206 being placed in portions on the drilling face 20 of guide assembly 18, with reference to FIG. 4, a plurality of portions of grip layer 206A are shown on the drilling face 20. In this example, the portions of grip layer 206A appear as independent members, or feet, spaced across the drilling face 20. In this arrangement, a portion of grip layer 206A is positioned in each corner of the drilling face 20, approximately at the center of the upper end, lower end and sides of the drilling face, as well as across the central portion of the drilling face 20. In the arrangement shown, these portions of grip layer 206A are shown as circular members when viewed from the forward side of drilling face 20, however any other size, shape or design is hereby contemplated for use. In addition, these portions of grip layer 206A may be flush with the forward plane of drilling face 20, or alternatively, the portions of grip layer 206A protrude slightly forward from the forward plane of drilling face 20 such that when guide assembly 18 is clamped against a workpiece 26, the portions of grip layer 206A compress to be flush with the plane of drilling face 20.

These portions of grip layer 206A may be connected to guide assembly 18 by any manner, method or means such as by using two sided tape, adhesive, gluing, cementing, screwing, bolting, welding, using fitting features, using snap fitting features, heat-activating, bonding, or the like, or by connecting by any other manner, method or means. In one arrangement, these portions of grip layer 206A fit within openings in the drilling face 20 of the guide assembly 18 and are friction-fitted therein, glued therein, welded therein, adhered therein, screwed therein, molded therein, formed therein, molded therein, or attached by any other manner, method or means.

Durometer or Shore Durometer is one of several measures of the hardness of a material. Higher numbers indicate harder materials whereas lower numbers indicate softer materials. Hardness may be defined as a material's resistance to indentation. Durometer is typically used as a measure of hardness in plastics, composites, polymers, elastomers, and rubbers, although it is applicable to most if not all other materials as well. While the durometer of a material does not necessarily or always define or correlate to the coefficient of friction of a material (e.g. how much grip or stick a material has when placed on another material) there is often a high correlation with a material's durometer and its coefficient of friction. That is, it is often the case that higher durometer materials, which are harder, tend to have a low coefficient of friction, meaning they are slicker, whereas in contrast lower durometer materials, which are softer, tend to have a high coefficient of friction, meaning they are sticker or provide more grip when in contact with another material.

In one example, the material of main body of guide assembly 18 and insert 202 has a higher durometer and a lower coefficient of friction compared to the grip layer 206 which has a lower durometer and a higher coefficient of friction. As the main body of guide assembly 18 is substantially thicker than the relatively thin grip layer 206, the main body of guide assembly 18 provides structural rigidity to guide assembly 18 while the grip layer 206 provides increased grip. That is, the grip layer 206 is relatively soft in comparison and has a high coefficient of friction that engages the workpiece 26 and in this way, this combination harnesses the benefits of both of these materials in a single piece. In one arrangement, the thickness of the grip layer 206 is up to one percent the thickness of the guide assembly 18, or is less than one percent the thickness of the guide assembly 18, or is between zero percent and one percent the thickness of the guide assembly 18. In one arrangement, the thickness of the grip layer 206 is up to five percent the thickness of the guide assembly 18, or is less than five percent the thickness of the guide assembly 18, or is between zero percent and five percent the thickness of the guide assembly 18. In one arrangement, the thickness of the grip layer 206 is up to ten percent the thickness of the guide assembly 18, or is less than ten percent the thickness of the guide assembly 18, or is between zero percent and ten percent the thickness of the guide assembly 18. In one arrangement, the thickness of the grip layer 206 is up to fifteen percent the thickness of the guide assembly 18, or is less than fifteen percent the thickness of the guide assembly 18, or is between zero percent and fifteen percent the thickness of the guide assembly 18. In one arrangement, the thickness of the grip layer 206 is up to twenty percent the thickness of the guide assembly 18, or is less than twenty percent the thickness of the guide assembly 18, or is between zero percent and twenty percent the thickness of the guide assembly 18. Any other thickness or range of thicknesses for grip layer 206 is hereby contemplated for use.

One benefit to using a material that has a high coefficient of friction for grip layer 206 is that the grip layer can be smooth, or said another way the drilling face 20 can be smooth, while providing the necessary grip on workpiece 26. That is, in contrast using a roughened or textured surface on drilling face 20, such as sand paper, serrations or grooves in the drilling face 20, a pattern of points, cross-hatching, a rough surface, a machined roughness, machining marks or any other roughened surface, which can cause marring or scarring on the workpiece 26, use of a smooth grip layer 206 does not cause marring or scarring. In fact, using a compressible material for grip layer 206 has a tendency to cause less scarring, marking or marring as the compressible material of grip layer 206 has a tendency to accommodate any debris or partials that get in-between the workpiece 26 and the drilling face 20 of guide assembly 18 due to its compressible nature. In contrast, when using a hard-surfaced drilling face 20 of guide assembly 18 these particles or debris would be pressed into the surface of the workpiece 26 thereby causing undesirable aesthetical displeasing features. As such, using a compressible material that has a high coefficient of friction is more forgiving, has less potential to mark the workpiece 26, and provides superior performance over a roughened surface for providing grip on drilling face 20.

Grip layer 206 may be formed of any material that has a higher coefficient of friction than the rigid material that the base 12, guide assembly 18, insert 202 or other components of the system 10 are formed of. As examples, grip layer 206 may be formed of a rubber material, a natural rubber material, a synthetic rubber material, a silicone material, an isoprene rubber material, ethylene propylene diene (EPDM) material, a nitrile rubber (NBR) material, a styrene butadiene rubber (SBR) material, a silicone rubber material, a butyl rubber material, a isobutylene isoprene rubber material, a polybutadiene rubber material, a foam rubber material, any compressible or high coefficient of friction plastic material, or any other material that is more-compressible than and/or has a higher coefficient of friction than the rigid materials of the base 12, guide assembly 18, insert 202 or other components of the system 10 that the grip layer 206 is attached to.

Grip Layer—On Base:

While grip layer 206 has been described herein as being placed on drilling face 20 of guide assembly 18, it is hereby contemplated that grip layer 206 may be placed on any place or portion of jig system 10 that comes into contact with or could come into contact with workpiece 26.

In one arrangement, the upper surface 38 of lower portion 14 of base 12 also includes a grip layer 206 thereon. Grip layer 206 may be placed on the upper surface 38 of lower portion 14 of base 12 for the same reasons described herein with respect to placing grip layer 206 on the drilling face 20 of guide assembly 18. Grip layer 206 on the upper surface 38 of lower portion 14 of base 12 may be formed of the same material as grip layer 206 on drilling face 20 of guide assembly 18 as is described herein, or alternatively a different material may be used. Grip layer 206 on the upper surface 38 of lower portion 14 of base 12 may be used for the same reasons described herein with respect to placing grip layer 206 on the drilling face 20 of guide assembly 18. Grip layer 206 on the upper surface 38 of lower portion 14 of base 12 may be attached and/or affixed and/or formed in the same or a different manner described herein with respect to grip layer 206 on the drilling face 20 of guide assembly 18.

That is, placing grip layer 206 on the upper surface 38 of lower portion 14 of base 12 is configured to engage the end of workpiece 26 when workpiece 26 is placed within jig system 10. As such, the engagement of the end of workpiece 26 with the grip layer 206 on the upper surface 38 of lower portion 14 of base 12 is configured to hold workpiece 26 in place in jig system 10 and prevent workpiece 26 from unintentionally sliding within jig system 10 and moving during clamping.

In the arrangement shown, as one example, grip layer 206 is placed on the upper surface 38 of lower portion 14 of base 12 is placed on the area of the upper surface 38 of lower portion 14 of base 12 adjacent the drilling face 20 of guide assembly 18 and adjacent the area where plunger pad 102 engages workpiece 26. This area is shown as area "A" in FIG. 2. Said another way, grip layer 206 may cover all or a portion of the area of upper surface 38 of lower portion 14 of base 12 between the drilling face 20 of guide assembly 18 and the plunger pad 102 of clamping assembly 24. Grip layer 206 may cover all or a portion of the surface area of the upper surface 38 of lower portion 14 of base 12 between drilling face 20 of clamp assembly 18 and plunger pad 102.

Grip Layer—on Forward Wall of Upright Portion of Base:

In one arrangement, the forward wall 50 of upright portion 16 of base 12 also includes a grip layer 206 thereon. Placement of grip layer 206 on the forward wall 50 of upright portion 16 of base 12 is particularly important and helpful in arrangements of jig system 10 wherein the forward wall 50 of upright portion 16 of base 12 is in flush planar alignment with the drilling face 20 of guide assembly 18. Grip layer 206 may be placed on the forward wall 50 of upright portion 16 of base 12 for the same reasons described herein with respect to placing grip layer 206 on the drilling face 20 of guide assembly 18. Grip layer 206 on the forward wall 50 of upright portion 16 of base 12 may be formed of the same material as grip layer 206 on drilling face 20 of guide assembly 18 as is described herein, or alternatively a different material may be used. Grip layer 206 on the forward wall 50 of upright portion 16 of base 12 may be used for the same reasons described herein with respect to placing grip layer 206 on the drilling face 20 of guide assembly 18. Grip layer 206 on the forward wall 50 of upright portion 16 of base 12 may be attached and/or affixed and/or formed in the same or a different manner described herein with respect to grip layer 206 on the drilling face 20 of guide assembly 18.

Grip Layer—On Plunger Pad:

In one arrangement, the surface of plunger pad 102 that engages workpiece 26 also includes a grip layer 206 thereon. Grip layer 206 may be placed on the surface of plunger pad 102 that engages workpiece 26 for the same reasons described herein with respect to placing grip layer 206 on the drilling face 20 of guide assembly 18. Grip layer 206 on the surface of plunger pad 102 that engages workpiece 26 may be formed of the same material as grip layer 206 on drilling face 20 of guide assembly 18 as is described herein, or alternatively a different material may be used. Grip layer 206 on the surface of plunger pad 102 that engages workpiece 26 may be used for the same reasons described herein with respect to placing grip layer 206 on the drilling face 20 of guide assembly 18. Grip layer 206 on the surface of plunger pad 102 that engages workpiece 26 may be attached and/or affixed and/or formed in the same or a different manner described herein with respect to grip layer 206 on the drilling face 20 of guide assembly 18.

Grip Layer—On Any Other Surface That Engages Workpiece:

It is hereby contemplated that grip layer 206 may be placed on any other surface that engages workpiece 26. Grip layer 206 may be placed on these surfaces for the same reasons described herein with respect to placing grip layer 206 on the drilling face 20 of guide assembly 18. Grip layer 206 placed on these surfaces may be formed of the same material as grip layer 206 on drilling face 20 of guide assembly 18 as is described herein, or alternatively a different material may be used. Grip layer 206 on these surfaces may be used for the same reasons described herein with respect to placing grip layer 206 on the drilling face 20 of guide assembly 18. Grip layer 206 on these surfaces may be attached and/or affixed and/or formed in the same or a different manner described herein with respect to grip layer 206 on the drilling face 20 of guide assembly 18.

It is also important to note that other configurations of pocket hole jig system 10 are hereby contemplated for use and the same teachings provided herein apply. That is, it is contemplated that various configurations of jig system 10 may look completely different than the jig presented in FIGS. 1-4 while the teachings presented herein apply equally. Also, the orientation of parts in different manners is hereby contemplated while the teaching presented herein apply equally.

That is, as one example, it is contemplated that the guide assembly 18 may be attached to the clamping assembly 24. In this arrangement, the workpiece 26 is forced into engagement with the forward wall 50 of upright portion 16 of base 12 on one side, and the drilling face 20 of guide assembly 18 (which is the movable part attached to clamping assembly 24) on the other side. In one arrangement, only the forward wall 50 of upright portion 16 of base 12 includes grip layer 206 thereon. In another arrangement, both of the forward wall 50 of upright portion 16 of base 12 on one side, and the drilling face 20 of guide assembly 18 on the other side include grip layer 206 thereon.

As such, it is contemplated that workpiece 26 may be clamped between opposing stop surfaces, one stop surface which is immovable or stationary in nature, and the other which is movable in nature by way of clamping assembly 24. In this way, workpiece 26 may be clamped between two opposing stop surfaces. In one arrangement, only one of these opposing stop surfaces include grip layer 206, which may be either the movable stop surface or the immovable stop surface. In another arrangement, both of these opposing stop surfaces include grip layer 206 thereon that help to hold workpiece 26 in place due to the high coefficient of friction of the grip layer 206. This may include only the forward wall 50 of upright portion 16 having grip layer 206 thereon. This may include only the drilling face 20 of guide assembly 18 having grip layer 206 thereon. This may include only the forward face of plunger pad 102 of clamping assembly 24 having grip layer 206 thereon. This may include any combination of these components, forward wall 50 of upright portion 16, drilling face 20 of guide assembly 18 and/or forward face of plunger pad 102 of clamping assembly 24, having grip layer 206 thereon.

In Operation—Use in a Jig:

In operation, to form pocket holes using jig 10, guide assembly 18 is placed in the opening 54 of upright portion 16 of base 12 (or alternatively into a portable base 208 as is further described herein). The guide assembly 18 is moved to the appropriate height and the set pin 56 is engaged into the rear wall 58 of the guide assembly 18 thereby locking the guide assembly 18 in place. Next, a workpiece 26 is placed on the base 12. The interior face of the workpiece 26 is placed against the drilling face 20 of the guide assembly 18 and the end of the workpiece is placed on the upper surface 38 of the lower portion 14 of base 12 adjacent to the drilling face 20 of guide assembly 18. Once workpiece 26 is in this position on jig 10 the handle assembly 72 is moved from a non-clamping position to a clamping position thereby forcing the plunger pad 102 against the workpiece 26 thereby clamping the workpiece 26 in place.

In this position, the grip layer 206 of the drilling face 20 guide assembly 18 and/or the grip layer 206 on the upper surface 38 of the lower portion 14 of base 12 and/or the grip layer 206 on the forward wall 50 of the upright portion 16 of base 12 and/or the grip layer 206 on the face of the plunger pad 102 directly engages the workpiece 26. The higher coefficient of friction of the material of grip layer 206 provides increased grip on workpiece 26 thereby providing a better hold between guide assembly 18 and workpiece 26 thereby preventing movement of workpiece 26 during use and requiring less clamping pressure to hold the workpiece 26 in place. When the clamping assembly 24 is tightened the grip layer 206 of the drilling face 20 guide assembly 18 and/or the grip layer 206 on the upper surface 38 of the lower portion 14 of base 12 and/or the grip layer 206 on the forward wall 50 of the upright portion 16 of base 12 and/or the grip layer 206 on the face of the plunger pad 102 compresses while holding the workpiece 26 in place. This slight compression has a tendency to be accommodating to the workpiece 26 and prevents marking or marring the surfaces of workpiece 26 as forces are dispersed instead of focused at particular points. In this way, a firm, strong and accommodating hold between jig system 10 and workpiece 26 is generated by the jig system 10 presented herein.

In one arrangement, wherein the grip layer 206 protrudes outward slightly from the plane of the drilling face 20 as the workpiece 26 is clamped against the drilling face 20 the protruding portions of grip layer 206 compress so as to be flush with the plane of the drilling face 20.

In Operation—Use of Drilling Guide:

In an alternative arrangement, instead of using the drilling guide 18 in jig 10 the guide assembly 18 may be used alone on workpiece 26 without jig 10. In this arrangement, drilling face 20 of guide assembly 18 is placed on a surface of workpiece 26. When in the desired position, the guide assembly 18 is clamped into place using clamp 204.

In this position, the grip layer 206 of the guide assembly 18 directly engages the workpiece 26. The higher coefficient of friction of the material of grip layer 206 provides increased grip on workpiece 26 thereby providing a better hold between guide assembly 18 and workpiece 26 thereby preventing movement of workpiece 26 during use and requiring less clamping pressure to hold the workpiece 26 in place.

In one arrangement, wherein the grip layer 206 protrudes outward slightly from the plane of the drilling face 20 as the workpiece 26 is clamped against the drilling face 20 the protruding portions of grip layer 206 compress such to be flush with the plane of the drilling face 20.

Portable Base:

While guide assembly 18 may be use in jig 10 or in a standalone manner, guide assembly 18 may also be used in portable base 208. One arrangement of portable base 208 is shown in FIGS. 14-21. Portable base 208 is formed of any suitable size, shape and design and is configured to hold guide assembly 18 in an adjustable manner and facilitate setting the position of guide assembly 18 on workpiece 26 in an efficient and repeatable manner.

In the arrangement shown, as one example, portable base 208 is essentially upright portion 16 of jig 10 without the other portions of the larger assembly of jig 10. That is, in the arrangement shown, as one example, portable base 208 includes rear wall 48, forward wall 50, upper wall 52, opening 54 and exit holes 64 as is described herein. The lower end of portable base 208 also includes a lip 210 that extends forward past the plane of forward wall 50 a distance and forms a plane aligned in approximate perpendicular alignment to the plane formed by drilling face 20 of guide assembly 18 and/or forward wall 50 of portable base 208. Lip 210 essentially forms a small portion of lower portion 14 of base 12 and serves as a stop surface for portable base 208. That is, lip 210 extends in approximate perpendicular alignment to the plane established by forward wall 50. In use, the forward wall 50 is placed on the surface of workpiece 26 that is to be drilled and the lip 210 is engaged with the edge of workpiece 26. In this way, lip 210 indexes or sets the position of drill guide 18 and portable base 208 with respect to an edge or end of workpiece 26.

Like upright portion 16 of jig system 10, the position of guide assembly 18 within portable base 208 is adjustable. That is the portable base 208 includes a set pin 56 that sets the depth of the drill guide 18 with respect to portable base 208. Once the position of the drill guide 18 is set within portable base 208 and the portable base 208 is aligned with the edge or end of workpiece 26 the portable base 208 and drill guide 18 are clamped in place using clamp 204.

Grip layer 206 may be placed on the drilling face 20 and/or insert 202 of guide assembly 18. Grip layer 206 may also be placed on the forward wall 50 and/or the upper surface of lip 210 as these surfaces engage workpiece 26.

As is described herein, the grip layer 206 on drilling guide 18 provides increased grip upon workpiece 26, whether drilling guide 18 is used in jig 10, portable base 208 or in a standalone capacity.

Grip Layer on Forward Wall:

In one arrangement, grip layer 206 is only placed on the drilling face 20 of guide assembly 18. In this arrangement, the drilling face 20 of guide assembly extends slightly past the forward wall 50 of drilling jig 10 and/or portable base 208 when guide assembly 18 is in place therein. In this way, this slight protrusion of drilling face 20 past forward wall 50 ensures direct engagement of drilling face 20/grip layer 206 with workpiece 26.

In an alternative arrangement, the drilling face 20 of guide assembly 18 is in approximate planar alignment with the forward face of forward wall 50 such that the two planar faces engage the surface of a workpiece 26 at the same time. In one arrangement, the forward face of forward wall 50 includes a grip layer 206 thereon in the same or a similar manner described herein with respect to guide assembly 18. The presence of grip layer 206 on forward wall 50 increases the grip between jig 10 and/or portable base 208 in the manner described herein with respect to guide assembly 18.

Alternative Arrangements:

The use of grip layer 206 is hereby contemplated for use on any guide assembly 18 and/or jig or jig system.

As further examples, with reference to FIGS. 4-21, Applicant's guide assembly used in association with its K3, K4 and K5 products is shown used in association with grip layer 206. This guide assembly 18 includes three drill guides 22 and a substantial insert 202 that occupies a portion of drilling face 20 that is metallic. This guide assembly 18 can be used with jig system 10, with portable base 208 as well as in a standalone manner.

With reference to FIGS. 22-30, Applicants mini jig is shown as guide assembly 18 and used in association with grip layer 206. This guide assembly 18 has a single drill guide 22 that intersects drilling face 20. While the guide assembly shown in FIGS. 22-30 is configured differently than that shown in FIGS. 1-21, the teachings apply equally. That is, grip layer 206 may be used on the drilling face 20 of guide assembly 18.

With reference to FIGS. 31-38, Applicant's R3 product is shown used in association with grip layer 206. This guide assembly 18 has a pair of drill guides 22 that intersect drilling face 20. This guide assembly 18 also has an attachment member 212 that facilitates connection of a clamp 204 to the guide assembly 18. This guide assembly 18 also includes moveable or slidable alignment members 214 that include a lip 216 that extend below the drilling face 20 that are used to set the position of guide assembly 18 as well as align the guide assembly 18 with an edge of a workpiece 26. Again, while the guide assembly shown in FIGS. 31-38 is configured differently than that shown in FIGS. 1-21, or FIGS. 22-30 the teachings apply equally. That is, grip layer 206 may be used on the drilling face 20 of guide assembly 18 as well as the forward faces of attachment member 212 and the upper surfaces of lip 216, as well as any other surface that may engage workpiece 26.

In this way the system 10 is used to form pocket holes and all of the objectives of the disclosure are met.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. A drilling guide system, comprising:
a guide assembly;
the guide assembly having a lower wall at a lower end;
the guide assembly having an upper wall at an upper end;
the guide assembly having sidewalls at opposing sides;
the guide assembly having a drilling face at a forward side;
the guide assembly having a rear wall at a rear side;
the guide assembly having a first drill guide therein;
wherein the first drill guide intersects with the drilling face at an angle;
the guide assembly having a main body formed of a first material;
the guide assembly having a grip layer positioned on the drilling face;
wherein the grip layer is formed of a second material;
wherein the second material of the grip layer has a higher coefficient of friction than the first material of the main body;
wherein when the drilling face of the guide assembly is placed on a surface of a workpiece, the grip layer helps to hold the guide assembly in place on the workpiece;
wherein the grip layer includes an aperture where a drill bit intersects the drilling face of the guide assembly; and
wherein the grip layer is flush with the drilling face.

2. The system of claim 1, wherein the first material of the main body of the guide assembly has a higher durometer than the second material of the grip layer.

3. The system of claim 1, wherein the first material of the main body of the guide assembly is harder than second material of the grip layer.

4. The system of claim 1, wherein the grip layer covers the drilling face.

5. The system of claim 1, wherein the grip layer covers a portion of the drilling face.

6. The system of claim 5, further comprising an insert, wherein the insert is positioned within the guide assembly, wherein the insert is formed of a metallic material.

7. The system of claim 6, wherein a portion of the drilling face is formed of a forward side of an insert.

8. The system of claim 1, wherein the grip layer protrudes forward a distance from the forward side of the drilling face.

9. The system of claim 1, further comprising a second drilling guide, wherein the second drilling guide intersects with the drilling face at an angle.

10. The system of claim 1, further comprising a jig system, wherein the jig system includes an upright having an opening configured to receive the guide assembly therein.

11. The system of claim 1, further comprising a portable base, wherein the portable base includes an opening configured to receive the guide assembly therein.

12. The system of claim 1, wherein a clamp clamps the guide assembly to the workpiece.

13. The system of claim 1, wherein the aperture is a hole in the grip layer.

14. The system of claim 1, wherein the aperture is oval shaped.

15. The system of claim 1, wherein the drilling face includes an oval shaped aperture and the aperture in the grip layer is about the same size as the oval shaped aperture in the drilling face.

16. The system of claim 1, wherein the drilling face has an aperture through which the drill bit passes and at least one edge of the aperture in the grip layer is positioned near or at an edge of the aperture in the drilling face.

17. The system of claim 1, the aperture is a hole in the grip layer that has an edge that surrounds the drill bit with close tolerances when the drill bit extends through the aperture.

18. The system of claim 1, wherein the grip layer forms an extended continuous surface on the drilling face.

19. A drilling guide system, comprising:
a guide assembly;
the guide assembly having a main body formed of a first material;
the main body having a drilling face;

the main body having a first drill guide;
wherein the first drill guide intersects the drilling face at an angle;
a grip layer positioned on the drilling face;
the grip layer formed of a second material;
wherein the second material of the grip layer has a higher coefficient of friction than the first material of the main body;
wherein when the drilling face of the guide assembly is placed on a surface of a workpiece, the high coefficient of friction of the grip layer holds the guide assembly in place on the workpiece;
wherein the grip layer includes an aperture where a drill intersects the drilling face of the guide assembly; and
wherein the grip layer is flush with the drilling face.

20. The system of claim 19, wherein the grip layer covers the drilling face.

21. The system of claim 19, wherein the grip layer covers a portion of the drilling face.

22. The system of claim 21, further comprising an insert, wherein the insert positioned within the guide assembly, wherein the insert is formed of a metallic material.

23. The system of claim 22, wherein a portion of the drilling face is formed of a forward side of an insert.

24. The system of claim 19, wherein the grip layer protrudes forward a distance from a forward side of the drilling face.

25. The system of claim 19, further comprising a second drilling guide, wherein the second drilling guide intersects with the drilling face at an angle.

26. The system of claim 19, further comprising a jig system, wherein the jig system includes an upright having an opening configured to receive the guide assembly therein.

27. The system of claim 19, further comprising a portable base, wherein the portable base includes an opening configured to receive the guide assembly therein.

28. The system of claim 19, wherein a clamp clamps the guide assembly to the workpiece.

29. The system of claim 19, wherein the drilling face has an aperture through which the drill bit passes and at least one edge of the aperture in the grip layer is positioned near or at an edge of the aperture in the drilling face.

30. The system of claim 19, wherein the aperture is a hole in the grip layer.

31. The system of claim 19, wherein the aperture is oval shaped.

32. The system of claim 19, wherein the drilling face includes an oval shaped aperture and the aperture in the grip layer is about the same size as the oval shaped aperture in the drilling face.

33. The system of claim 19, the aperture is a hole in the grip layer that has an edge that surrounds the drill bit with close tolerances when the drill bit extends through the aperture.

34. The system of claim 19, wherein the grip layer forms an extended continuous surface on the drilling face.

35. A drilling guide system, comprising:
a guide assembly;
the guide assembly having a main body;
the main body having a drilling face;
the main body having a first drill guide;
wherein the first drill guide intersects the drilling face at an angle;
a grip layer positioned on the drilling face;
wherein the grip layer is formed of a material that is softer than and has a higher coefficient of friction than the material that the main body of the guide assembly is formed of;
wherein the grip layer is arranged above, below, and to the sides of a drill bit that exits the drill guide;
wherein the grip layer is compressible;
wherein the grip layer is configured and arranged to be flush with the drilling face when compressed; and
wherein when the drilling face of the guide assembly is placed on a surface of a workpiece, the grip layer holds the guide assembly in place on the workpiece.

36. The system of claim 35, wherein the grip layer covers the drilling face.

37. The system of claim 35, wherein the grip layer covers a portion of the drilling face.

38. The system of claim 37, wherein the grip layer protrudes forward a distance from a forward side of the drilling face.

39. The system of claim 38, further comprising an insert, wherein the insert is formed of a metallic material.

40. The system of claim 39, wherein a portion of the drilling face is formed of a forward side of an insert.

41. The system of claim 40, wherein the grip layer is compressible; and wherein the grip layer is configured and arranged to be flush with the drilling face when compressed.

42. The system of claim 35, further comprising a second drilling guide, wherein the second drilling guide intersects with the drilling face at an angle.

43. The system of claim 35, further comprising a jig system, wherein the jig system includes an upright having an opening configured to receive the guide assembly therein.

44. The system of claim 35, further comprising a portable base, wherein the portable base includes an opening configured to receive the guide assembly therein.

45. The system of claim 35, wherein a clamp clamps the guide assembly to the workpiece.

46. A drilling guide system, comprising:
a base;
a first stop surface operatively connected to the base;
wherein the first stop surface is stationary in nature;
a clamping assembly operatively connected to the base;
a second stop surface operatively connected to the clamping assembly;
wherein the first stop surface and the second stop surface are positioned in opposing relation to one another;
wherein operation of the clamping assembly moves the second stop surface toward and away from the first stop surface so as to facilitate clamping and unclamping a workpiece between the opposing first stop surface and the second stop surface;
a first grip layer positioned on one of the first stop surface and the second stop surface;
wherein the first grip layer is formed of a material that is softer than and has a higher coefficient of friction than the material that the base is formed of;
wherein when a workpiece is clamped between the first stop surface and the second stop surface the first grip layer helps to hold the workpiece in place;
wherein one of the first stop surface and the second stop surface includes a guide assembly having at least one drill guide that intersects the one of the first stop surface and second stop surface at an angle;
wherein a peripheral edge of a drill bit that passes through the at least one drill guide is surrounded by the first grip layer; and wherein the grip layer is flush with the stop surface that is intersected by the at least one drill guide of the guide assembly.

47. The system of claim 46, further comprising a second grip layer positioned the other of the first stop surface and the second stop surface opposite the first grip layer.

48. The system of claim 46, wherein the guide assembly is connected to the first stop surface.

49. The system of claim 46, wherein the guide assembly is connected to the second stop surface.

50. The system of claim 46, wherein the first grip layer forms an extended continuous surface that engages the workpiece.

51. A drilling guide system, comprising:
a guide assembly;
the guide assembly having a lower wall at a lower end;
the guide assembly having an upper wall at an upper end;
the guide assembly having sidewalls at opposing sides;
the guide assembly having a drilling face at a forward side;
the guide assembly having a rear wall at a rear side;
the guide assembly having a first drill guide therein;
wherein the first drill guide intersects with the drilling face at an angle;
the guide assembly having a main body formed of a first material;
the guide assembly having a grip layer positioned on the drilling face;
wherein the grip layer is formed of a second material;
wherein the second material of the grip layer has a higher coefficient of friction than the first material of the main body;
wherein when the drilling face of the guide assembly is placed on a surface of a workpiece, the grip layer helps to hold the guide assembly in place on the workpiece;
wherein the grip layer includes an aperture where a drill bit intersects the drilling face of the guide assembly;
wherein the grip layer covers a portion of the drilling face;
at least a portion of the drilling face is formed of a forward side of an insert;
wherein the insert is positioned within the guide assembly, wherein the insert is formed of a metallic material; and
wherein the grip layer is flush with the drilling face.

52. The system of claim 51, wherein the grip layer and drilling face, wherein material of the grip layer and material of the drilling face form a single monolithic and unitary member.

53. The system of claim 51, wherein the grip layer is bonded with the drilling face, wherein the bond between the grip layer and the drilling face is characteristic of a bond between two materials that are molded together.

* * * * *

UNITED STATES PATENT AND TRADEMARK OFFICE
CERTIFICATE OF CORRECTION

PATENT NO. : 10,967,440 B2
APPLICATION NO. : 16/180527
DATED : April 6, 2021
INVENTOR(S) : Brian Hill Page 1 of 1

It is certified that error appears in the above-identified patent and that said Letters Patent is hereby corrected as shown below:

In the Claims

Column 24 Lines 21-23 Claim 3 should read as follows:
3. The system of claim 1, wherein the first material of the main body of the guide assembly is harder than the second material of the grip layer.

Column 27 Lines 4-6 Claim 47 should read as follows:
47. The system of claim 46, further comprising a second grip layer positioned on the other of the first stop surface and the second stop surface opposite the first grip layer.

Column 28 Lines 18-21 Claim 52 should read as follows:
52. The system of claim 51, wherein material of the grip layer and material of the drilling face form a single monolithic and unitary member.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*